United States Patent [19]
Omori et al.

[11] Patent Number: 5,976,017
[45] Date of Patent: Nov. 2, 1999

[54] STEREOSCOPIC-IMAGE GAME PLAYING APPARATUS

[75] Inventors: Shigeru Omori; Tomohiko Hattori; Kunimasa Katayama; Sadayuki Sakuma; Haruhiko Kamijo, all of Inokuchi Nakai-machi, Japan

[73] Assignee: Terumo Kabushiki Kaisha, Tokyo, Japan

[21] Appl. No.: 08/826,363

[22] Filed: Apr. 9, 1997

Related U.S. Application Data

[63] Continuation of application No. 08/743,415, Nov. 1, 1996, abandoned, which is a continuation of application No. 08/385,542, Feb. 8, 1995, abandoned.

[30] Foreign Application Priority Data

Feb. 9, 1994 [JP] Japan .................................. 6-015582

[51] Int. Cl.$^6$ .................................................. H04N 13/04
[52] U.S. Cl. .................................. 463/32; 436/34; 348/52
[58] Field of Search .............................. 463/32, 34, 30, 463/31; 364/410; 348/42, 51, 57, 54, 55; 359/462, 475, 477

[56] References Cited

U.S. PATENT DOCUMENTS

| | | | |
|---|---|---|---|
| 3,128,339 | 4/1964 | Wupper . | |
| 4,385,316 | 5/1983 | Yanagisawa | 348/44 |
| 4,535,354 | 8/1985 | Rickert | 348/52 |
| 4,641,178 | 2/1987 | Street | 348/57 |
| 4,647,966 | 3/1987 | Phillips et al. | 348/58 |
| 4,649,425 | 3/1987 | Pund | 384/52 |
| 4,717,949 | 1/1988 | Eichenlaub | 348/54 |

(List continued on next page.)

FOREIGN PATENT DOCUMENTS

| | | |
|---|---|---|
| 0505998 A1 | 9/1992 | European Pat. Off. . |
| 0576106 A1 | 12/1993 | European Pat. Off. . |
| 0 595 023A1 | 5/1994 | European Pat. Off. . |
| 0 602 934 A2 | 6/1994 | European Pat. Off. . |
| 0601308 A1 | 6/1994 | European Pat. Off. . |
| 41 02 895 C1 | 1/1992 | Germany . |
| U-93 00 765 | 5/1993 | Germany . |
| 63 194497 | 8/1988 | Japan . |
| 5-22722 | 1/1993 | Japan . |
| 2 111 798 | 7/1983 | United Kingdom . |
| 2206763 | 1/1989 | United Kingdom . |
| 83/02169 | 6/1983 | WIPO . |
| WO 83/02169 | 6/1983 | WIPO . |
| WO 93/19394 | 9/1993 | WIPO . |

OTHER PUBLICATIONS

Abstract: Alfred Schwartz, 1985 International Display Research Conference; "Head Tracking Stereoscopic Display": CH2239–2/85/0000–0141 1985 IEEE.

J.R. Moore, et al., "The Implementation of a Multi–view Autostereoscopic Display", Image Technolgy Journal of BKSTS, Jan./Feb., 1993, No. 1.

K.E. Jachimowicz, et al., "Stereoscopic (3–D) projection display using polarized color multiplexing," Optical Engineering, vol. 29, Aug. 1990.

K. Yamamoto, et al., "Automatic Viewing Range Tracing Method For Communication Equipment", IEEE Transactions on Consumer Electronics, Aug. 1991, No. 3, vol. 37, pp. 424–431.

*Primary Examiner*—Jessica Harrison
*Assistant Examiner*—James Schaaf
*Attorney, Agent, or Firm*—Burns, Doane, Swecker & Mathis, LLP

[57] ABSTRACT

A stereoscopic-image game playing apparatus displays a screen image for right eye and a screen image for left eye on LCD 105, outputs images of the player obtained by cameras 103a and 103b to the receiving side, and displays images corresponding to the right half face and the left half face of the player based on the player's images on LCD 107. The images displayed on the LCD 107 are used as figures for selectively introducing lights from the screen images on the LCD 105, by lens 106, to the right and left eyes of the player. This enables stereoscopic vision without glasses for separating images respectively for the player's right and left eyes, and allows the player to move from the initial position.

25 Claims, 52 Drawing Sheets

U.S. PATENT DOCUMENTS

| | | | |
|---|---|---|---|
| 4,829,365 | 5/1989 | Eichenlaub | 348/54 |
| 4,870,600 | 9/1989 | Hiraoka | 395/119 |
| 4,890,902 | 1/1990 | Doane et al. | 349/94 |
| 4,922,336 | 5/1990 | Morton | 348/51 |
| 4,987,487 | 1/1991 | Ichinose et al. | 348/42 |
| 5,008,658 | 4/1991 | Russay et al. | 345/87 |
| 5,032,912 | 7/1991 | Sakariassen | 348/52 |
| 5,059,957 | 10/1991 | Todoriki et al. | 345/7 |
| 5,132,839 | 7/1992 | Travis | 359/462 |
| 5,162,785 | 11/1992 | Fagard | 345/87 |
| 5,311,220 | 5/1994 | Eichenlaub | 348/55 |
| 5,312,839 | 5/1994 | Nakada | 514/634 |
| 5,315,377 | 5/1994 | Isono et al. | 348/54 |
| 5,365,370 | 11/1994 | Hudgins | 359/462 |
| 5,408,264 | 4/1995 | Kurata et al. | 348/51 |
| 5,421,589 | 6/1995 | Monroe | 273/437 |
| 5,430,474 | 7/1995 | Hines | 348/51 |
| 5,430,809 | 7/1995 | Tomitaka | 382/173 |
| 5,457,574 | 10/1995 | Eichenlaub | 359/462 |
| 5,459,605 | 10/1995 | Kempf | 359/462 |
| 5,494,483 | 2/1996 | Adair | 600/111 |
| 5,499,303 | 3/1996 | Hund et al. | 382/100 |
| 5,568,314 | 10/1996 | Omori et al. | 359/464 |

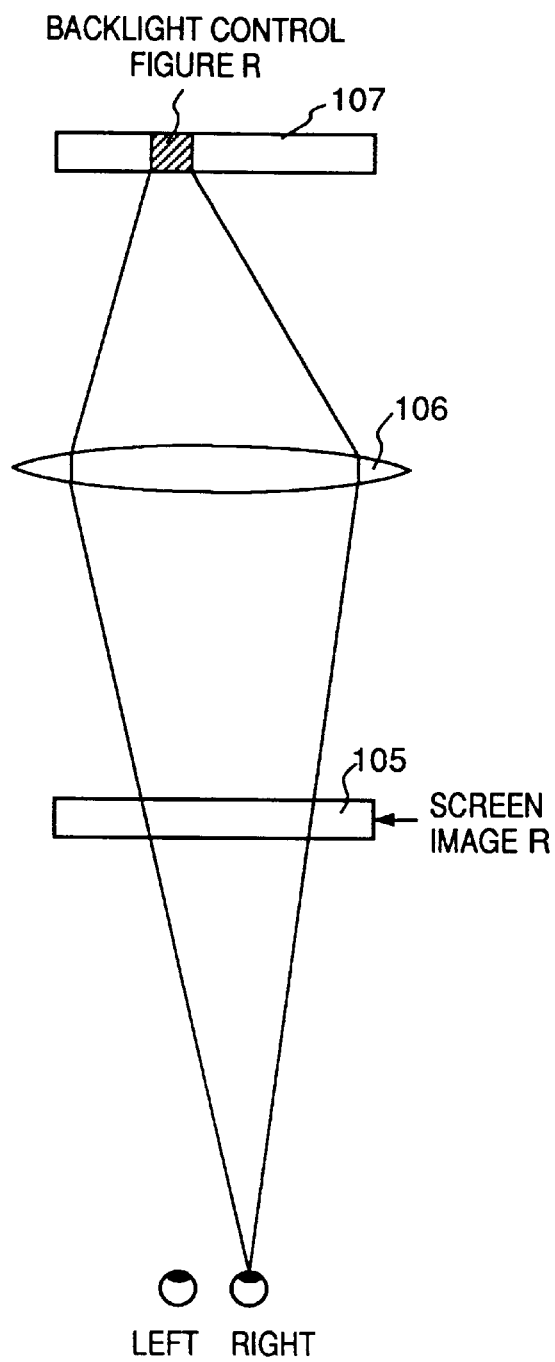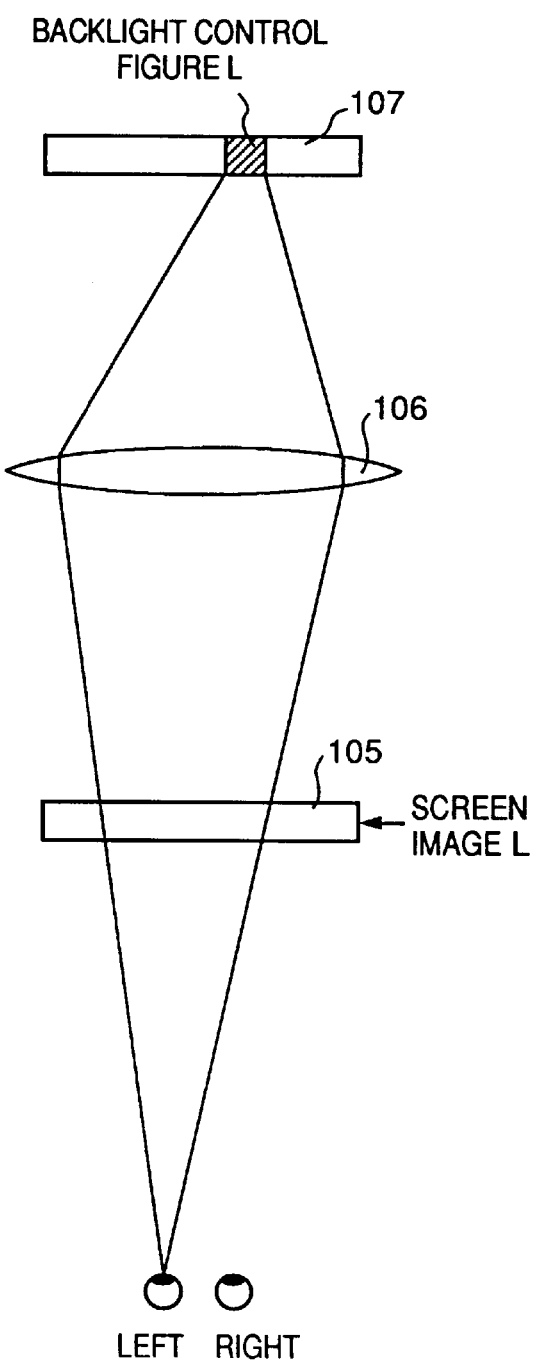

FOR RIGHT EYE

FOR LEFT EYE

FIG. 33
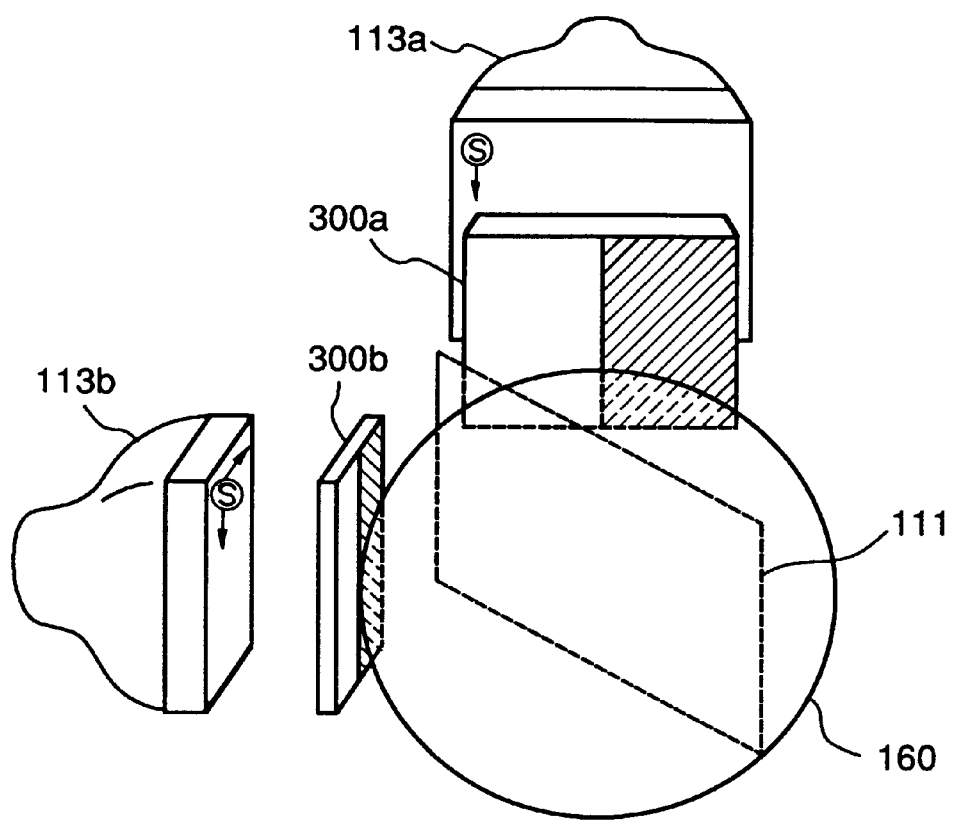
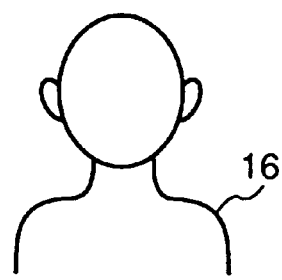

F I G. 42
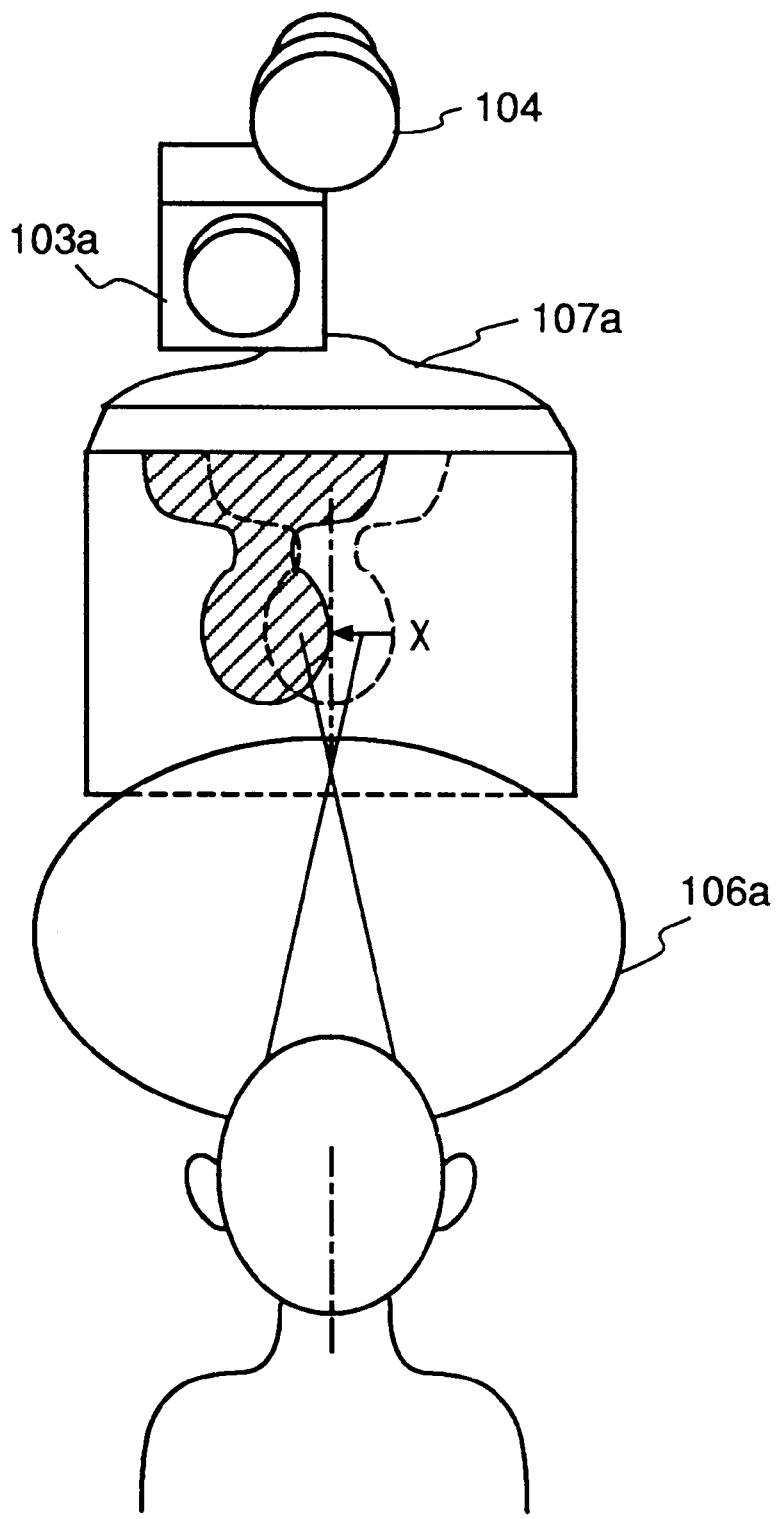

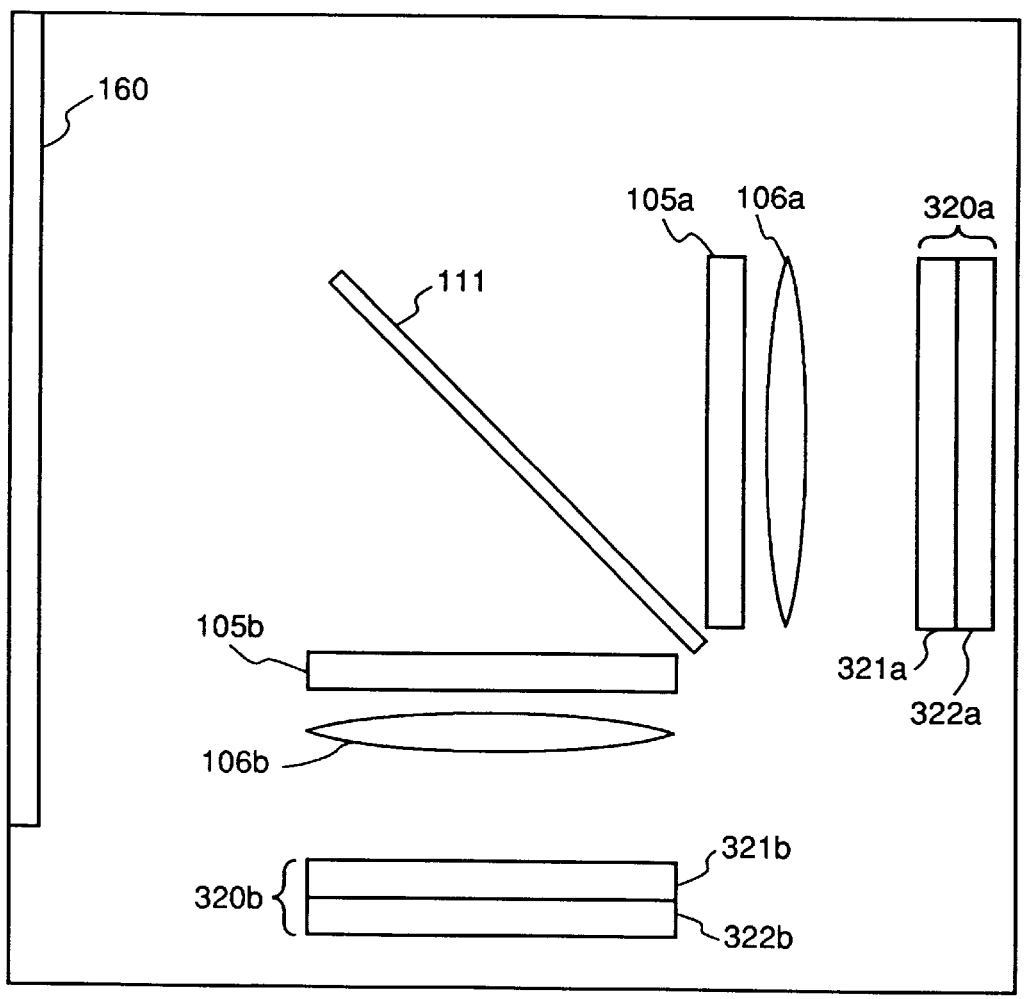
F I G. 50

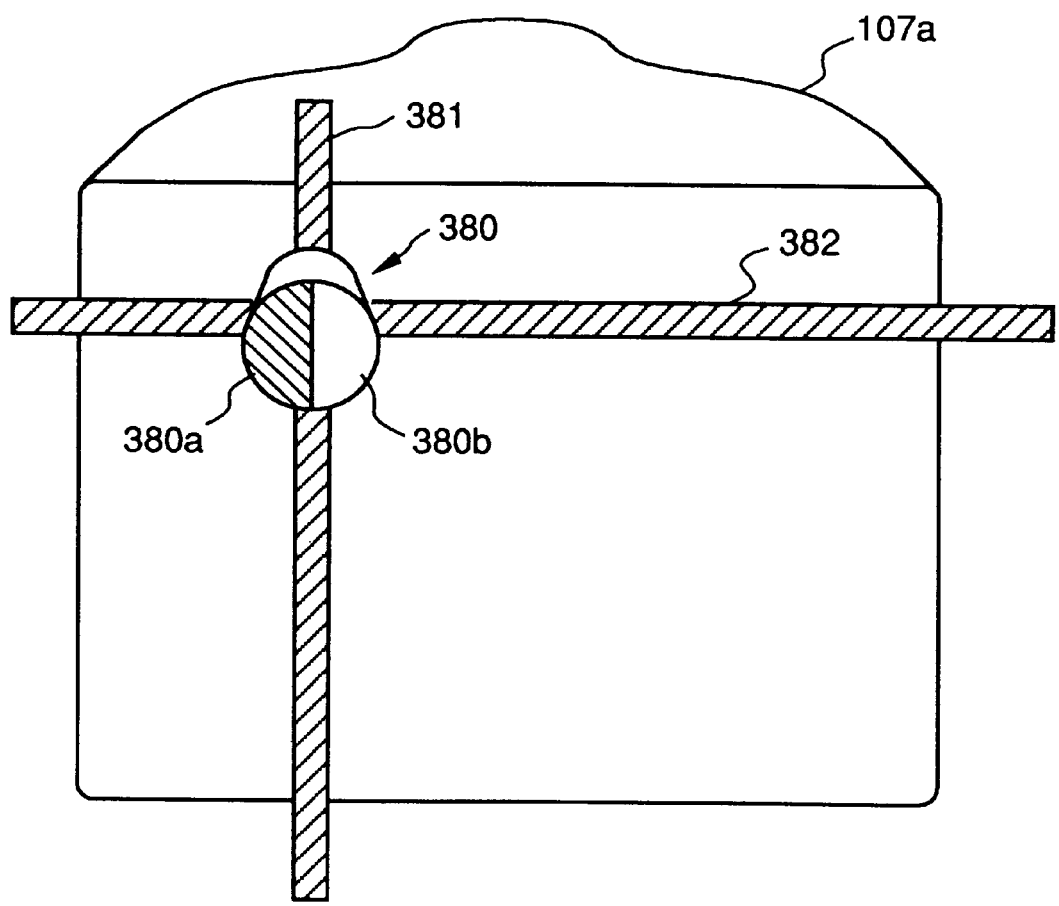
F I G. 54

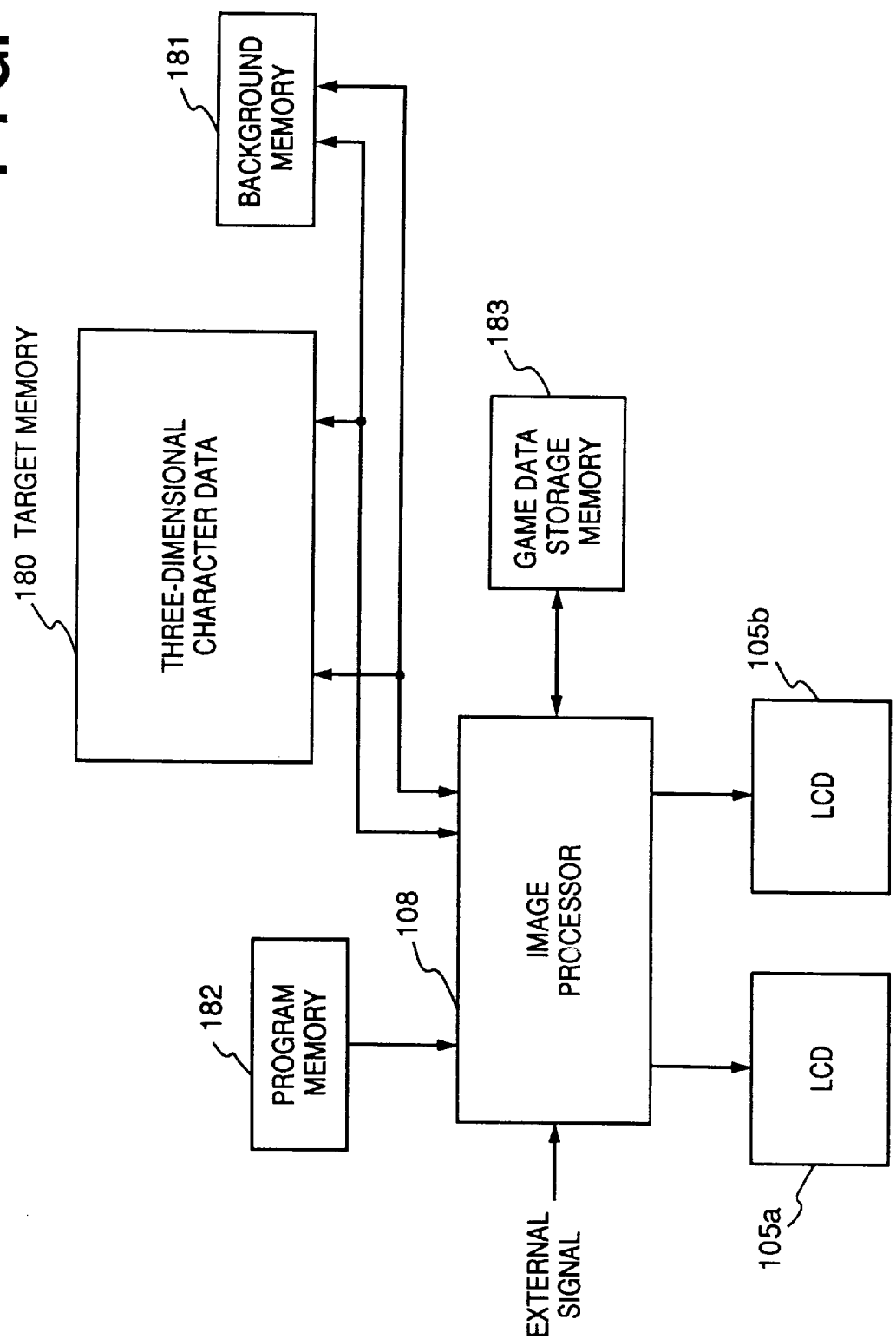

STEREOSCOPIC-IMAGE GAME PLAYING APPARATUS

This application is a continuation of Application No. 08/743,415, filed Nov. 1, 1996, abandoned, which is a continuation of Application No. 08/385,542, filed Feb. 8, 1995 now abandoned.

BACKGROUND OF THE INVENTION

Present invention relates to a stereoscopic-image game playing apparatus used for the commercial and domestic purposes.

Generally, a conventional stereoscopic-image game playing apparatus as disclosed in Japanese Patent Application Laid-Open No. 63-12777 displays a screen image for right eye (hereinafter referred to as "screen image (R)") and a screen image for left eye (hereinafter referred to as "screen image (L)") on an image display screen in a time-divisional manner. A player sees the screen image (R) with the right eye, and the screen image (L) with the left eye, by wearing glasses having a function for separating the screen images to the right eye and left eye of the player. As a result, the player can see a stereoscopic image.

FIG. 1 shows one example of the construction of the conventional stereoscopic-image game playing apparatus. Reference numeral 60 denotes glasses having a function for separating the screen images to the right eye and the left eye of the player; 61a and 61b, liquid crystal shutters; 62, a synchronous circuit; and 63, a color CRT as an image display device.

The operation of the conventional stereoscopic-image game playing apparatus having the above construction will be described. The color CRT 63 alternatively displays the screen image (R) and the screen image (L) in a time-divisional manner. The synchronous circuit 62 controls the glasses 60 so that only when the screen image (R) is displayed, the liquid crystal shutter 61a opens to pass the light from the screen image (R), while only when the screen image (L) is displayed, the liquid crystal shutter 61b opens to pass the light from the screen image (L). The player wearing the glasses 60 sees the screen image (R) with the right eye and the screen image (L) with the left eye, thus is given stereoscopic vision.

However, according to the inventors of the present invention, to cause the player to see the screen image (R) with the right eye and the screen image (L) with the left eye independently, the above conventional stereoscopic-image game playing apparatus always requires glasses for separating the screen images to the right eye and the left eye of the player. The glasses bother the player.

Further, the screen image (R) and the screen image (L) must be alternatively displayed in a time-divisional manner, flicker occurred while displaying the images disturbs the stereoscopic vision.

Moreover, if the stereoscopic-image game playing apparatus is used in such a game spot where many and unspecified persons gather, a problem occurs because the glasses might be stolen. For this reason, only a few stereoscopic-image game playing apparatuses have been put into practical use.

SUMMARY OF THE INVENTION

The present invention has been made to solve the drawbacks in the conventional art, and has as its object to provide a stereoscopic-image game playing apparatus which enables a player to obtain stereoscopic vision without glasses having a function for separating screen images for the right eye and the left eye of the player, and which enables a plurality of players to obtain stereoscopic vision simultaneously.

The above object is attained by providing:

a game playing apparatus for displaying a stereoscopic image comprising:

a target memory for storing image data on a game character;

an image processor for generating a first game image and a second game image both for stereoscopic vision based on the image data stored in said target memory, in accordance with a predetermined game program;

at least one image display means for displaying the first and second game images generated by said image processor; and light guide means for distributing the first game image and the second game image displayed on said image display means to the right eye and the left eye of a player.

Another object of the present invention is to provide a stereoscopic-image game playing apparatus which selectively separates light from a first game and light from a second game using a figure generated based on an image of the player's face, to introduce the lights from the first and second games respectively to the right and left eyes of the player.

The above object is attained by providing the apparatus further comprising:

image sensing means for image-sensing the player to obtain an image of the player; and generation means for generating at least one figure indicative of a position of one of the right eye and a position of the left eye of the player, based on the player's image obtained by said image sensing means, wherein said light guide means selectively distributes the first and second game images based on the figure generated by said generation means to the right and left eyes of the viewer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7 and 8 are explanatory views respectively showing the operation of a backlight control figure in the first embodiment;

FIG. 33 is a perspective view showing of a stereoscopic-image game playing apparatus according to a ninth embodiment of the present invention;

FIGS. 42 and 43 are explanatory views of generation of a backlight control figure used in the twelfth embodiment;

FIG. 50 illustrates a casing containing the stereoscopic-image game playing apparatus of the fifteenth embodiment;

FIG. 54 is a front view showing the construction of a backlight device in a sixteenth embodiment of the present invention;

FIG. 59 is a block diagram showing a construction for generating screen images according to a seventeenth embodiment of the present invention.

DETAILED DESCRIPTION OF THE PREFERRED EMBODIMENT(S)

Preferred embodiments of the present invention will be described in detail in accordance with the accompanying drawings.

First Embodiment

Figure 1:
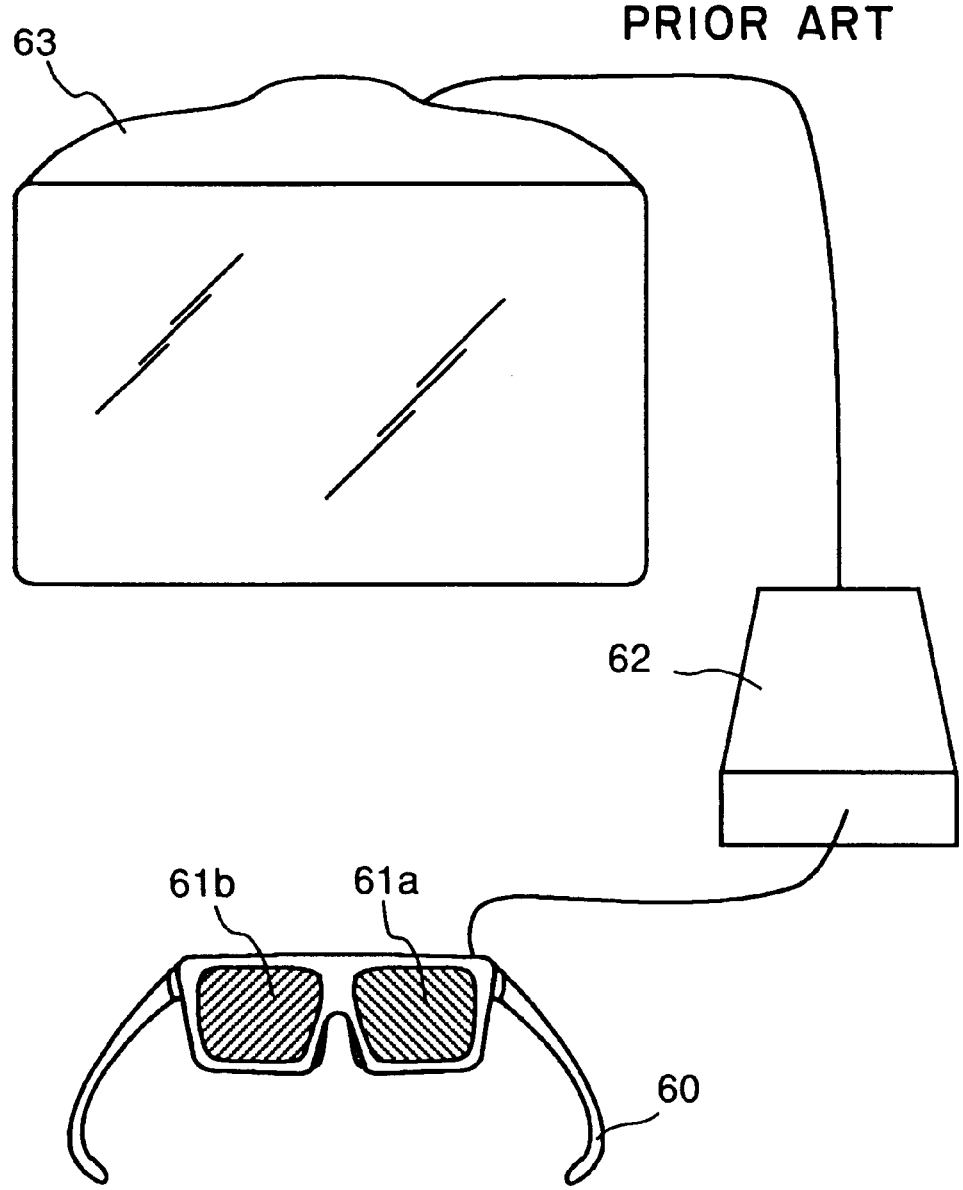
FIG. 1 is a perspective view showing of the conventional stereoscopic-image game playing apparatus.
Figure 2:
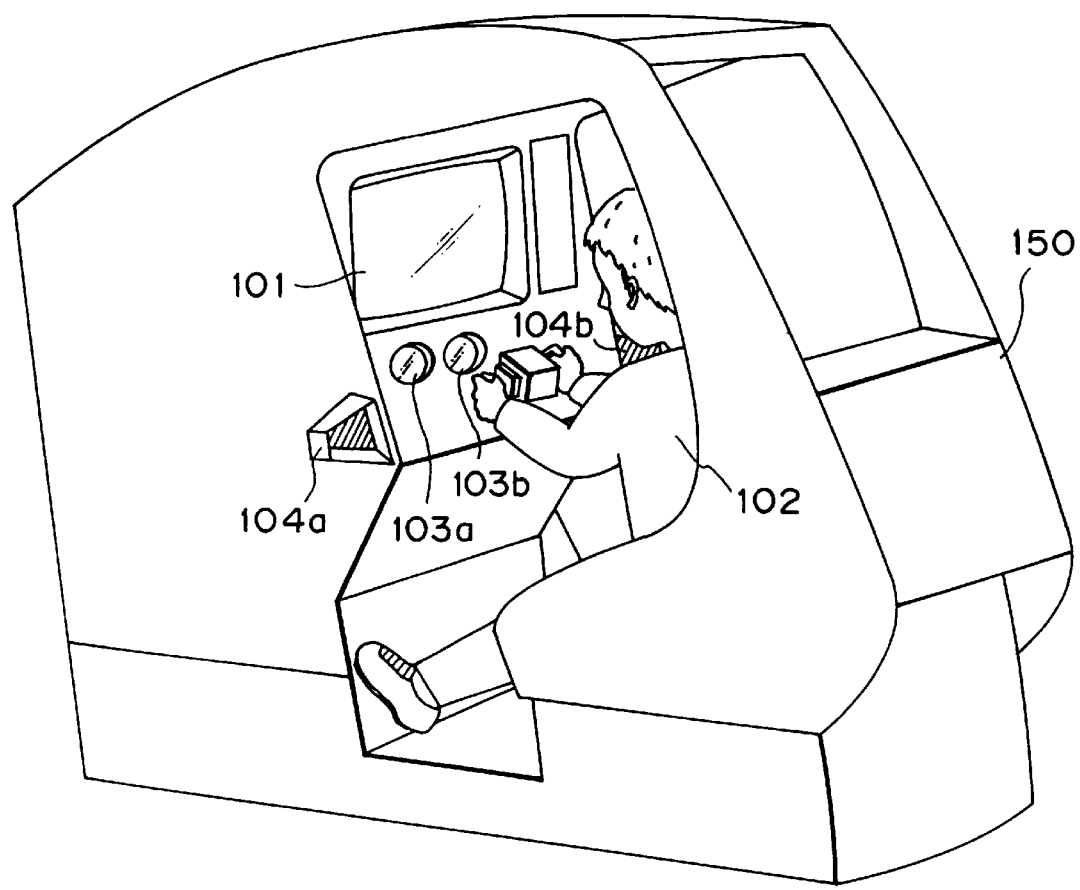
FIG. 2 is a perspective view of a stereoscopic-image game playing apparatus according to first to sixth embodiments of the present invention.

FIGS. 2 shows the overview of a stereoscopic-image game playing apparatus according to a first embodiment of the present invention.

The apparatus according to the first embodiment comprises a plurality of displays. The displays are set "normally" unless otherwise specified. It is meant by "normally" that a luster scan starts at an upper left point of the display screen of the "normally" set display when it is set upright. If a display is set with the screen surface placed horizontally, a luster scan starts at an upper left point (from the view point of viewer) of the screen surface of the "normally" set display. In the figures, arrows "→" and indicators "(s)" are used to describe another method of setting the displays, which will be described later.

In FIG. 2, reference numeral 150 denotes a casing containing the stereoscopic-image game playing apparatus, for protecting the apparatus from extraneous light; 101, a display field for displaying screen images; 102, a player who plays with a game program; 103*a* and 103*b*, CCD cameras as image sensing devices respectively for obtaining an image of the player's face; and 104*a* and 104*b*, LED's for irradiating the player's face.

In the present specification, an objective image which are seen by the right or left eye of viewer for stereoscopic vision are referred to as "screen image". Therefore, "screen images" are not limited to images which are displayed on a screen, they encompasses images on films.

Figure 3:
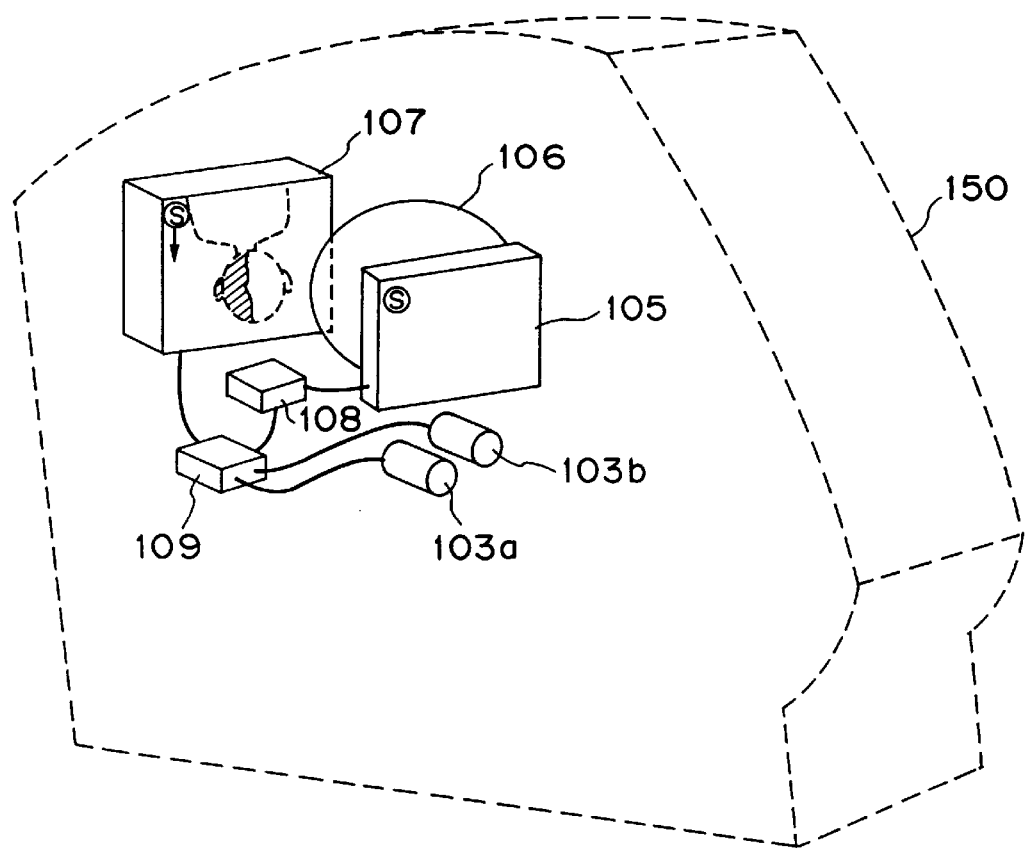
FIG. 3 is a perspective view showing of the stereoscopic-image game playing apparatus of the first embodiment.

FIG. 3 shows the construction of the stereoscopic-image game playing apparatus in FIG. 2. In FIG. 3, numeral 105 denotes a light-transmitting type liquid crystal display (LCD) as a space modulator; 106, a convex lens having a 150 mm focal distance located behind the LCD 105; 107, a monochromatic CRT as a display device for displaying backlight control figures (to be described later) for backlight irradiation, located at positions 160 mm (longer than the focal distance of the lens 106) distant from the lens 106, opposite to the LCD 105; 108, an image processor; 109, a time-division synchronous circuit; and 150, a casing of the apparatus.

The operation of the stereoscopic-image game playing apparatus having the above construction will be described with reference to FIG. 3. The image processor 108 outputs an image for the right eye of the player (screen image (R)) and an image for left eye of the player (screen image (L)) for stereoscopic vision, and the LCD 105 alternatively displays the screen image (R) and (L) in a time-divisional manner. The player sees the screen image (R) with the right eye and the screen image (L) with the left eye, thus obtains stereoscopic vision. Preferably, the time-division display is made by alternatively displaying 10–25 frames per one second. If the number of frames is less than ten, the displayed image has flicker of an unbearable level. If the number of frames is more than twenty-five, the LCD 105 cannot display images at a required speed, which may result in crosstalk of screen images, e.g., a screen image (R) is seen by the left eye.

The images of the player's face obtained by the CCD cameras 103*a* and 103*b* are outputted as backlight control figures to the CRT 107, in synchronization with the time-division output timing of the LCD 105 by the time-division synchronous circuit 109.

Next, description will be made about the backlight control figures. The LCD 105 which displays game images needs a backlight source. The CRT 107 functions as the backlight for the LCD 105. In the present embodiment, to enable stereoscopic vision, the image processor 108 generates a backlight control figure for right eye (hereinafter referred to as "backlight control figure (R)") and displays the backlight control figure (R) on the CRT 107 when the LCD 105 displays the screen image (R), on the other hand, the processor 108 generates a backlight control figure for left eye (hereinafter referred to as "backlight control figure (L)") and displays the backlight control figure (L) on the CRT when the LCD 105 displays the screen image (L).

The backlight control figure is made using the images of the player 102's face, obtained by the CCD cameras 103*a* and 103*b*, respectively corresponding to the right half face irradiated by the LED 104*a* and left half face irradiated by the LED 104*b*. To obtain only the right half face area irradiated by the LED 104*a* as a separate right-half face figure and only the left half face area irradiated by the LED 104*b* as a separate left-half face figure, wavelength band filters may be attached to the CCD cameras 103*a* and 103*b* for selective sensing in accordance with the wavelengths of the LED's 104*a* and 104*b*. Thus, the wavelength band filters enable the cameras 103*a* and 103*b* to selectively obtain the right-half face image and the left-half face image.

Figure 4:
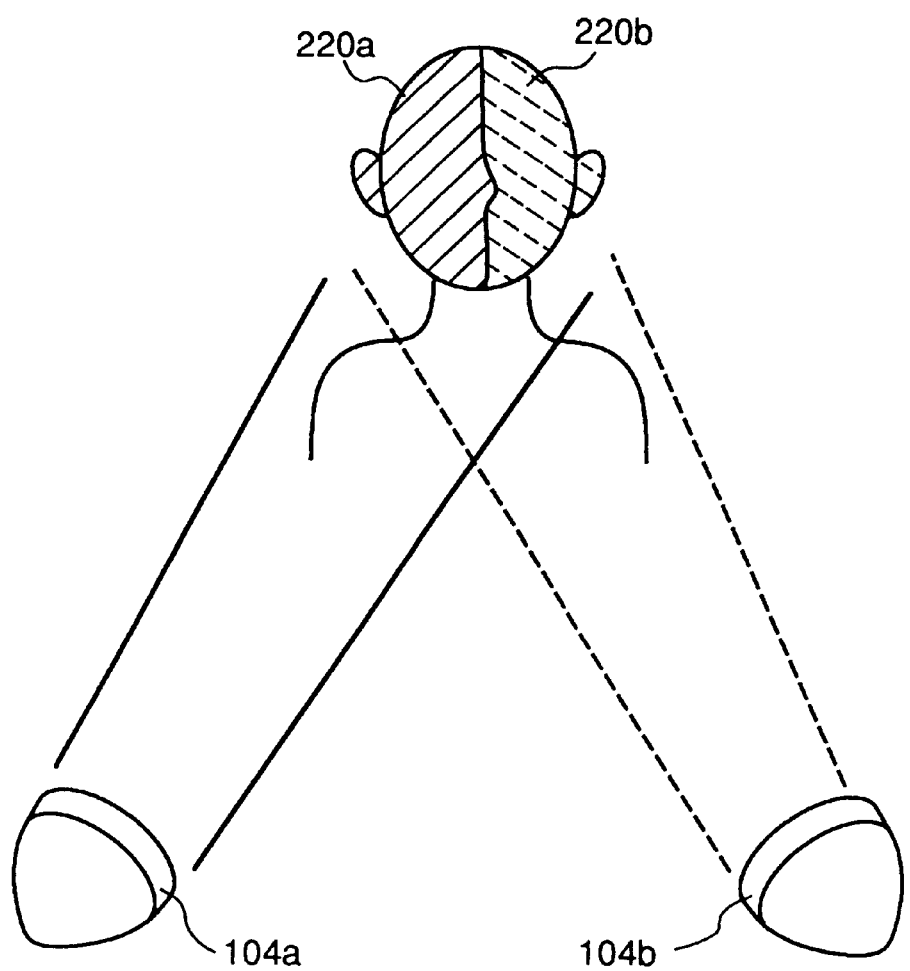
FIG. 4 is an explanatory view of a principle according to the first embodiment to obtain images of a player's face.

FIG. 4 shows the player irradiated by the LED's 104*a* and 104*b*. In the player's face, an area 220*a* is irradiated by the LED 104*a*, while an area 220*b* is irradiated by the LED 104*b*. In consideration of the fact that the top plan view of a human head is oval-shaped, the LED's 104*a* and 104*b* are set at two positions away from each other in a transverse direction to generate the right-half face area 220*a* and the left-half face area 220*b* by irradiating the player's face from the right hand and the left hand. Further, in consideration of crossing of sights of the areas 220*a* and 220*b* viewed through the lens 106, the areas 220*a* and 220*b* are irradiated respectively corresponding to the right eye and left eye of the player. In other words, the areas 220*a* and 220*b* can be taken separately, so that they are used as a backlight control figure (R) for right eye and a backlight control figure (L) for left eye.

Figure 5:
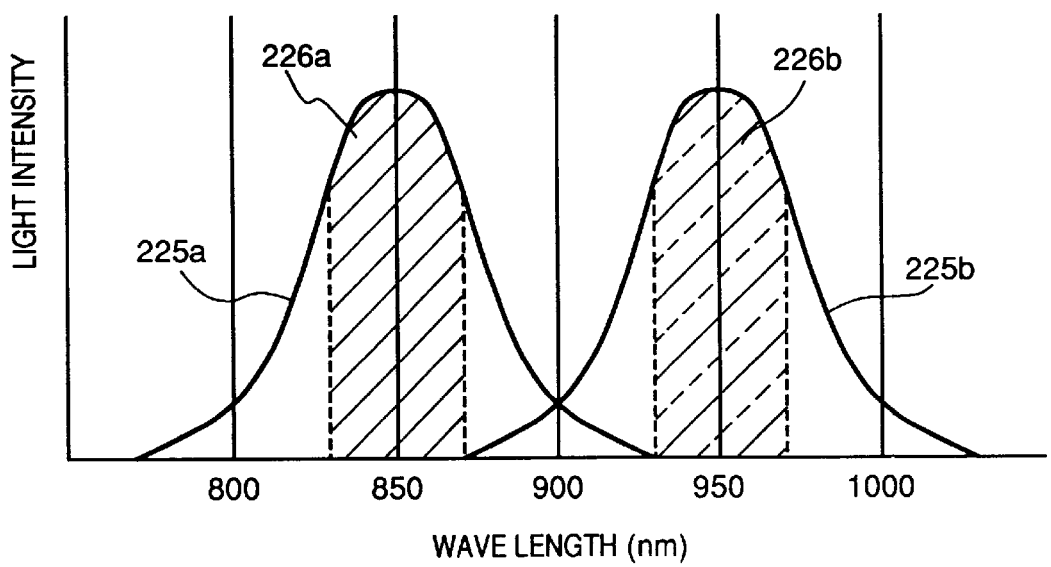
FIG. 5 is a graph showing wavelength bands of irradiation devices for image sensing of the player.

FIG. 5 shows light emitting characteristics of the LED's 104*a* and 104*b*, where a line 225*a* represents the wavelength distribution of the LED 104*a*; a line 225*b*, the wavelength distribution of the LED 104*b*; an area 226*a*, a wavelength band where light passes through an interference filter 231*a* attached to the CCD camera 103*a*; and an area 226*b*, a wavelength band where light passes through an interference filter 231*b* attached to the CCD camera 103*b*.

Figure 6:
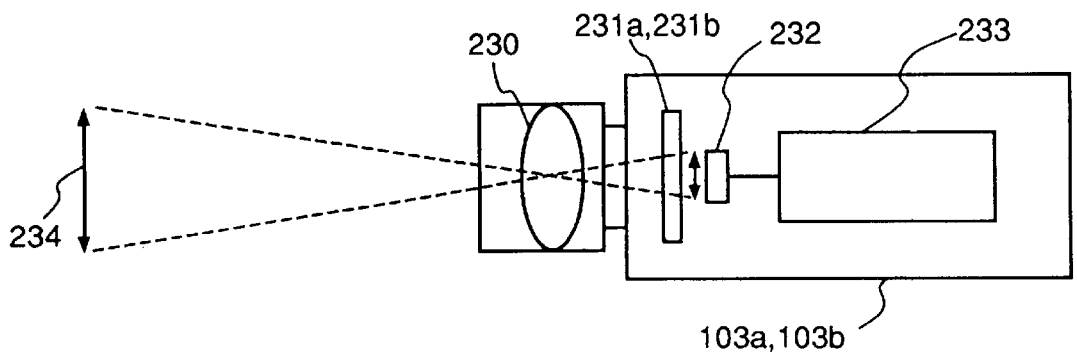
FIG. 6 is a cross-sectional view showing the construction of a camera for image sensing of the player.

FIG. 6 shows the cross section of the CCD cameras 103*a* and 103*b*. In FIG. 6, numeral 230 denotes a lens; 231*a* and 231*b*, interference filters as wavelength band filters; 232, an image sensing device having a CCD chip; 233, a driver for the image sensing device; and 234, an object of image sensing. When image sensing of the player is made by the CCD camera 103*a* with the interference filter 231*a*, the obtained image corresponds only to the area 220*a*, while when image sensing is made by the CCD camera 103*b* with the interference filter 231*b*, the obtained image corresponds only to the area 220*b*.

Next, the operation of the convex lens 106 will be described. The convex lens 106 is set so that the player sees the 180° turned backlight control figures on the LCD as virtual images. As the distance between the convex lens 106 and the LCD 107 is longer than the focal distance of the lens 106, the right/left-half face areas displayed on the LCD 107 (backlight control figures (R) and backlight control figure (L)) are enlarged within the effective diameter of the lens 106 to the player's right/left eyes. As shown in FIGS. 7 and 8, the backlight control figure (R) functions as illumination of a size corresponding to the effective diameter of the convex lens 106 for the player's right eye. At this time, as the left-half face area does not emit the backlight, the light from the LCD 107 does not enter the player's left eye. When the backlight control figure (L) is displayed, the left-half face area emits the backlight, as illumination of a size corresponding to the effective diameter of the convex lens 106 for the player's left eye. At this time, as the right-half face area does not emit the backlight, the light from the LCD 107 does not enter the player's right eye.

The monochromatic CRT 107 displays the backlight control figure (R) and backlight control figure (L), obtained from image sensing the player's face by the CCD cameras 103*a* and 103*b*, inverted only upside down, in consideration of directivity of the convex lens 106. Note that the luminance and contrast of the CRT 107 has been adjusted in advance to display the right/left half-face areas with high luminance.

The advantage of the displaying the backlight control figures turned upside down on the CRT 107 is as follows.

Figure 9:
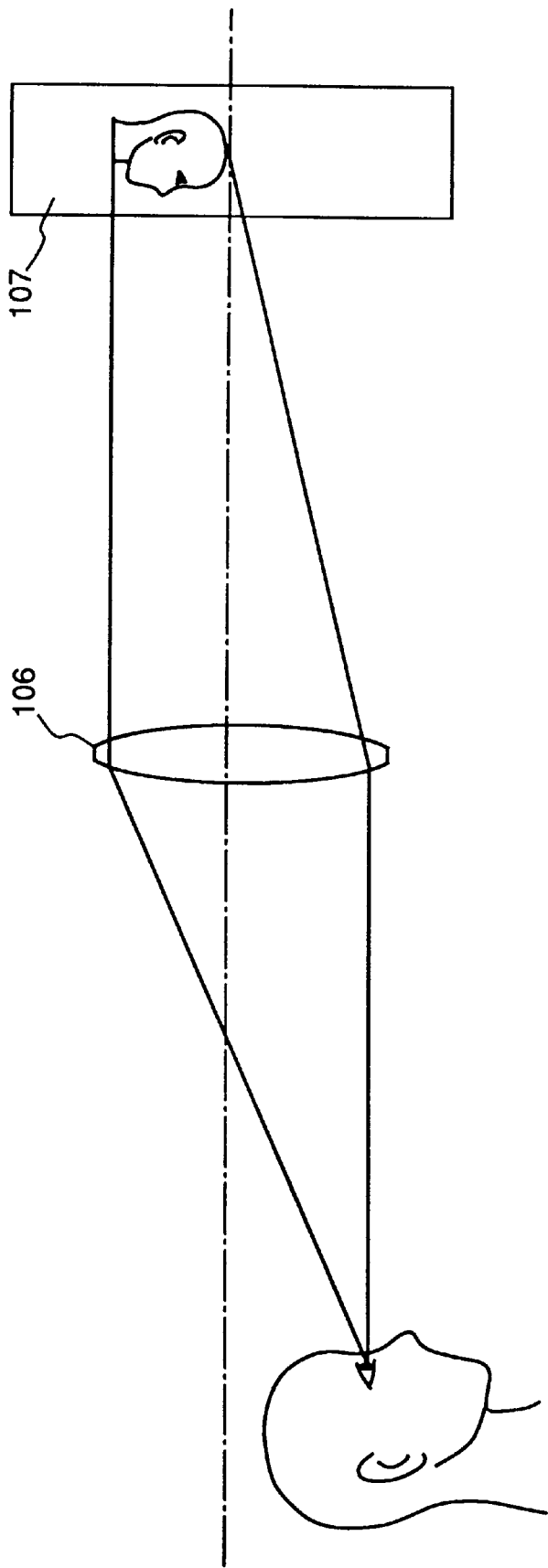
FIG. 9 is an explanatory view of displaying the backlight control figure upside down.

In FIG. 9, the backlight control figure is displayed inverted only upside down on the LCD 107. The reason for this display is that the convex lens 106 gives directivity to transmitting light. The player may move in a vertical direction. If the player moves in a downward direction (e.g., if the player crouches a little), the LCD 107 must display the backlight control figure at a position shifted in an upward direction. On the other hand, if the player moves in the upward direction (e.g., if the player stands up a little), the LCD 107 must display the backlight control figure at a position shifted in the downward direction. That is, when the player moves in an up-and-down direction, the backlight control figure must be displayed at a position shifted in a direction opposite to the direction of the player's movement. To achieve this, the LCD 107 may display the backlight control figure inverted only upside down. Thus, as the backlight control figure is inverted only upside down, when the player's face is on the light axis of the lens 106, the backlight control figure is displayed at a position on the LCD 107 on the extended light axis; when the player moves to a lower position from the light axis of the lens 106, the LCD 107 displays the backlight control figure at an upper position from the light axis; and when the player moves to an upper position from the light axis, the LCD 107 displays the backlight control figure at a lower position from the light axis. Thus, turning a backlight control figure upside down allows to follow the movement of the player in an up-and-down direction.

In the above-described operation of the present apparatus, the screen image (R) displayed on the display field 101 in FIG. 2 is backlighted to be visible to the player's right eye (see FIG. 7), and the screen image (L) displayed on the display field 101 is backlighted to be visible to the player's left eye (see FIG. 8), thus the player is given a stereoscopic vision. If the player moves, the backlight control figures displayed on the LCD 107 move corresponding to the movement of the player, thus the stereoscopic vision is continued.

Figure 12:
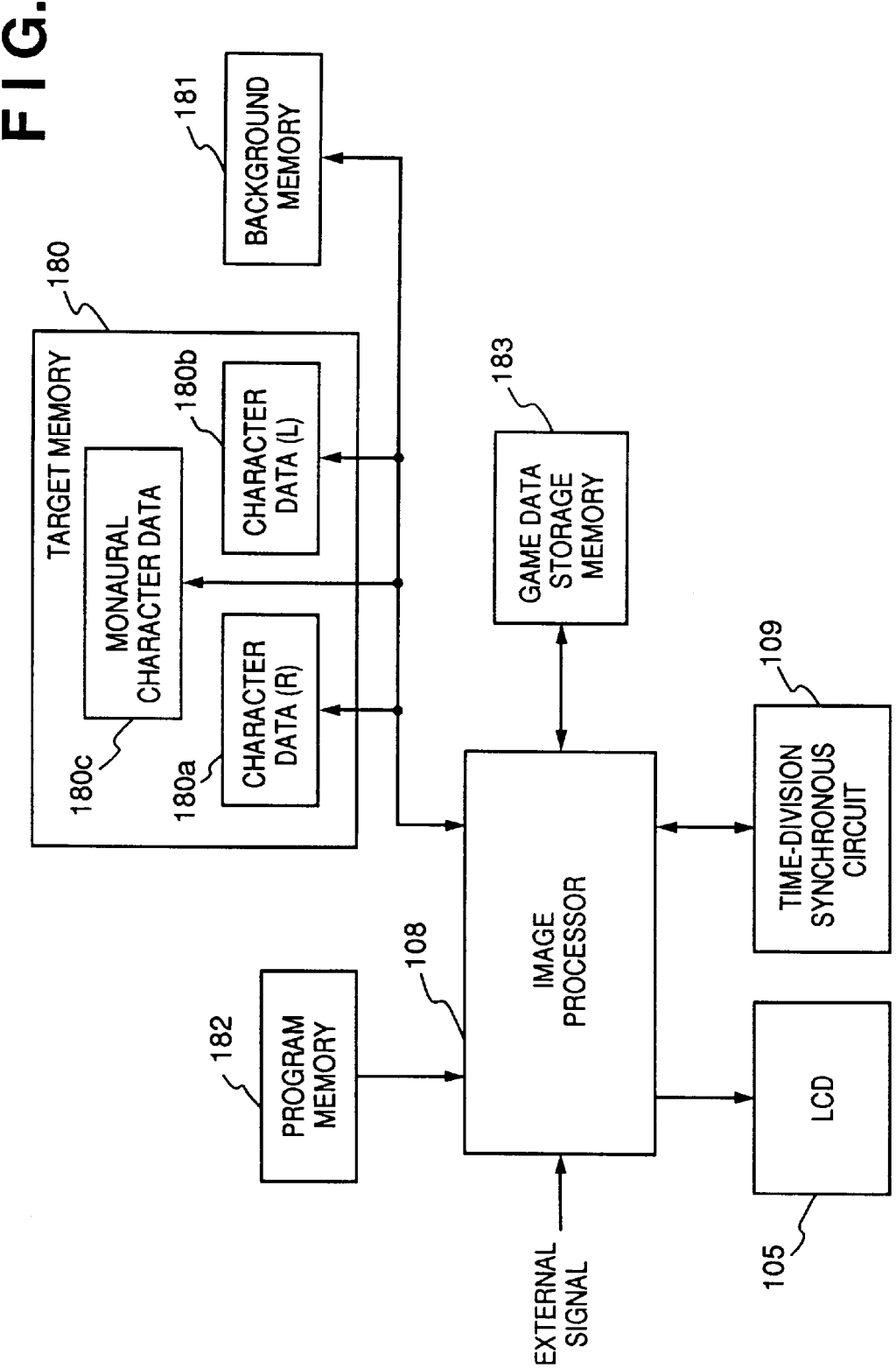
FIG. 12 is a block diagram showing the construction of a system for controlling image display according to the first embodiment.

FIG. 12 is a block diagram showing the construction of a system for controlling an image display in the first embodiment. The operation of the stereoscopic-image display control will be described with reference to FIG. 12.

As shown in FIG. 12, the stereoscopic-image display control system has the image processor 108 and a target memory 180, a background memory 181, a program memory 182 and a game-data storage memory 183. The target memory 180 is used for storing-various-information data on respective game characters as "targets" appear in the game image. A game program controls the movements of the game characters as "targets" using a computer graphic technique. More specifically, the targets are respectively assigned to the characters, and the movements of the targets are controlled. The shape and movement characteristic of character are determined in advance as library, and the shape of the character is displayed at a position of the target on the display without displaying the targets.

The target memory 180 has an area 180*a* for storing character data for right eye (hereinafter, referred to as "character data (R)"), an area 180*b* for storing character data for left eye (hereinafter referred to as "character data (L)") and an area 180*c* for storing character data on a character which appears as a monaural image (hereinafter "monaural character"). Note that "monaural character" is one which does not play an important role in the progress of a game, e.g., a character appears in a distant view. The background memory 181 is used for storing background data.

The screen image (R) includes the character data (R), read out of the memory area 180*a* in accordance with the game program, and if necessary, the monaural character data, read out of the memory area 180*c* in accordance wit the game program, on background data read out of the image area 181. The screen image (L) includes the character data (L), read out of the memory area 180*b* in accordance with the game program, and if necessary, the monaural character data, read out of the memory area 180*c* in accordance with the game program, on the background data read out of the image area 181. The image processor 108 controls the execution of the game program.

The game program is stored in the program memory 182. The image processor 108 performs calculation for the game images (screen image (R) and screen image (L)), and, based on the results from the calculation, outputs the game images formed from the target memory 180 and the background memory 181 to the LCD 105. Upon outputting the game images to the LCD 105, the character data (R) and the character data (L) are outputted in a time-divisional manner in accordance with the timing generated by the time-division synchronous circuit 109. The time-division display is not applied to the monaural character data and the background data which are not for stereoscopic vision. The contents of the game changes in correspondence with the player's operation, inputted as an external signal into the image processor 108. The signal indicative of the player's operation is stored into the game data storage memory 183.

Displaying arrangement of screen images and control figures on the displays according to the present embodiment will be explained below.

The lens 106 functions to give directivity to light of an image where the light is turned upside down. Therefore, the backlight control figures should be inputted to the display 107 with inverted upside down only. Note that the control figures are not required to be subjected to turning over process in the right to left direction because they are automatically displayed with turned over in the direction.

The screen images are inputted to the display 105 in an upright manner, because the display 105 is positioned in the front of the lens 106.

The CRT's and LCD's are an electronic display. They are able to display inverted images the data of which are electronically inverted in longitudinal and right-to-left directions. Such inversions can be made just by rotating the display body by 180 degrees.

Further example as to how to achieve displaying arrangement of screen images and control figures according to the first embodiment will be described below. In FIG. 3, the displays 105, 107 are indicated with a indicator "Ⓢ". The indicators mean a starting point of luster scanning on the respective displays. For example, the display 107 for the control figure luster-scans from the upper left position in a left to right direction. The display 105 for the screen image also luster-scans from the upper left position in a left to right direction. Further, in FIG. 3, arrows. For example, the arrow attached to display 107 means that an electronic data inversion is made in the direction indicated by the arrow, namely in a vertical direction.

According to such indications, when data of screen images are normally inputted to the display 105, they are displayed on the display 105 normally. As the image data of the control figures are inputted into the display 107 with the data inversion only in the vertical direction, the control figure R which is displayed on a relatively left region of the display 107 ensures the R screen image to track the right eye, while the control figure L which is displayed on a relatively right region of the display 108 ensures the L screen image to track the left eye. The control figures R and L which are displayed on the display 107 with turned in the vertical direction ensures the R and L image screens to follow the movement of the viewer in the vertical direction.

<Modifications to First Embodiment>
  =First Modification=

The first embodiment has two image sensing devices to obtain the right-half face image and the left-half face image of the player. The right/left-half face images may be obtained with one image sensing device. That is, one (right or left) half-face image obtained by one image sensing device is displayed on the CRT as a backlight control figure for one eye, and another one half-face image, obtained by negative/positive inverting the former half-face image may be displayed on the CRT as another backlight control figure for opposite eye.

Next, the negative/positive inversion by the image processor will be described. Assuming that the resolution of the cameras 103*a* and 103*b* is eight bits, the density level of an image signal outputted from the cameras 103 is "0" to "255". The negative/positive inversion is made by calculating the complement of the density level of the image signal from the cameras 103*a* and 103*b*. For example, if the density level is "30", the "negative/positive inverted" complement value is "225".

Figure 10:
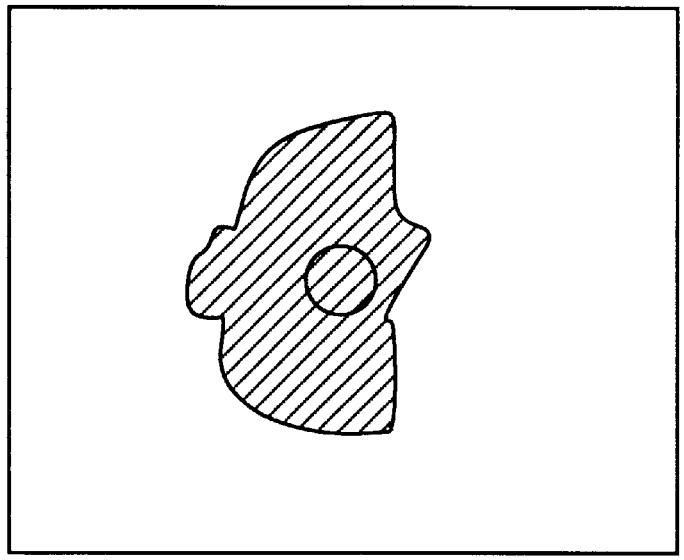
FIGS. 10 and 11 are explanatory views of generating a negative/positive inverted image in a modification to the first embodiment.

The image of the player's right half face is displayed on the CRT 107 as a backlight control figure (R) when the screen image (R) is displayed on the LCD 105*a*. FIG. 10 shows the backlight control figure (R) of one player. In FIG. 10, the image is upside down for the same reason as stated in the first embodiment. In the backlight control figure (R), the pixel values of the hatched area are "1" (i.e., area corresponding to the irradiated right half face). In the backlight control figure (R) displayed on the CRT 107, the right-half face area (the hatched area) passes the backlight, and the light passed through the CRT 107 functions as backlight to the player's right eye.

Figure 11:
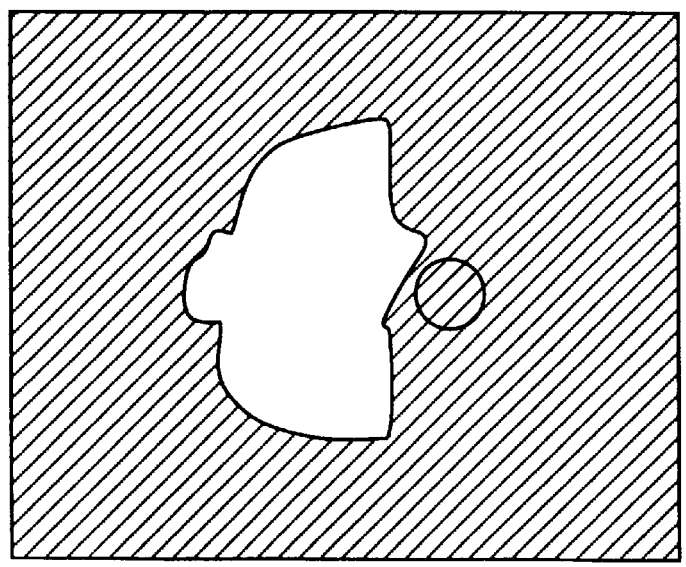

FIG. 11 shows a figure negative/positive-inverted from the backlight control figure (R). In FIG. 11, an area corresponding to the left eye is bright. The CRT 107 displays this figure as a backlight control figure (L), and emits backlight through the area corresponding to the left-half face to the player's left eye. This negative/positive-inverted backlight control figure (L) can fulfill the same function as that of the backlight control figure (L) in the first embodiment.

In generation of backlight control figure, it is advantageous that both of backlight control figure (R) and backlight control figure (L) may be generated from one of the player's images obtained by the cameras 103*a* and 103*b*.

=Second Modification>=

In the first embodiment, LED's 104*a* and 104*b* emit lights of two wavelengths to obtain right/left-half face images from image sensing the player by the cameras 103*a* and 103*b* which have sensitivity to the wavelengths for selective sensing. In this modification, an image processor having a small-sized liquid crystal display, different from the image processor 108, is connected to the time-division synchronous circuit 109. In this construction, the player's image is displayed on the small-sized liquid crystal display, and coordinates of illuminated points on the LCD are detected, and a pair of backlight control figure (R) and backlight control figure (L) are generated. This modification requires only one camera and only one irradiation device.

Second Embodiment

Figure 13:
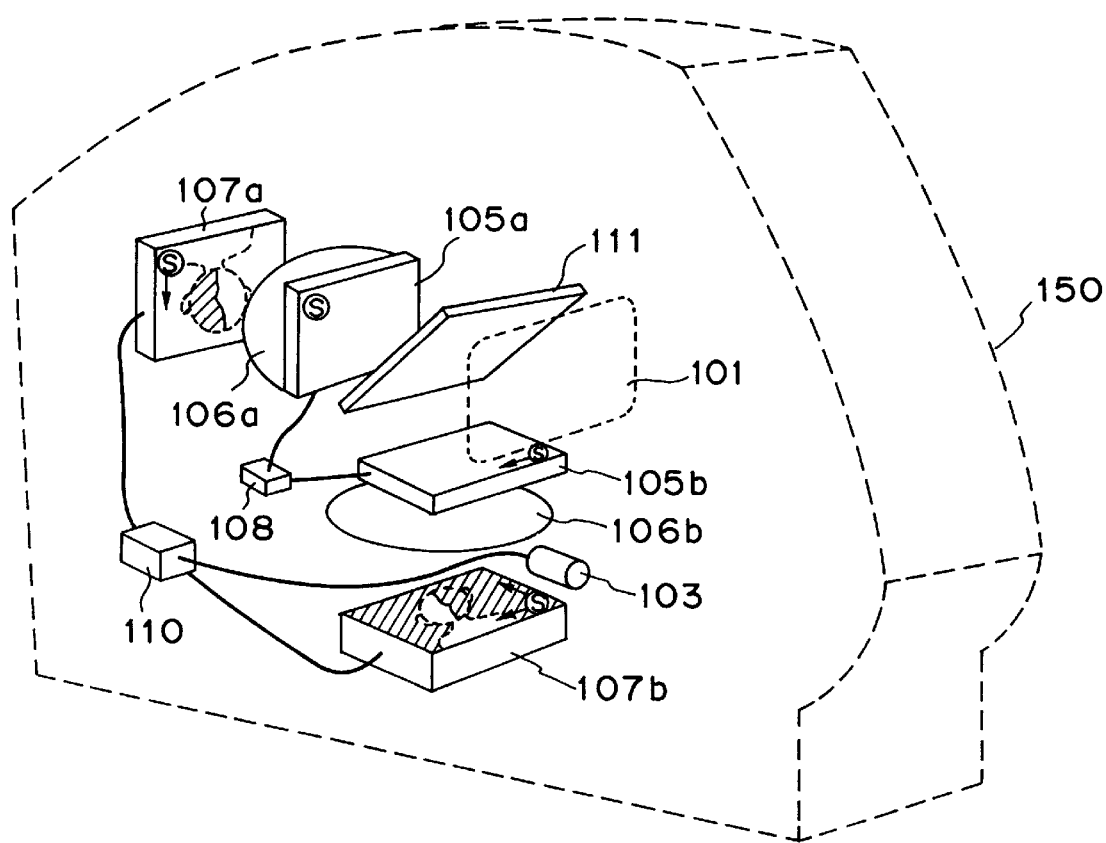
FIG. 13 is a perspective view showing of the stereoscopic-image game playing apparatus according to the second embodiment.

FIG. 13 shows the construction of a stereoscopic-image game playing apparatus according to a second embodiment of the present invention. The second embodiment has a similar overview to that of the first embodiment except that the second embodiment employs one camera and one irradiation device. However, the second embodiment does not employ the time-division display method, therefore employs two CRT's as backlight sources, two convex lenses to provide lights from screen images with directivity, two LCD's for displaying the screen images, and a half mirror for combining the screen image (R) and the screen image (L). Similar to the previous embodiments, in the apparatus according to the present embodiment comprises a plurality of displays. The displays are set "normally" unless otherwise specified.

In FIG. 13, numeral 103 denotes a CCD camera as an image sensing device; 105*a* and 105*b*, light-transmitting type LCD's as space modulators; 106*a* and 106*b*, convex lenses respectively having a 150 mm focal distance located behind the LCD's 105*a* and 105*b*; 107*a* and 107*b*, monochromatic CRT's for displaying backlight control figures for controlling backlight irradiation, located at positions 160 mm (longer than the focal distance of the lenses 106*a* and 106*b*) distant from the lenses 106*a* and 106*b*, opposite to the LCD's 105*a* and 105*b*; 108, a image processor; 110, a second image processor; and 111, a half mirror for combining the screen images displayed on the LCD's 105*a* and 105*b*.

The operation of the stereoscopic-image game playing apparatus having the above construction is basically the same as that of the apparatus shown in FIG. 3, therefore, the elements corresponding to those in the first embodiment have the same reference numerals, the explanations of these elements will be omitted, and only the difference from the first embodiment will be described.

The image signals indicative of the player's face images obtained by the cameras 103*a* and 103*b* are transferred to the second image processor 110, which generates a backlight control figure (R) and a backlight control figure (L). The monochromatic CRT's 107*a* and 107*b* display the backlight control figure (R) and the backlight control figure (L) respectively outputted from the second image processor 110, and the LCD's 105*a* and 105*b* display a screen image (R) and a screen image (L) outputted from the image processor 108.

Note that the backlight control figure (R) displayed on the CRT 107*a* is inverted only upside down for the same reason as stated in the first embodiment, and the screen image (L) displayed on the LCD 105*b* is turned upside down in consideration of the reflection by the half mirror 111.

The second image processor 110 displays a player's image on its internal small-sized LCD, detects coordinates of an illuminated area, and generates a pair of backlight control figure (R) and backlight control figure (L) corresponding to the right/left half faces of the player, using the negative/positive inversion as described in the first modification to the first embodiment.

Figure 14:
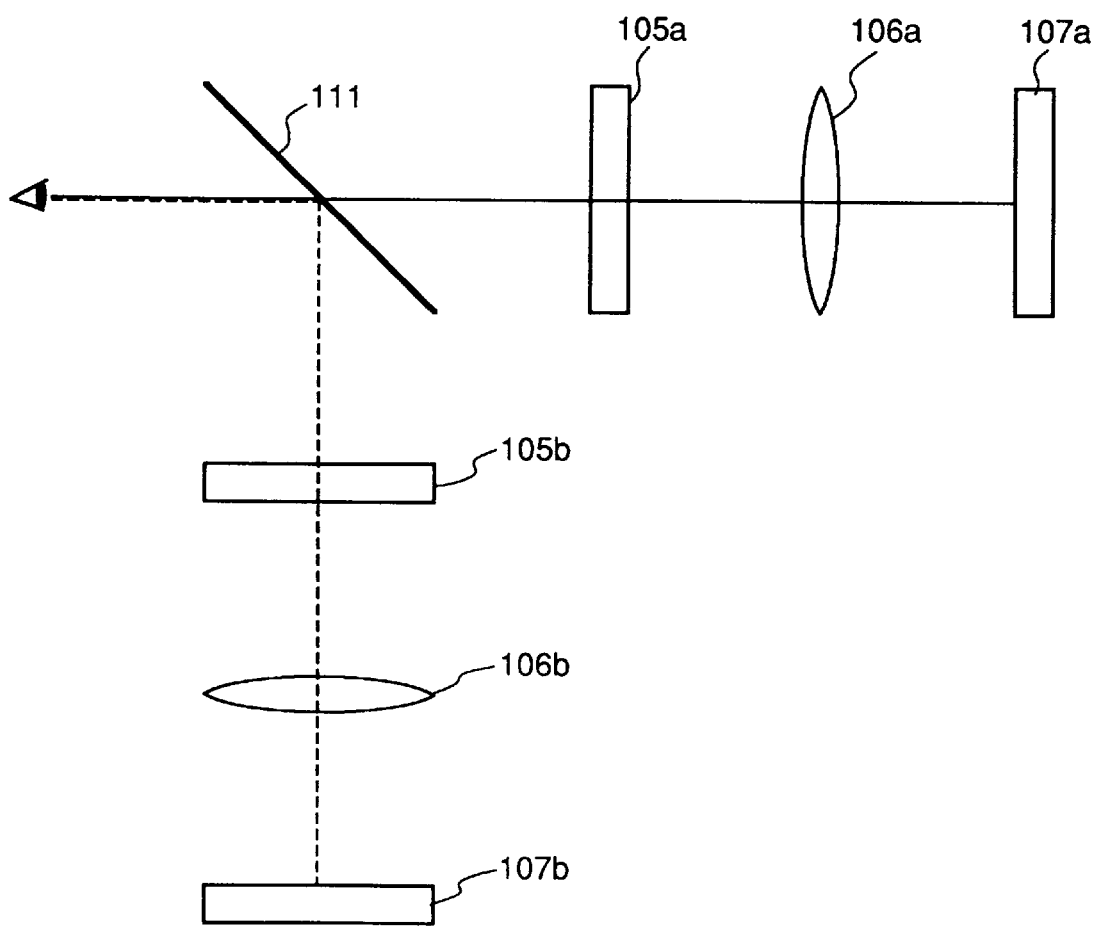
FIGS. 14 to 16 are explanatory views of optical paths in the second embodiment.
Figure 15:
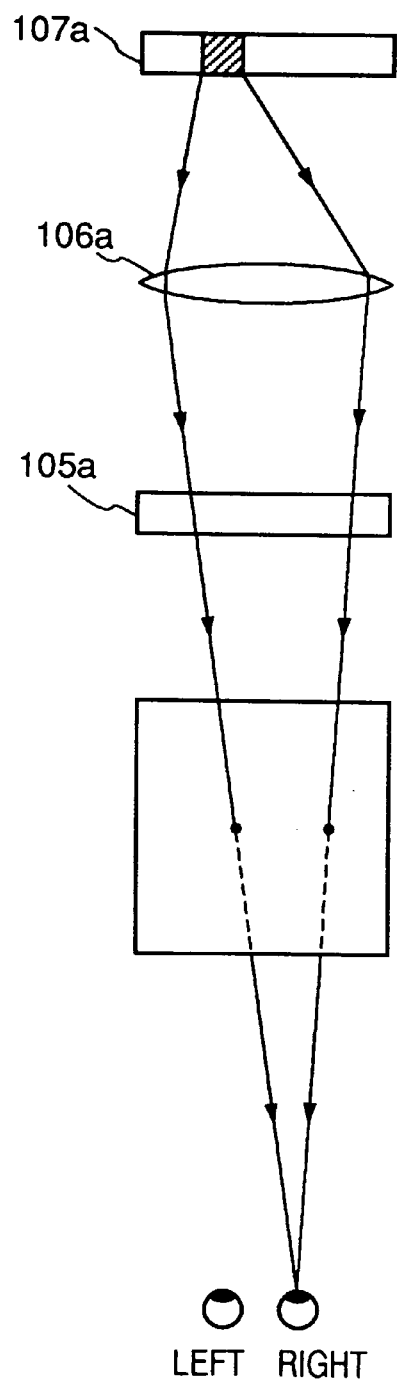
Figure 16:
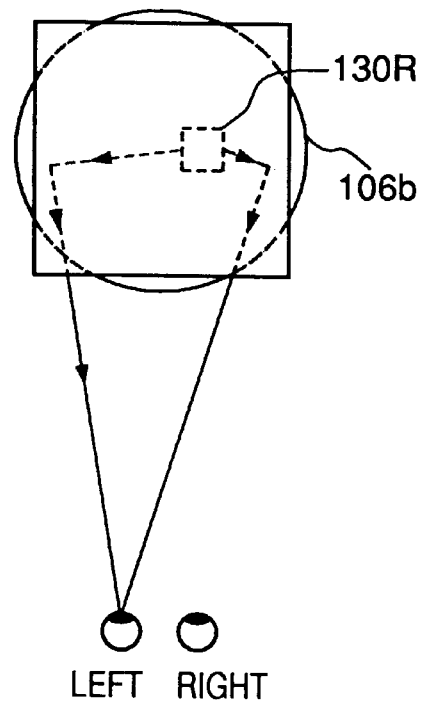

FIG. 14 shows optical paths from the inside of the stereoscopic-image game playing apparatus of the second embodiment to the player's eyes. FIG. 15 shows an optical path where the light from the screen image (R) displayed on the LCD 105a is backlighted with the backlight-control figure (R) displayed on the CRT 107a, and through the half mirror 111, introduced into the player's right eye. FIG. 16 shows an optical path where the light from the screen image (L) displayed on the LCD 195b is backlighted with the backlight control FIG. (L) displayed on the CRT 107b, reflected by the half mirror 111, and introduced into the player's left eye.

Figure 17:
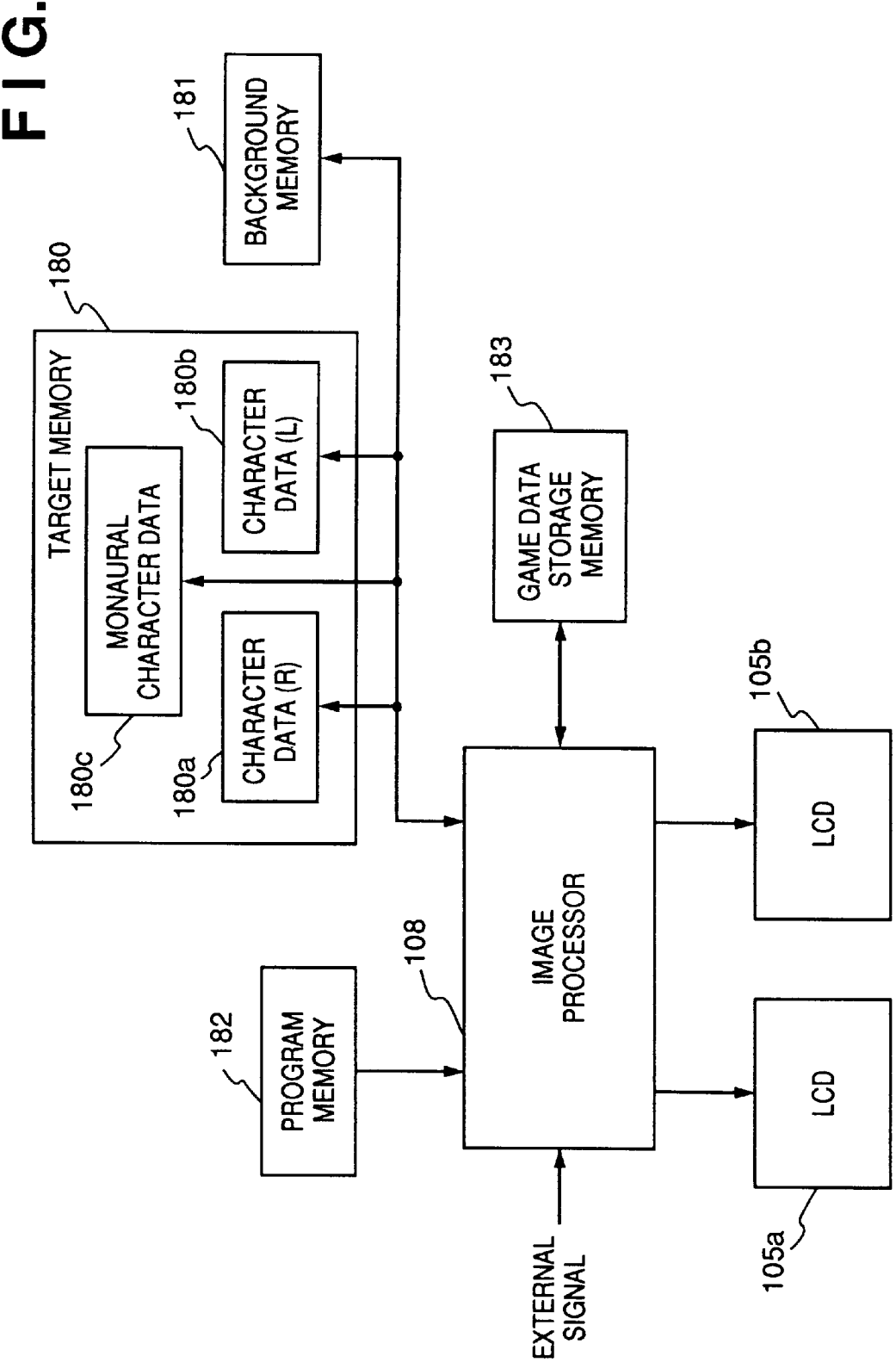
FIG. 17 is a block-diagram showing the construction of a system for controlling image display according to the second embodiment.

Next, the operation of the image processor 108 and the target memory 180 of the second embodiment for generating screen images will be described with reference to FIG. 17. In FIG. 17, the target memory is used for storing targets of respective game characters which appear in a game image. Regarding characters appear as stereoscopic images, character data (R) is stored in a memory area 180a, and character data (L) is stored in a memory area 180b. Monaural character data on a monaural character, e.g., a character which appears in a distant view as a monaural image, is stored in a memory area 180c. The image processor 108 reads these character data from the memory areas, and provides the read character data on background image data read out of a backlight memory 181. The program memory 182 is used for storing a predetermined game program. The image processor 108 performs calculation for game images (screen image (R) and screen image (L)), and outputs the game images, generated from image data from the target memory 180 and the background memory 181 based on the results from the calculation, to the LCD's 105a and 105b. Specifically, the LCD"s 105a and 105b respectively receive the character data (R) and the character data (L), however, receive the same the monaural character data and the same background data since these data are not used for stereoscopic vision. The contents of the game changes in correspondence with the player's operation inputted as an external signal into the image processor 108, and the data indicative of the player's operation is stored into a game-data storage memory 183.

Displaying arrangement of screen images and control figures on the displays according to the present embodiment will be explained below.

The lens 106 functions to give directivity to light of an image where the light is turned upside down. Therefore, similar to the first embodiment, the backlight control figure R must be inverted upside down only to follow the movement of the player in the up-and-down direction, not inverted in right to left direction. However, in this embodiment, as the backlight control figure (L) displayed on the CRT 107b is reflected by the half mirror 111, the backlight control figure (L) is not required to be turned.

The screen image R is inputted to the display 105a in an upright manner, as in the first embodiment. However, as the screen image (L) displayed on the LCD 105b is also reflected by the half mirror 111, the screen image (L) is converted into mirror image. The backlight control figure L is also required to be converted into mirror image.

The CRT's and LCD's used in the second embodiment are an electronic display. Similar to the first embodiment, they are able to display inverted images the data of which are electronically inverted in longitudinal and right-to-left directions. The inversion can be made just by rotating the display body by 180 degrees.

Further example as to how to achieve displaying arrangement of screen images and control figures according to the second embodiment will be described below.

In FIG. 13, the display 107a, 107b, 105a, and 105b are indicated with a indicator "(s)". Start notation "(s) " and direction notation "→" in FIG. 13 are similar to those in FIG. 3 of the first embodiment. The indicators in FIG. 13 mean a starting point of luster scanning on the respective displays. Further, in FIG. 13, arrows "→" mean the direction of image data inversion. For example, the displays 107a, 105a with "(s)" start to luster-scans at the upper left position thereof in a left to right direction. The displays 105b, 107b with "(s)" start to luster-scans at the lower right position in a right to left direction. Data of the control figure R are inputted with electronically inverted vertically into the display 107a with an arrow "→". Data of the control figure L are inputted with inverted longitudinally and horizontally into the display 107b with two arrows. Data of the screen image L are inputted to the display 105b with electronically inverted in the horizontal direction.

The above arrangement of the displays ensures tracking of screen images R and L with respect to movements of the right and left eyes of the viewer.

Furthermore, the display 107b may be provided so that the starting point of luster scan may be set at upper left position in FIG. 13. In this case, data inversions in both the longitudinal and horizontal directions are not necessary.

Third Embodiment

Figure 18:
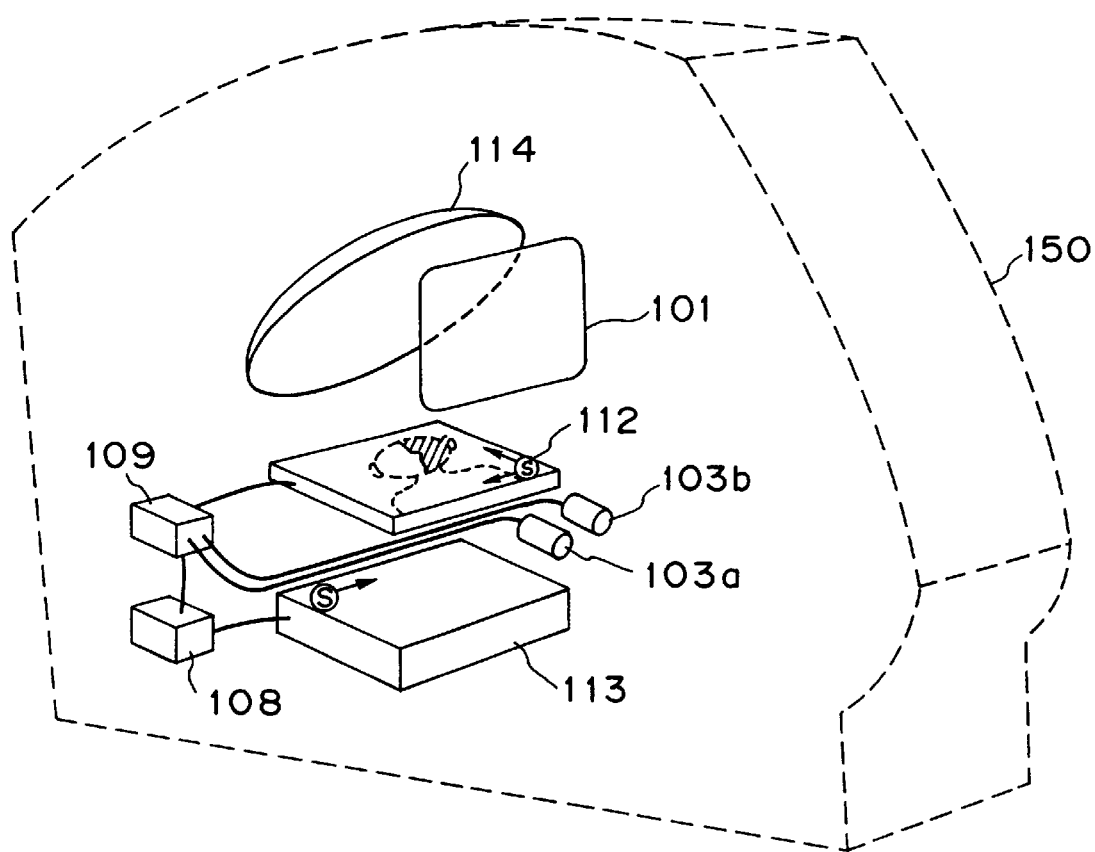
FIG. 18 is a perspective view showing the construction of the stereoscopic-image game playing apparatus according to a third embodiment of the present invention.

FIG. 18 shows the construction of the stereoscopic-image game playing apparatus according to a third embodiment of the present invention. Similar to the previous embodiments, in the apparatus according to the present embodiment comprises a plurality of displays. The displays are set "normally" unless otherwise specified.

The apparatus of the third embodiment has a similar overview to that of the first embodiment shown in FIG. 2. The third embodiment employs a time-division display as employed in the first embodiment. While the first and second embodiments use the convex lens to give directivity to a screen image, the third embodiment uses a concave mirror for the convex lens. Further, the first and second embodiments generate backlight control figures to control backlighting the LCD's on which screen images are displayed, however, the third embodiment generates a "transmission control figure" to be displayed in front of a screen image, so that the player sees the screen image through the transmission control figure.

In FIG. 18, numeral 101 denotes a display field; 103a and 103b, CCD cameras as a pair of image sensing devices; 112, a light-transmitting type LCD as a space modulator; 113, a color CRT as image display device for displaying screen images; 114, a concave mirror having a 150 mm focal distance, located between the LCD 112 and the player; 108, an image processor; and 109, a time-division synchronous circuit. The LCD 112 displays a transmission control figure for right eye (hereinafter referred to as "transmission control figure (R)") and a transmission control figure for left eye (hereinafter referred to as "transmission control figure (L)") in a time-divisional manner and the CRT 113 displays a screen image (R) and a screen image (L) as inverted image in a time-divisional manner. The transmission control figure is generated in the same manner as that described in the first and second embodiments, and has the same shape of that of the backlight control figure.

The operation of the stereoscopic-image game playing apparatus having the above construction is basically the same as that of the apparatus of the first embodiment shown in FIG. 3, therefore, the elements corresponding to those in FIG. 3 have the same reference numerals, the explanations of these elements will be omitted, and only the difference from the first embodiment will be described.

The CCD cameras 103a and 103b obtains a right-half face image and a left-half face image by sensing the player, and the LCD 112 displays the images as a transmission control figure (R) and a transmission control figure (L) in a time-divisional manner, in synchronization with the synchronizing timing generated by the time-division synchronous circuit 109.

The light-transmitting type LCD 112 may have a portion where a predetermined voltage is applied passes light and a portion where the voltage is not applied does not pass light. The voltage is applied to a portion where the transmission control figure corresponding to an irradiated half-face is displayed, accordingly, the portion displaying the irradiated half-face area passes light. In the third embodiment, when the CRT 113 displays the screen image (R), the LCD 112 displays the transmission control figure (R), while when the CRT 113 displays the screen image (L), the LCD 112 displays the transmission control figure (L).

Figure 19:
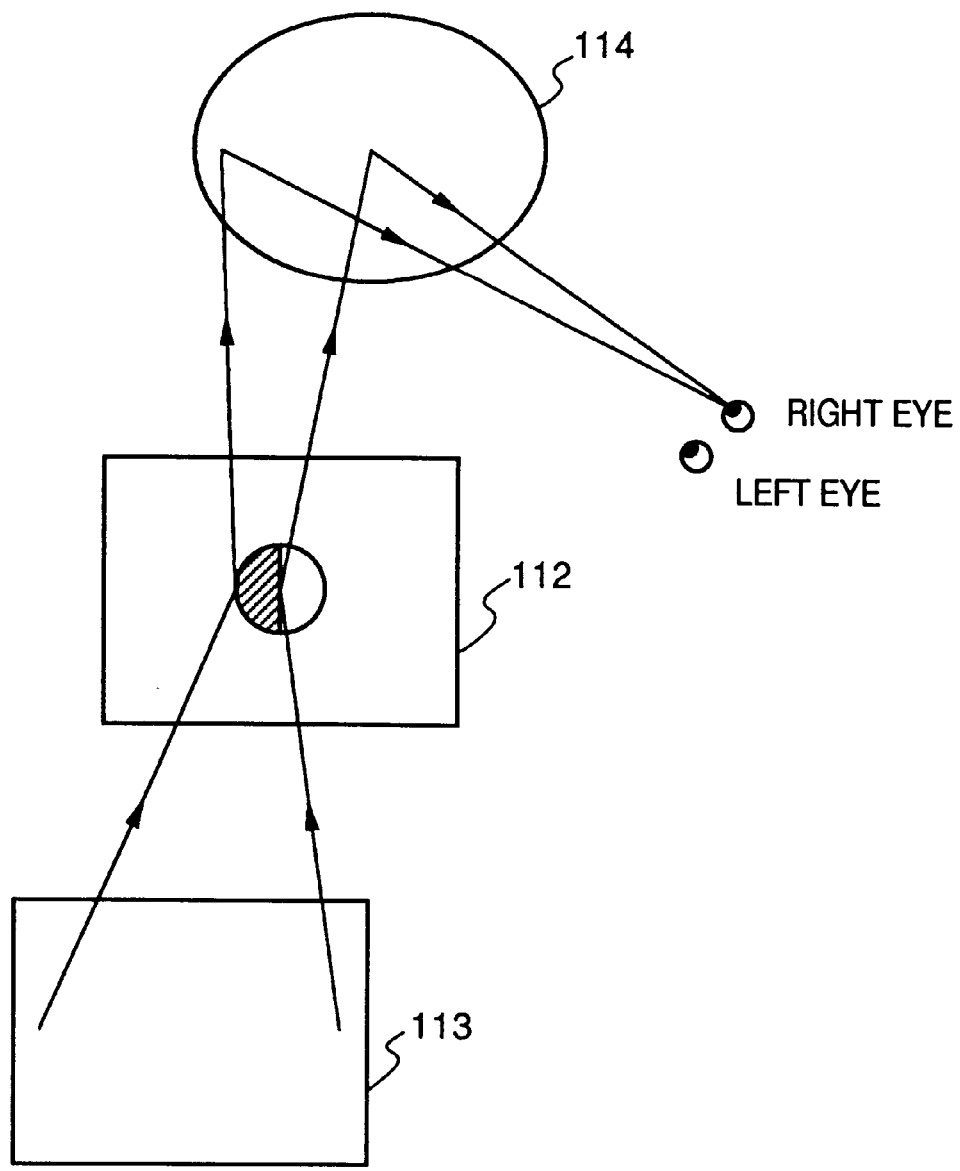
FIGS. 19 and 20 are explanatory views of optical paths in the third embodiment.
Figure 20:
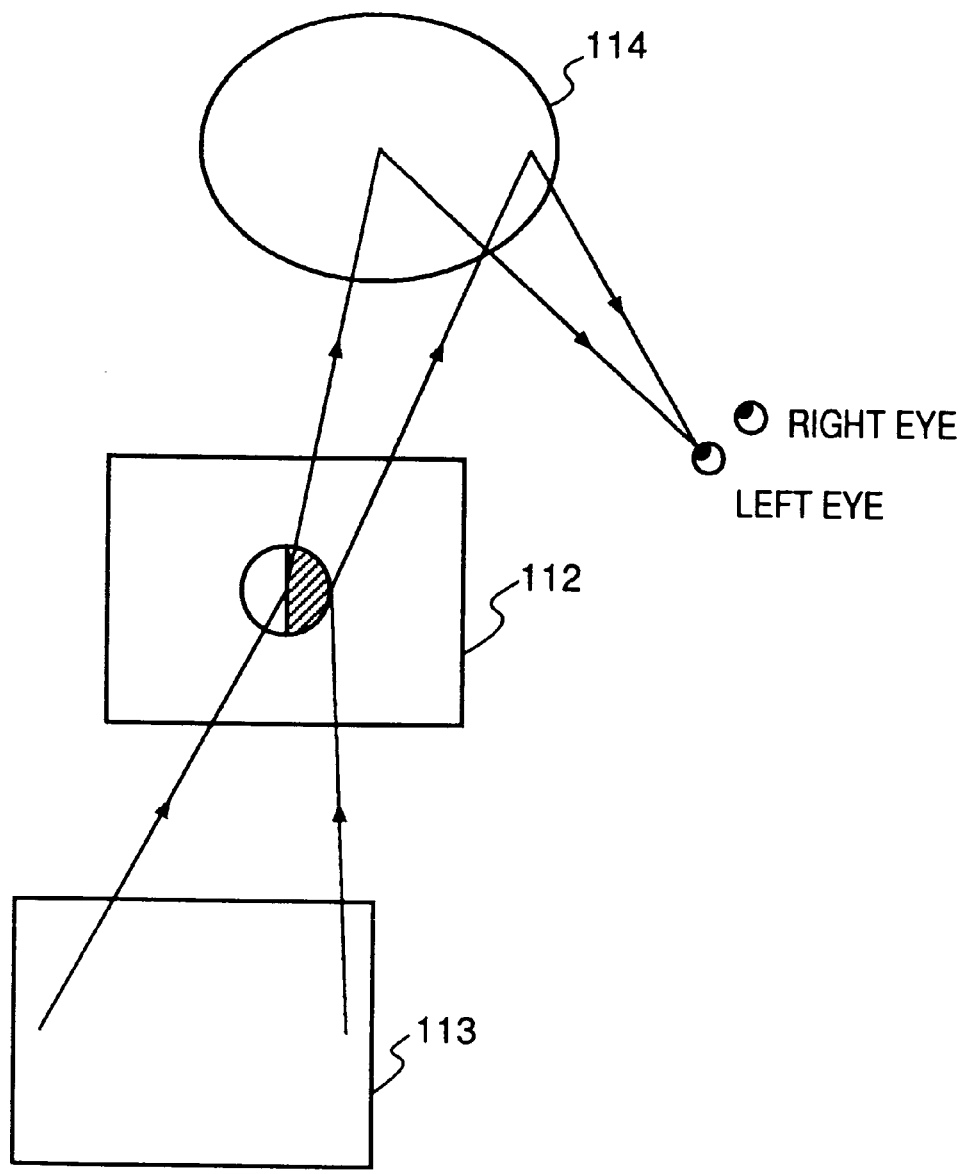

FIGS. 19 shows a light path where the light from the screen image (R) enters the player's right eye. FIG. 20 shows a light path where the light from the screen image (L) enters the player's left eye. In FIG. 19, when the LCD 112 displays the transmission control figure (R), the player's right eye sees the screen image (R) enlarged by the concave mirror 104 and displayed on the CRT 113. At this time, the transmission control figure (R) blocks the light from the screen image (R) to the left eye. As shown in FIG. 20 when the LCD 112 displays the transmission control figure (L), the player's left eye sees the screen image (L).

Figure 21:
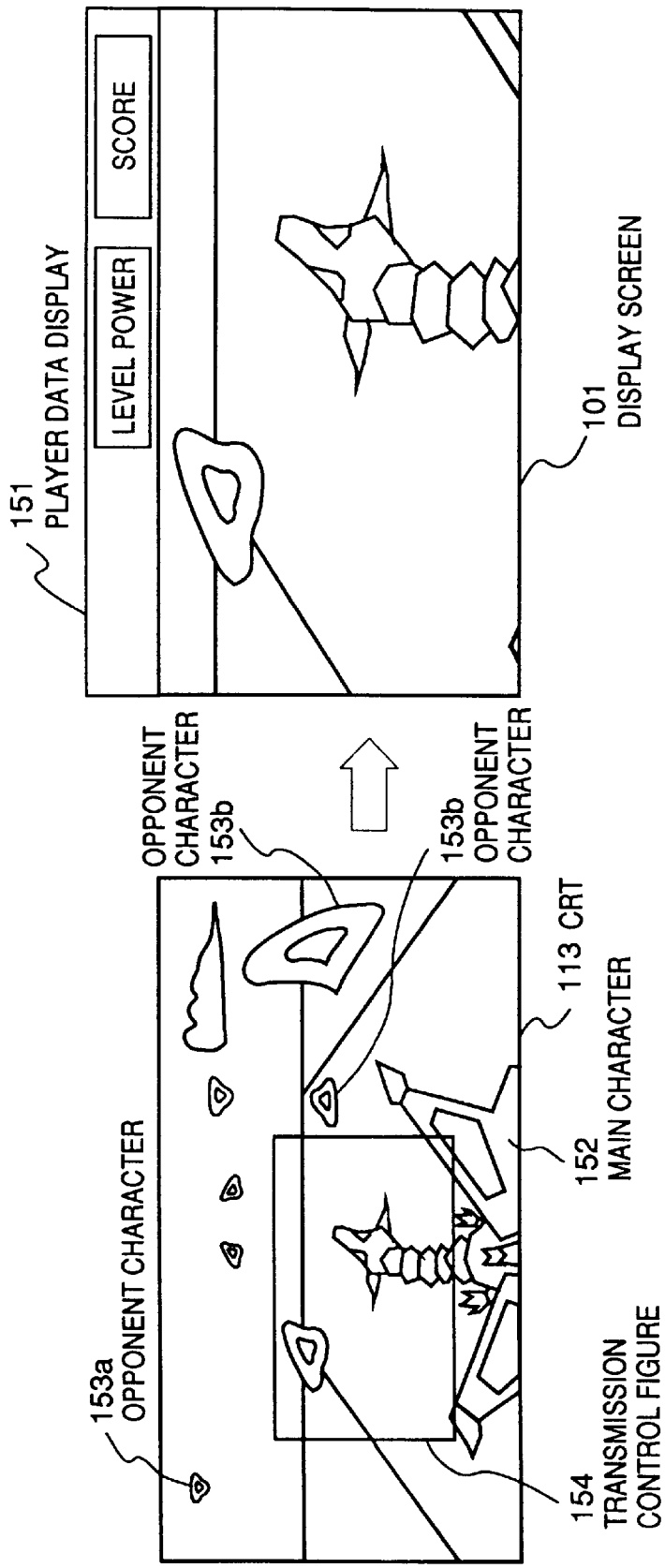
FIG. 21 illustrates a game image displayed at the stereoscopic-image game playing apparatus of the third embodiment.

FIG. 21 shows an example of game image in the third embodiment. As shown in FIG. 21, the display field 101 only shows a portion within the screen image display on the CRT 113 (expanded image). As player data images ("score" and "level power" in FIG. 21) are displayed as monaural images and not to be displayed on the CRT 113, the display field 101 has a player data display 151 at an upper position to display the player data images. In this example, the player operates a main character 152 to attack opponent characters such as characters 153a and 153b while avoiding attacks from the opponent characters.

The player does not see the whole image displayed on the CRT 113, but sees the image portion within the image displayed on the CRT 113 through a transmission control FIG. 154, as a game image. As the player's head moves, the position of the transmission control FIG. 154, i.e., the game image portion displayed on the display field 101 moves in accordance with the movement of the player's head. In FIG. 21, the player can see the opponent character 153a, however, cannot see the opponent character 153b. The player can find opponent character 153b by moving his/her head. This provides the player a feeling as if the player himself/herself exists in the world of the game.

In the third embodiment, the LCD 112 displays the transmission control figure, however, the LCD 112 may pass light when the transmission control figure is not displayed. In this case, when the CRT 113 displays the screen image (R), the LCD 112 displays the transmission control figure (L), while when the CRT 113 displays the screen image (L), the LCD 112 displays the transmission control figure (R). This can also attain the same transmission control.

Note that the operation of the image processor 108 is the same as that of the image processor of the first embodiment except that the image processor of this embodiment outputs the screen images to the CRT 113.

Displaying arrangement of screen images and control figures on the displays according to the present embodiment will be explained below.

The concave mirror 114 functions to give directivity to light of screen image and control figure where the images are turned upside down and converted into mirror image. The displays 112 and 113 are positioned below with respect to the eyes of the viewer. Therefore, not only the transmission control figures (R and L) but also the screen images (R and L) should be inputted to the display 112 with turned over only in the right to left direction.

Further example as to how to achieve displaying arrangement of screen images and control figures according to the present embodiment will be described below.

In FIG. 18, the display 113 for screen images is indicated with a indicator "(S)" at the upper left position. The display 112 starts to luster-scan at lower right position thereon, further data of the control figures are inputted with electronically inverted in vertical direction and longitudinal directions.

Fourth Embodiment

Figure 22:
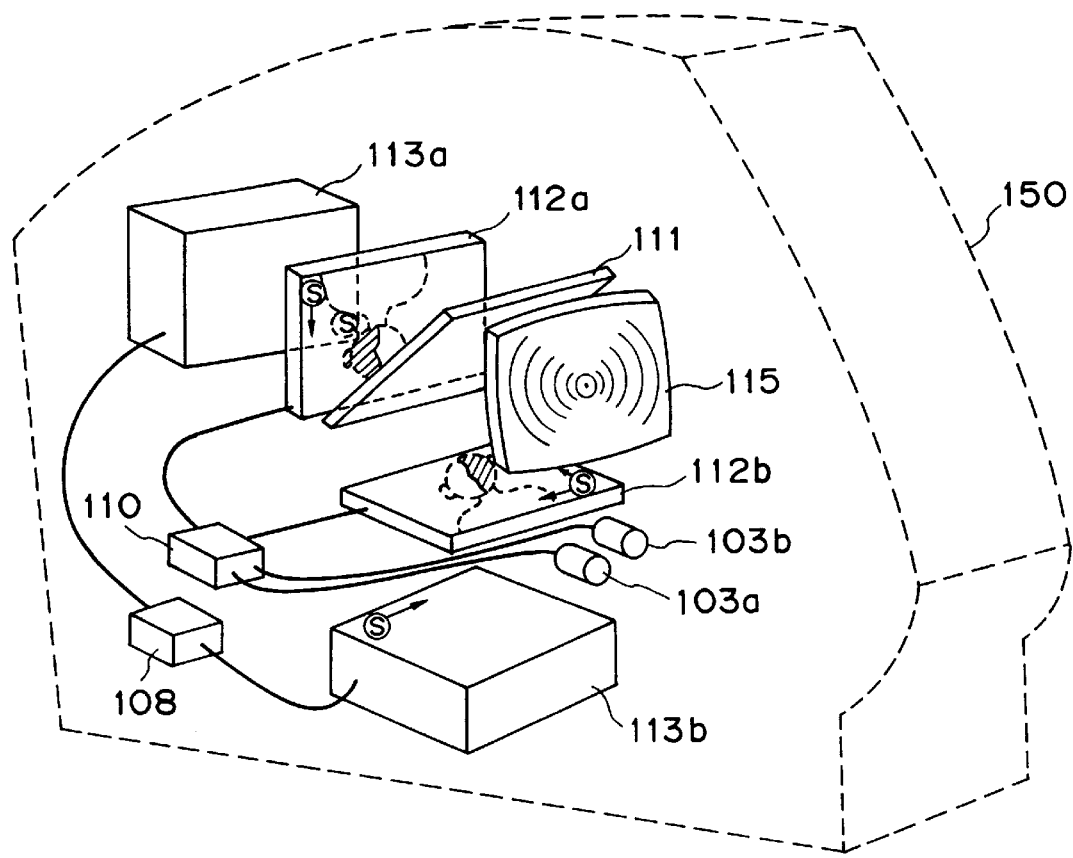
FIG. 22 is a perspective view showing the construction of a stereoscopic-image game playing apparatus according to a fourth embodiment of the present invention.

FIG. 22 shows the construction of a stereoscopic-image game playing apparatus according to a fourth embodiment of the present invention. The stereoscopic-image game playing apparatus has a similar overview to that of the apparatus of the first embodiment. Similar to the second embodiment (FIG. 13), the apparatus of the fourth embodiment displays a screen image (R) and a screen image (L) simultaneously and combines the screen images. The second embodiment employs the backlight control figures. Similar to the third embodiment, the fourth embodiment employs transmission control figures. Similar to the previous embodiments, in the apparatus according to the present embodiment comprises a plurality of displays. The displays are set "normally" unless otherwise specified.

In FIG. 22, numerals 103a and 103b denote CCD cameras as a pair of image sensing devices; 108, an image processor; 110, a second image processor; 111, a half mirror for combining two screen images; 112a and 112b, light-transmitting type LCD's as space modulators; 113a and 113b, color CRT's as image display devices for displaying the screen images as inverted image; 115, a Fresnel lens having a 150 mm focal distance, located between the player and the LCD's 112a, 112b.

The principle of generation of transmission control figures and the operation of the transmission control figures are the same as those in the third embodiment. That is, the CRT 113a displays a screen image (R), and the CRT 113b, a screen image (L). The LCD 112a displays a transmission control figure (R), and the LCD 112b, a transmission control figure (L). The player sees the screen image (R) displayed on the CRT 113a through the transmission control figure (R) with the right eye, and sees the screen image (L) displayed on the CRT 113b through the screen image (L) with the left eye.

The CCD camera 113a obtains an image of the player's right half face, and outputs the image as the transmission control figure (R) to the LCD 112a via the second image processor 110. The CRT 113a displays the screen image (L) outputted from the image processor 108. Then, the player's right eye sees the screen image (R) through the transmission control figure (R) enlarged by the Fresnel lens 115. On the other hand, the player's left eye does not see the screen image (R) displayed on the CRT 113a since the transmission control figure (R) displayed on the LCD 112a blocks the light from the screen image (R) to the player's left eye.

The LCD 112b displays an image of the player's left half face obtained by the CCD camera 103b as the transmission control figure (L). The player's left eye sees the screen image (L) outputted from the image processor 108 through the transmission control figure (L) reflected by the half mirror 111. At this time, the player's right eye does not see the screen image (L).

Displaying arrangement of screen images and control figures on the displays according to the present embodiment will be explained below.

The lens 111 functions to give directivity to light of screen and control images where the images are turned upside down.

The screen image R is inputted to the display 113a with turned upside down only. The control figure R should be inputted to the display 112a with inverted only in the longitudinal direction for the same reason of the second embodiment.

The screen image L is inputted to the display 113b with turned upside down and converted into mirror image, because the mirror 111 is positioned between the display 11b and the viewer. The control figure L should be inputted to the display 112b without the turning upside down due to the presence of the mirror 111.

FIG. 22 further illustrates how to set the displays 112a, 112b, 113a, and 113b in order to achieve the inversions of screen images and control figures according to the present embodiment.

The luster scan of the display 112a is set to start at upper left position thereon. The luster scan of the display 112b is set to start at lower right position thereon. Data of R control figure is inputted into the display 112a with inverted in a vertical direction. Data of L control figure is inputted to the display 112b with inverted in longitudinal and right-to-left directions.

The luster scan of the display 113a is set to start at lower right position thereon. Data of R screen image is inputted into the display 113a with no electronic inversion. The luster scan of the display 113b is set to start at upper left position thereon. Data of L screen image is inputted into the display 113b with inverted in right-to-left direction.

Fifth Embodiment

Figure 23:
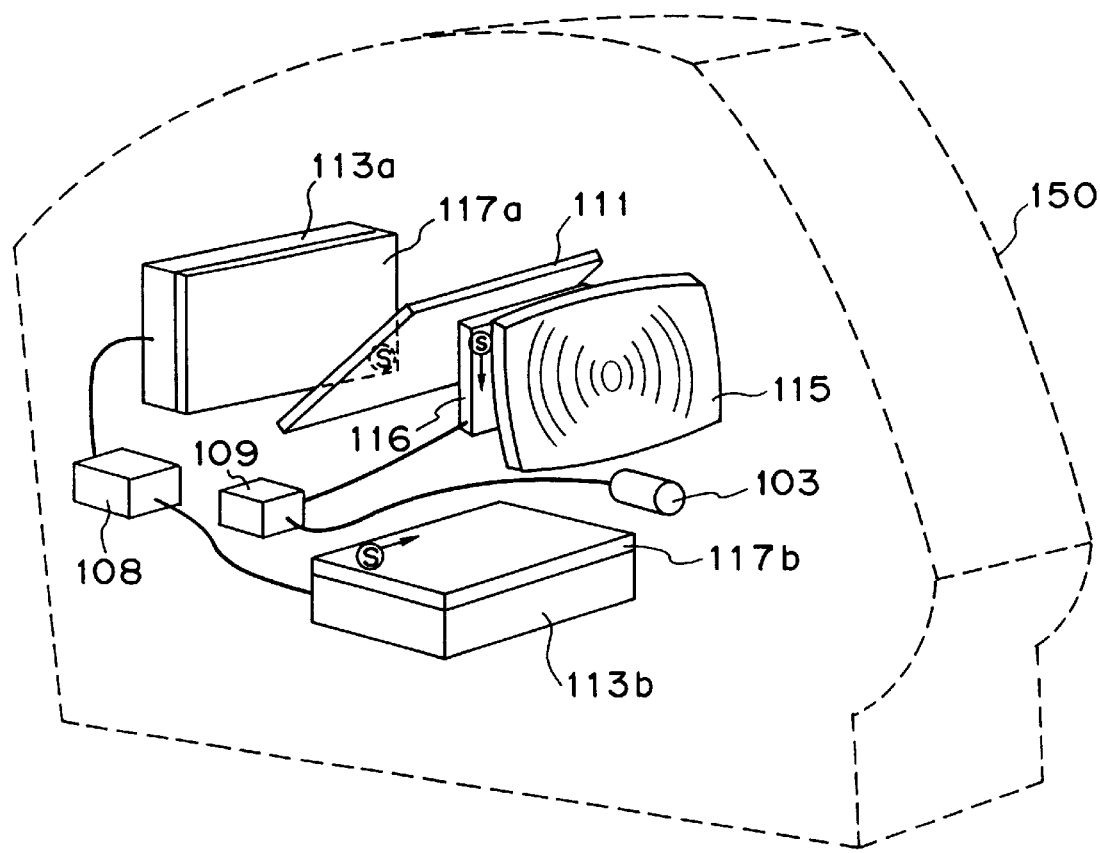
FIG. 23 is a perspective view showing the construction of a stereoscopic-image game playing apparatus according to a fifth embodiment of the present invention.

FIG. 23 shows the construction of a stereoscopic-image game playing apparatus according to a fifth embodiment of the present invention. The stereoscopic-image game playing apparatus has a similar overview to that of the apparatus of the first embodiment shown in FIG. 2. Similar to the fourth embodiment, the apparatus of the fifth embodiment displays two screen images on a display and combines the screen images. However, in the fifth embodiment, the apparatus displays a "polarized-light control figure" on a display provided in front of displays for the screen images. Similar to the previous embodiments, in the apparatus according to the present embodiment comprises a plurality of displays. The displays are set "normally" unless otherwise specified.

In FIG. 23, numeral 103 denotes a CCD camera as an image sensing device; 108, an image processor; 109, a second image processor, 111, a half mirror for combining two screen images; 113a and 113b, color CRT's as image display devices for displaying the screen images; 115, a Fresnel lens having a 150 mm focal distance; 116, a light-transmitting type LCD as a space modulator; and 117a and 117b, polarizing plates, having polarizing characteristics orthogonal to each other, attached to the image display surfaces of the CRT's 113a and 113b. The fourth embodiment employs two LCD's 112a and 112b for respectively displaying the transmission control figure (R) and the transmission control figure (L), however, as shown in FIG. 23, the fifth embodiment employs only one LCD 116 for displaying a polarized-light control figure for right eye (hereinafter referred to as "polarized-light control figure (R)"). The reason for using one LCD for displaying the polarized-light control figure (R) will be described with explanation of the construction of the LCD 116.

The operation of the stereoscopic-image game playing apparatus having the above construction is basically the same as that of the apparatus of the fourth embodiment shown in FIG. 22, therefore, the elements corresponding to those in the fourth embodiment have the same reference numerals, the explanations of these elements will be omitted, and only the difference from the fourth embodiment will be described.

The camera 103 obtains an image of the player's right half face and outputs the image signal to the second image processor 109, which generates a polarized-light control figure (R) based on the input image signal. The LCD 116 displays the polarized-light control figure (R) from the second image processor 109.

Hereinafter, description will be made about a case where the LCD 116 displays the polarized-light control figure (R), however, if all the conditions for the player's right eye are replaced for those for the left eye, the same advantage can be attained.

The CRT 113a has the polarizing plate 117a on the display surface for displaying a screen image (R). Similarly, the CRT 113b has the polarizing plate 117b on the display surface for displaying a screen image (L). It is assumed that the polarizing direction of the polarizing plate 117a is a "direction X", and that of the polarizing plate 117b is a "direction Y", and the polarizing plates 117a and 117b are provided so that the directions X and Y are orthogonal to each other. In this case, the light from the screen image (R) passed through the polarizing plate 117a is polarized in the direction X, and the light from the screen image (L) passed through the polarizing plate 117b is polarized in the direction Y.

Figure 24:
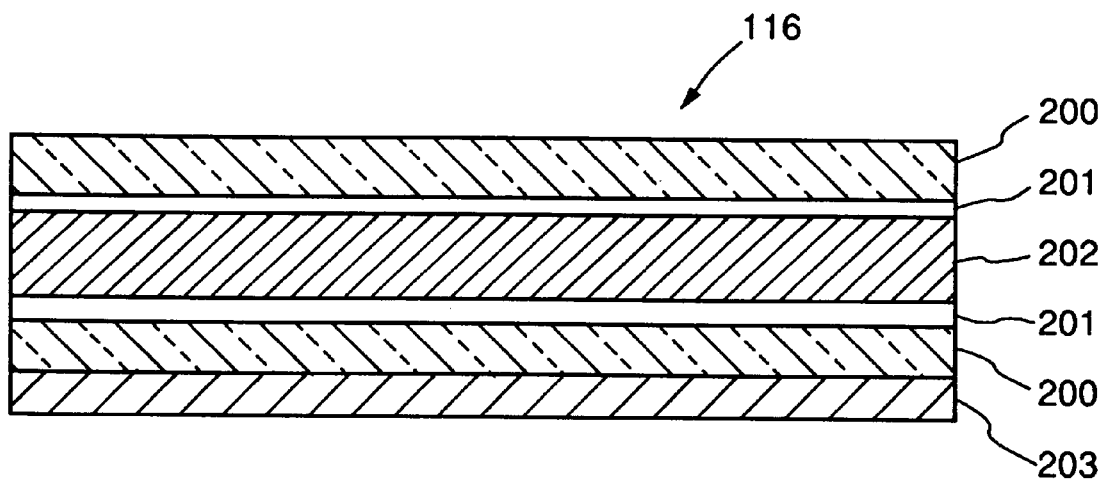
FIG. 24 is a cross-sectional view of a liquid crystal display device used in the stereoscopic-image game playing apparatus of the fifth and sixth embodiments.

Next, the construction and operation of the LCD 116 will be described with reference to FIGS. 24 to 26. As shown in FIG. 24, a liquid crystal 200 inserted between glass plates 200 changes its orientation when a predetermined voltage is applied to a transparent electrode 201. The LCD 116 has a polarizing plate 203 on one outer surface of the glass plate 200.

Figure 25:
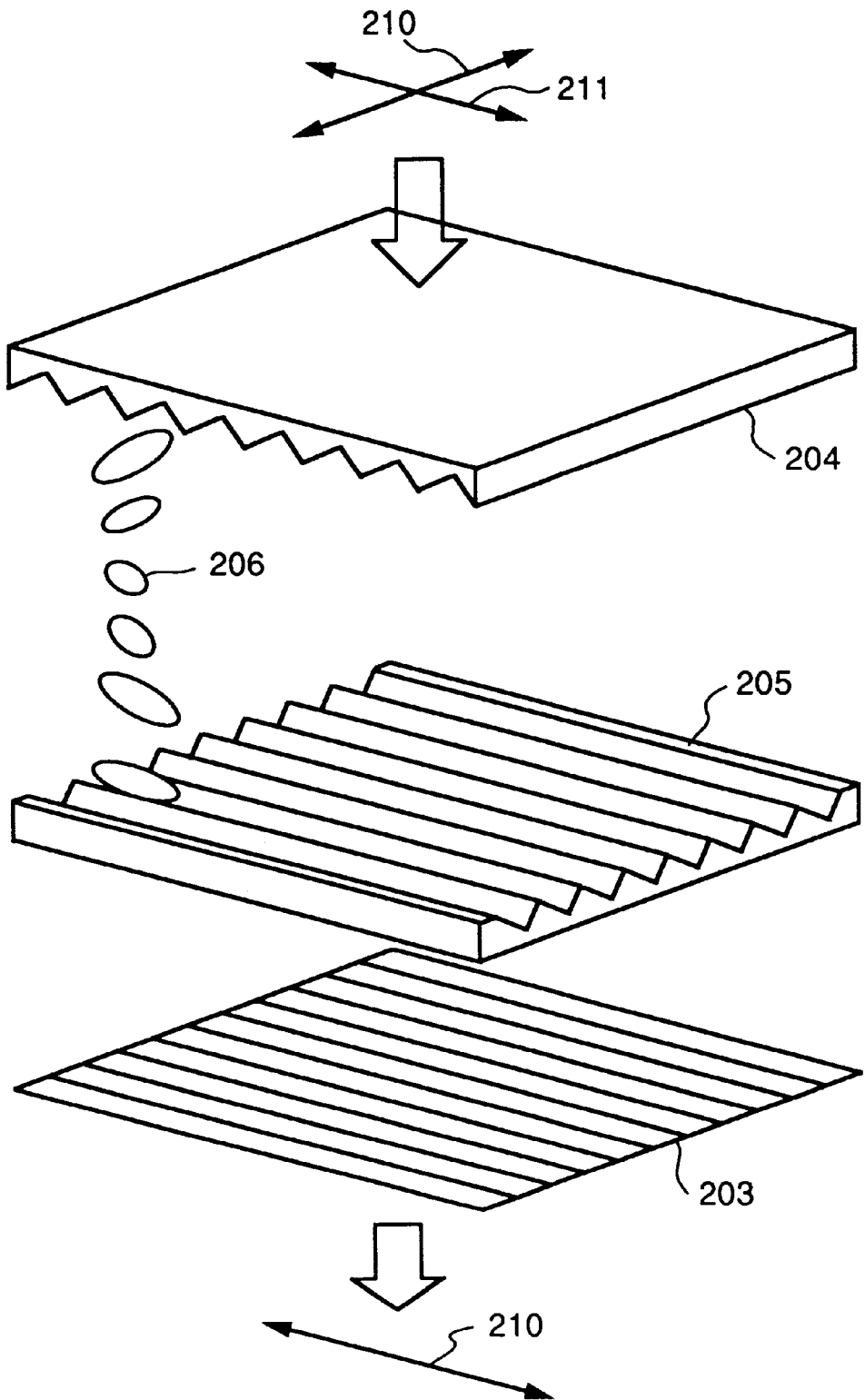
FIGS. 25 and 26 are explanatory views of operation of the liquid crystal device used in the stereoscopic-image game playing apparatus of-the fifth and sixth embodiments.

As shown in FIG. 25, in a state where the voltage is not applied, a polarized direction 210 of incident light is rotated at a right angle in correspondence with the orientation of molecules 206 of the liquid crystal 202. As a result, the incident light passes through the polarizing plate 203. On the other hand, incident light having a polarized direction 211 orthogonal to the polarized direction 210 cannot pass through the polarizing plate 203 since the polarized direction 210 is orthogonal to the orientation of the liquid crystal molecules 206.

Figure 26:
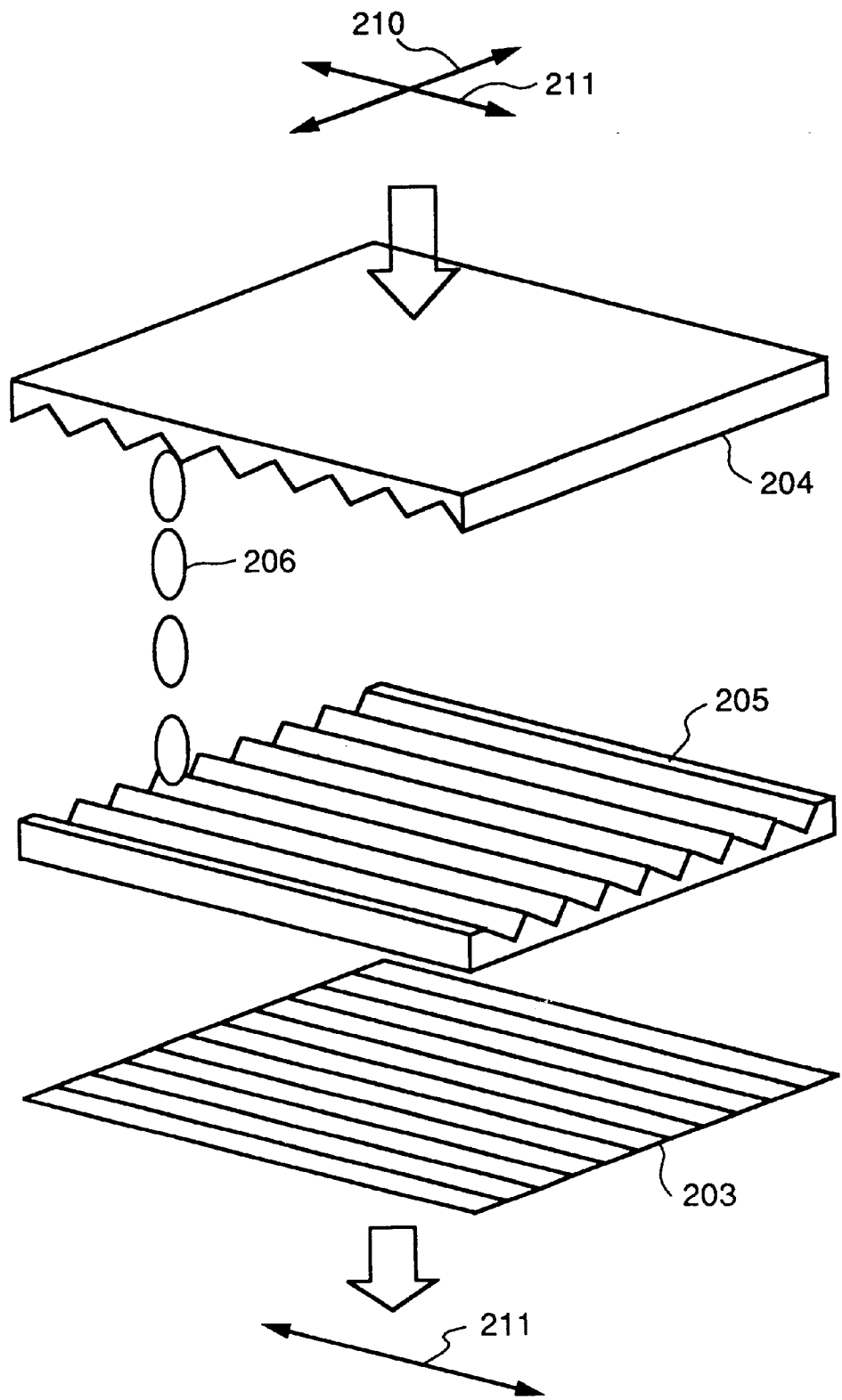

As shown in FIG. 26, in a state where the voltage is applied, the orientation of the liquid crystal molecules 206 changes in accordance with a direction in which the voltage is applied. As a result, any incident light passes through the liquid crystal 202, however, the incident light having the polarized direction 210 cannot pass through the polarizing plate 203, but the incident light, having the polarized direction 211, corresponding to light-transmitting characteristic of the polarizing plate 203, can pass through the polarizing plate 203.

That is, the light-transmitting type LCD 116 passes one of incident lights having orthogonal polarized directions at a portion of the display surface where the voltage is applied, and passes the other light at a portion where the voltage is not applied.

In this embodiment, it is assumed that the polarized direction of the light that passes through the portion of the display surface of the LCD 116 where the voltage is the direction X, and the polarized direction of the light that passes through the portion where the voltage is not applied is the direction Y. The voltage is applied to the LCD 116 at a portion corresponding to a bright portion of the player's half face image (irradiated half-face area). In the apparatus in FIG. 23, only the right-half face image obtained by the camera 103 is inputted into the image processor 109. Accordingly, the voltage is applied to only the liquid crystal molecules corresponding to the right-half face area. That is, this voltage-applied portion corresponding to the right-half face area passes the light polarized in the direction X (hereinafter referred to as "X-polarized light"). The portion surrounding the voltage-applied portion passes the light polarized in the direction Y (hereinafter referred to as "Y-polarized light").

In this manner, the light-transmitting characteristic of the right-half face portion of the LCD 116 and the polarizing direction of the polarizing plate 117a attached to the CRT 113a coincide, therefore, the player can see the screen image (R) displayed on the CRT 113a with the right eye. On the other hand, the light-transmitting characteristic of the portion except the right-half face portion of the LCD 116 and the polarizing direction of the polarizing plate 117b attached to the CRT 113b coincide, therefore, the player can see the screen image (L) displayed on the CRT 113b with the left eye.

In the first to fourth embodiments, the apparatus generates backlight control figures or transmission control figures based on the right-half face image and left-half face image obtained by the cameras 103a and 103b. However, in the fifth embodiment, the image processor 109 generates the polarized-light control figure based on only the right-half face image, since the LCD 106 selectively passes the X-polarized light and the Y-polarized light. In this embodiment, as the LCD 106 passes the X-polarized light at a portion corresponding to the displayed right-half face area having pixel values "1", and passes the Y-polarized light at a portion corresponding to an image area surrounding the right-half face area having pixel values "0", a polarized-light control figure for left eye based on the left-half face image is not necessary. Note that on the LCD 106 display surface, the area of the Y-polarized light passing portion is larger than that of the X-polarized light passing portion, however, the screen image (L) does not enter the player's right eye by virtue of the directivity of the Fresnel lens 115.

The fifth embodiment can be modified that a polarized-light control figure for left eye is generated using the left-half face image. In this case, the LCD 116 passes the Y-polarized light at the portion of the liquid crystal where the voltage is applied.

Displaying arrangement of screen images and control figures on the displays according to the present embodiment will be explained below.

The lens 115 functions to give directivity to light of screen and control images where the images are turned upside down.

The screen image R is inputted to the display 113a with turned upside down. The screen image L is inputted to the display 113b with inverted in the right to left direction only, because the mirror 111 is positioned between the display 113b and the viewer.

The control figure should be inputted to the display 116 with inverted in the longitudinal direction.

FIG. 23 further illustrates how to set the displays 116, 113a, and 113b in order to achieve the inversions of screen images and control figures according to the present embodiment.

The luster scan of the display 116 is set to start at upper left position thereon. Data of R and L control figures are inputted into the display 116 with inverted in a vertical direction.

The luster scan of the display 113a is set to start at lower right position thereon. Data of R screen image is inputted into the display 113a with no electronic inversion. The luster scan of the display 113b is set to start at upper left position thereon. Data of L screen image is inputted into the display 113b with inverted in right-to-left direction.

Sixth Embodiment

Figure 27:
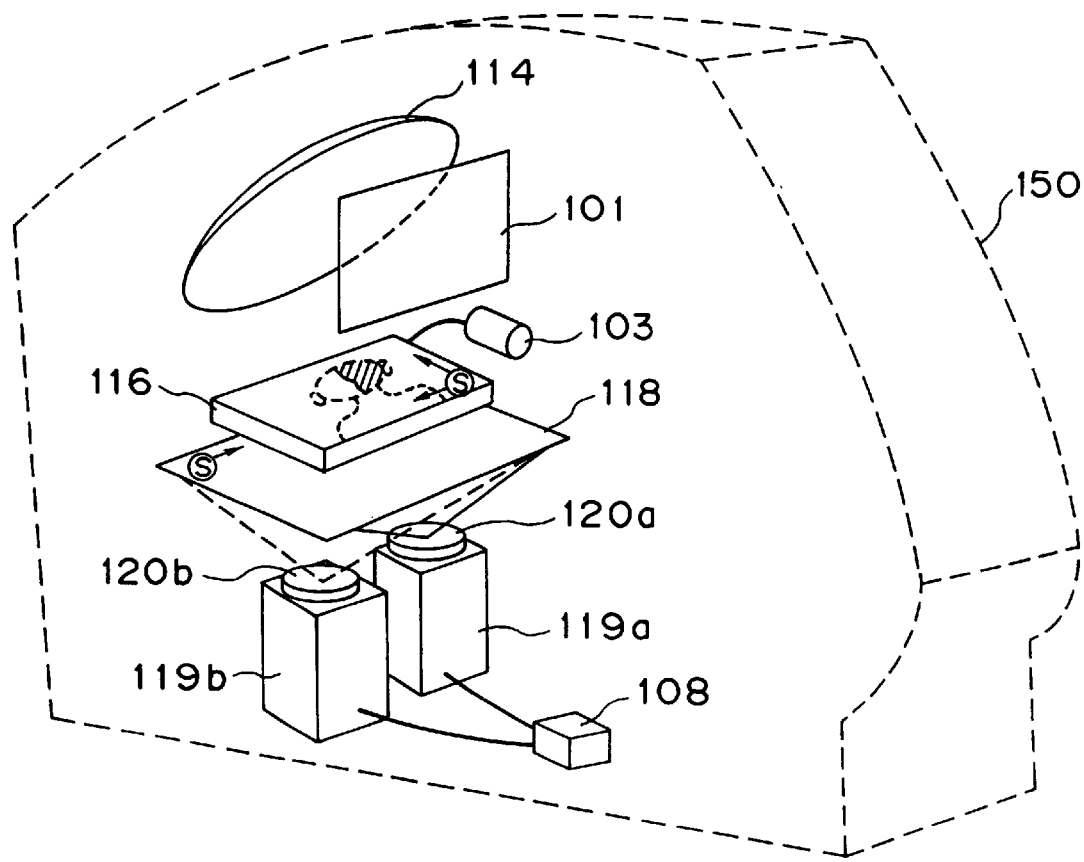
FIG. 27 is a perspective view showing the construction of the stereoscopic-image game playing apparatus of the sixth embodiment.

FIG. 27 shows the construction of a stereoscopic-image game playing apparatus according to a sixth embodiment of the present invention. The stereoscopic-image game playing apparatus has a similar overview to that of the apparatus of the first embodiment shown in FIG. 2. Similar to the third embodiment, the sixth embodiment employs a concave mirror to give directivity to a screen image. The second embodiment uses the half mirror to combine two screen images, however, the sixth embodiment combines two screen images by projecting the images on a light-transmitting type screen. Similar to the previous embodiments, in the apparatus according to the present embodiment comprises a plurality of displays. The displays are set "normally" unless otherwise specified.

In FIG. 27, numeral 103 denote a CCD camera as an image sensing device; 108, an image processor; 114, a Fresnel lens having a 150 mm focal distance; 116, a monochromatic light-transmitting type LCD as a space modulator; 118, a screen for combining two screen images; 119a and 119b, projection TV's as image display devices for displaying the screen images; and 120a and 120b, polarizing plates respectively having polarizing characteristics orthogonal to each other, attached to the image display surface of the projection TV's 119a and 119b.

The operation of the stereoscopic-image game playing apparatus having the above construction is basically the same as that of the apparatus of the fifth embodiment shown in FIG. 18, therefore, the elements corresponding to those in the fifth embodiment have the same reference numerals, the explanations of these elements will be omitted, and only the difference from the fifth embodiment will be described.

Similar to the fifth embodiment, the image processor 108 processes an image signal indicative of an irradiated half-face of the player, obtained by the camera 103, and generates a polarized-light control figure based on the image signal. The LCD 116 displays the polarized-light control figure.

The construction and operation of the LCD 116 are the same as those in the fifth embodiment.

The projection TV's 119a and 119b project a screen image (R) and a screen image (L) on the screen 118. More specifically, the lights from the screen image (R) and the screen image (L) are polarized by the polarizing plates 120a and 120b in polarized directions orthogonal to each other. The polarized lights from the two screen images are projected on the screen 118 so that the screen image are combined there. Similar to the fifth embodiment, the LCD 116 displaying the polarized-light control figure passes-only X-polarized light at a portion corresponding to a half-face area where a predetermined voltage is applied, and passes only Y-polarized light at a portion surrounding the portion where the voltage is not applied. The concave mirror 114 gives directivity to the light passed through the LCD 116. Thus, the apparatus of the sixth embodiment separates the screen image (R) and the screen image (L) displayed on the screen 118 to the right eye and the left eye of the player.

Note that the screen images projected on the screen 118 are converted into the reflected and inverted images in consideration of the reflection and inversion by the concave mirror 114.

A modification to first to sixth embodiments may be proposed. In the first to sixth embodiments, the convex lens may be replaced with a concave mirror to attain the same advantage. In this modification, light which is incident on the concave mirror is deflected by around 90 degrees to exit. Therefore, the associated elements must be arranged in consideration of this change of the light axis.

FIG. 27 further illustrates another example as to how to set the displays 119a, 119b, 116 in order to achieve the inversions of screen images and control figures according to the present embodiment.

The projectors 119a, 119b are rotated by 180 degrees, thus they display the screen images with inverted in both the vertical and right-to-left directions.

Seventh Embodiment

Figure 28:
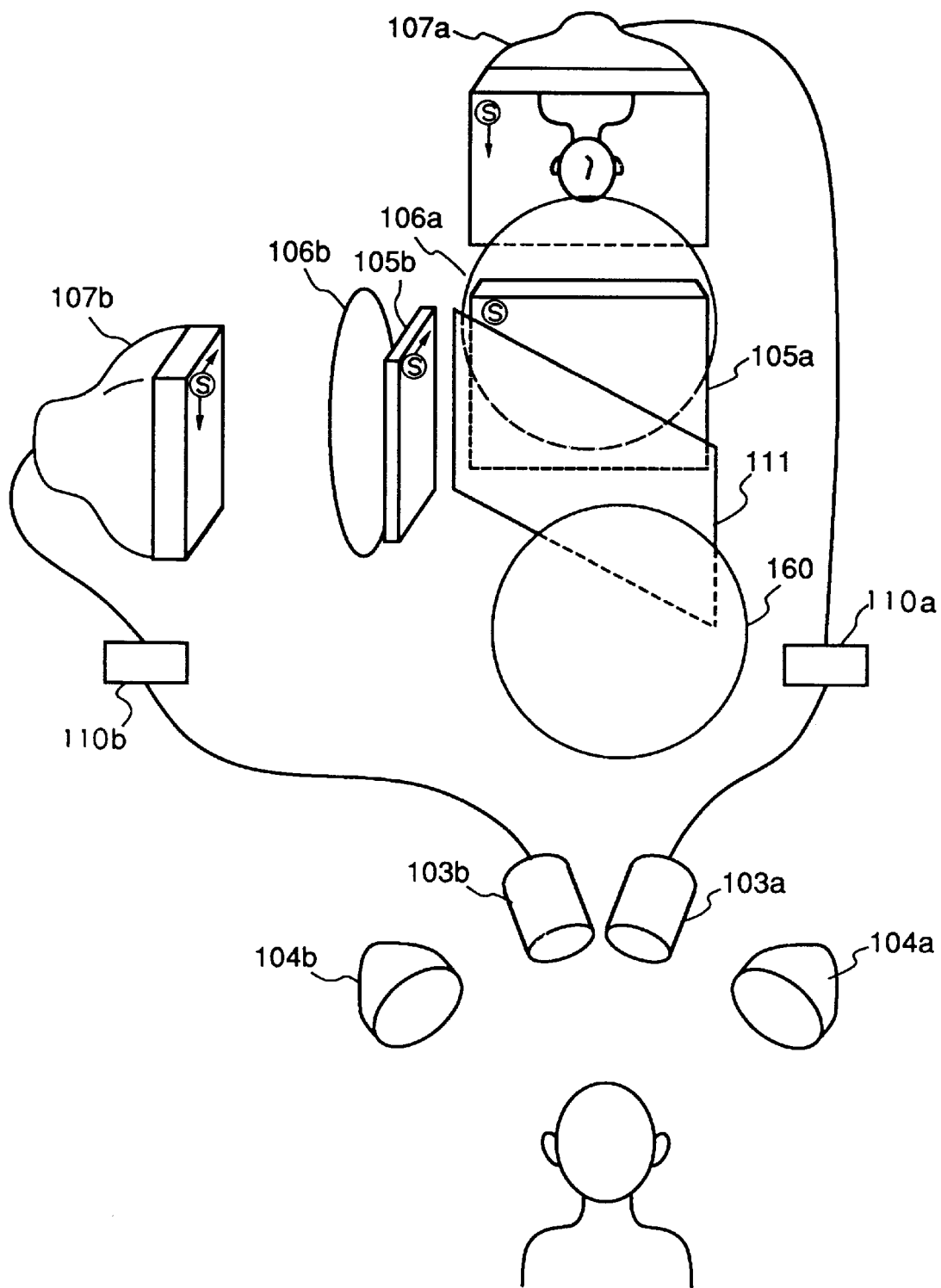
FIG. 28 is a perspective view showing the construction of a stereoscopic-image game playing apparatus according to a seventh embodiment of the present invention.

FIG. 28 shows the construction of a stereoscopic-image game playing apparatus according to a seventh embodiment of the present invention. Similar to the previous embodiments, in the apparatus according to the present embodiment comprises a plurality of displays. The displays are set "normally" unless otherwise specified.

The seventh embodiment employs a couple of cameras and lights for obtaining face images respectively corresponding to the right half face and left half face of the player, accordingly, the overview of the apparatus is the same as that of the apparatus of the fourth embodiment shown in FIG. 22. Similar to the second embodiment, the seventh embodiment uses backlight control figures and a half mirror to combine screen images. In the second embodiment, the optical devices are provided at a position facing to the player and a position 90° turned downward from the former position; in the seventh embodiment, optical devices are provided at a position facing to a player and a position 90° turned leftward from the former position. Further, the seventh embodiment uses a convex lens in front of the half mirror.

In FIG. 28, numerals 105a and 105b denote light-transmitting type LCD's as space modulators; 106a and 106b, Fresnel lenses respectively having a 150 mm focal distance, located behind the LCD's 105a and 105b; 107a and 107b, monochromatic CRT's as irradiation control figure display devices, located at positions 160 mm (longer than the focal distance of the lenses 106a and 106b) distant from the lenses 106a and 106b, opposite to the LCD's 105a and 105b; 104a and 104b, LED's respectively for emitting light of 850 nm wavelength and light of 950 nm wavelength; 103a and 103b, monochromatic CCD cameras as image sensing devices; and 111, a half mirror for combining images displayed on the LCD's 105a and 105b.

Numeral 160 denotes a group of lenses for enlarging/reducing the images displayed on the LCD's 105a and 105b. For the purpose of image enlargement/reduction, the lens group 160 includes convex lens(es) and concave lens(es). To reduce aberration, the lens group may be used as a combined lens. To obtain only enlarged images, the lens group preferably comprises only convex lenses in consideration of costs.

Numerals 110a and 110b denote image processors having the same function as that of the image-processor 108 in the first embodiment. The LCD's 105a and 105b respectively display a screen image (R) and a screen image, and the CRT's 107a and 107b respectively display a backlight control figure (R) and a backlight control figure (L).

Note that the function of the backlight control figure is the same as that in the first embodiment.

Next, the operation of the Fresnel lenses 106a and 106b will be described with reference to FIG. 29. The Fresnel lens 106a (106b) is set so that the player can see the backlight control image (R) (backlight control image(L)) displayed on the CRT 107a (107b) as a virtual image. The distance between the Fresnel lens 106a (106b) and the CRT 107a (107b) is longer than the focal distance of the Fresnel lens 106a (106b) and the lens group 160 as a combination lens. Thus, an irradiated half-face area of the backlight control figure (R) is enlarged within the effective diameter of the Fresnel lens 106a (106b) to the right eye (left eye) of the player. In this manner, the light from the backlight control figure (R) (the backlight control figure (L)) functions as backlight having the effective diameter of the Fresnel lens 106a (106b) to the right eye (left eye). At this time, the light from the CRT 107a (107b) does not enter the opposite eye.

Accordingly, the player sees the bright virtual image, i.e., the right-half face area of the backlight control figure (R) displayed on the CRT 107a, with only the right eye. On the other hand, the player sees the bright virtual image, i.e., the left-half face area of the backlight control figure (L) displayed on the CRT 107b, with only the left eye.

The screen image (R) displayed on the LCD 105a is backlighted to be visible to the player's right eye, while the screen image (L) displayed on the LCD 105b is backlighted to be visible to the player's left eye, thus the player can see the images simultaneously, to obtain stereoscopic vision. If the player moves, so far as the irradiation condition as shown in FIG. 29 is maintained, the stereoscopic vision can be continued.

Figure 29:
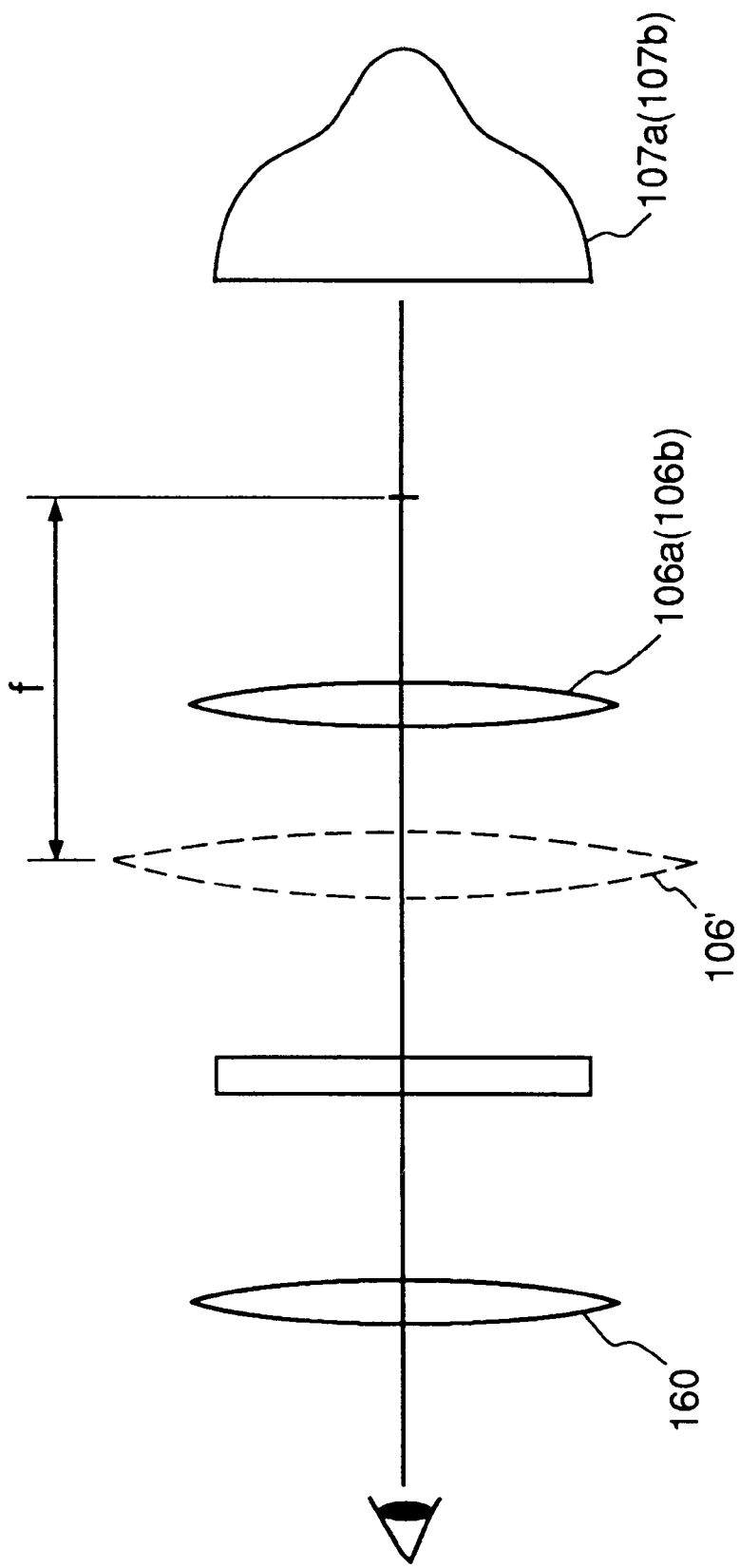
FIG. 29 is an explanatory view of the positional relation among a lens, a CRT, a liquid crystal display in the seventh embodiment.

FIG. 29 shows the positional relation among the Fresnel lens 106a (106b), an imaginary lens 106', the lens group 160, and the CRT 107a (107b). If the CRT 107a (107b) is positioned outside of the focal distance of the imaginary lens 106', as a combination lens formed with the lens 106a (106b) with the lens group 160, the image displayed on the CRT 107a (107b) functions as the backlight control figure (R) (backlight control figure (L)). On the other hand, the lens group 160 is positioned so that the LCD 105a (105b) is within the focal distance of the imaginary lens 106'. Actually, the lens group 160 functions as a zoom lens for image enlargement/reduction, and the focal distance of the lens group 160 is changed from outside of the apparatus. The Fresnel lenses can reduce the thickness of the combination lens, thus attains downsizing of the apparatus.

Note that the screen image (R) displayed on the LCD 105a is turned upside down in consideration of the function of the Fresnel lens 106a and the lens group 160 as a combined lens; the backlight control figure (L) displayed on the CRT 107b is converted into a mirror image in consideration of the reflection by the half mirror 111; and the screen image (L) displayed on the LCD 105b is converted into a mirror image reflection by the half mirror 111.

Displaying arrangement of screen images and control figures on the displays according to the present embodiment will be explained below.

The focal distance of the lens 106 is greater than the distances of the display 106, 106b, and the LCD's 105a and 105b are located within the focal distance.

FIG. 28 further illustrates how to set the displays 105a, 105b, 107a, and 107b in order to achieve the inversions of screen images and control figures according to the present embodiment.

The luster scan of the display 107a is set to start at upper left position thereon. The luster scan of the display 107b is set to start at upper left position thereon. Data of R control figure is inputted into the display 107a with inverted in a vertical direction. The luster scan of the display 105a is set to start at upper left position thereon. Data of R screen image is inputted into the display 105a with no electronic inversion. The luster scan of the display 105b is set to start at upper left position thereon. Data of L screen image is inputted into the display 105b with inverted in a right-to-left direction.

Eighth Embodiment

Figure 30:
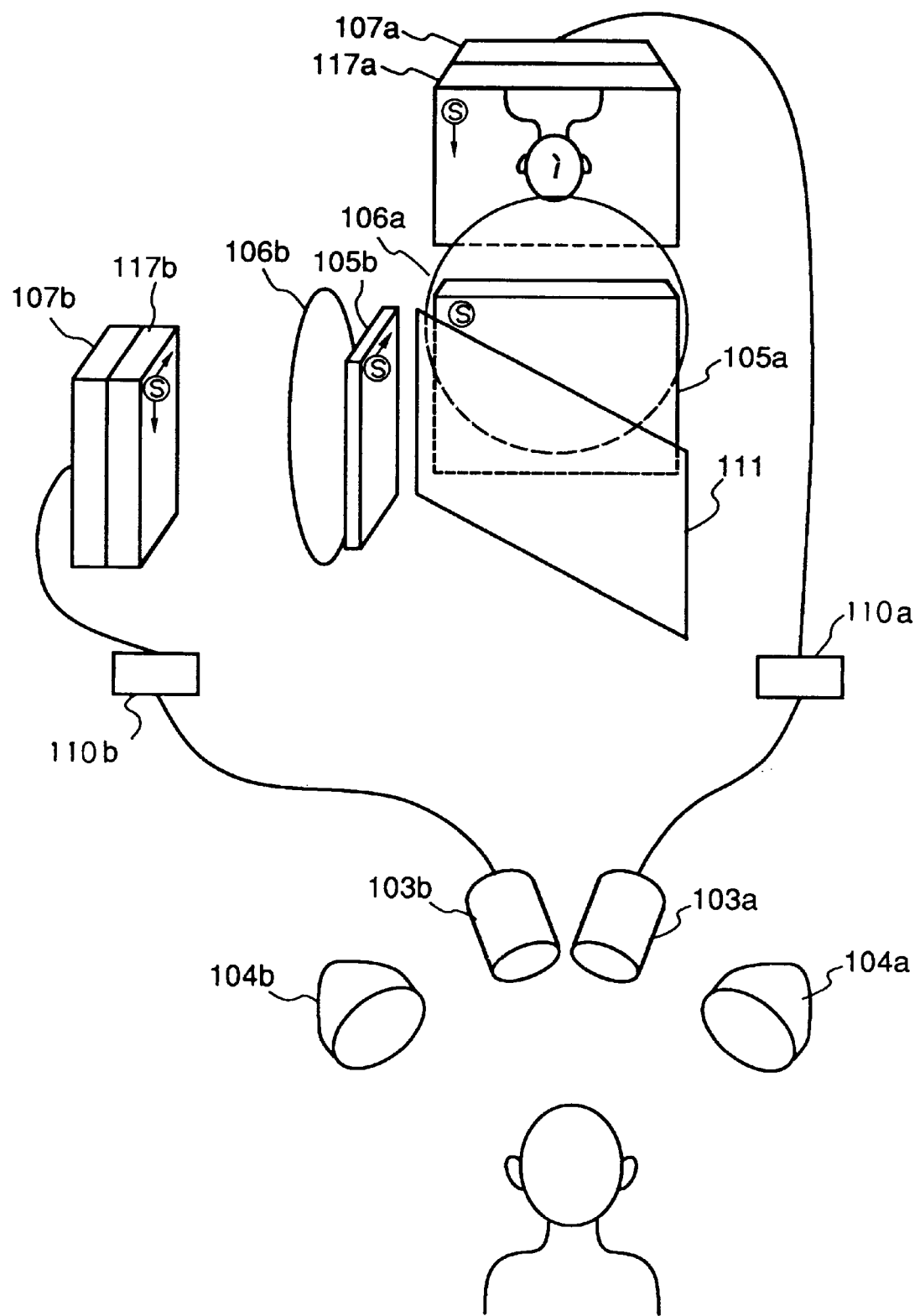
FIG. 30 is a perspective view showing the construction of a stereoscopic-image game playing apparatus according to an eighth embodiment of the present invention.

FIG. 30 shows the construction of a stereoscopic-image game playing apparatus according to an eighth embodiment of the present invention. Similar to the seventh embodiment, the eight embodiment uses backlight control figures, however, the eighth embodiment uses LCD's as backlight devices and circularly-polarizing plates between the backlight devices and space modulators. Similar to the previous embodiments, in the apparatus according to the present embodiment comprises a plurality of displays. The displays are set "normally" unless otherwise specified.

In FIG. 30, numerals 105a and 105b denote light-transmitting type color LCD's; 106a and 106b, Fresnel lenses respectively having a 150 mm focal distance, located behind the LCD's 105a and 105b; 107a and 107b, monochromatic LCD's as backlight devices, located at positions 160 mm (longer than the focal distance o the lenses 106a and 106b) distant from the lenses 106a and 106b, opposite to the LCD's 105a and 105b; 111, a half mirror for combining screen images displayed on the LCD's 105a and 105b; and 117a and 117b, circularly polarizing plates attached to the front surfaces of the LCD's 107a and 107b, for polarizing the lights from the LCD's 107a and 107b. The LCD's 107a and 107b are backlighted by light sources (not shown) such as fluorescent tubes.

The relation between LED's 104a, 104b and cameras 103a, 103b is the same as that in the seventh embodiment, therefore, the explanation of the relation will be omitted. Image processors 110a and 110b have the same functions as those of the image processors of seventh embodiment. The LCD's 105a and 105b as image display means display a screen image (R) and a screen image (L). The LCD's 107a and 107b display a backlight control figure (R) and a backlight control figure (L).

Figure 31:
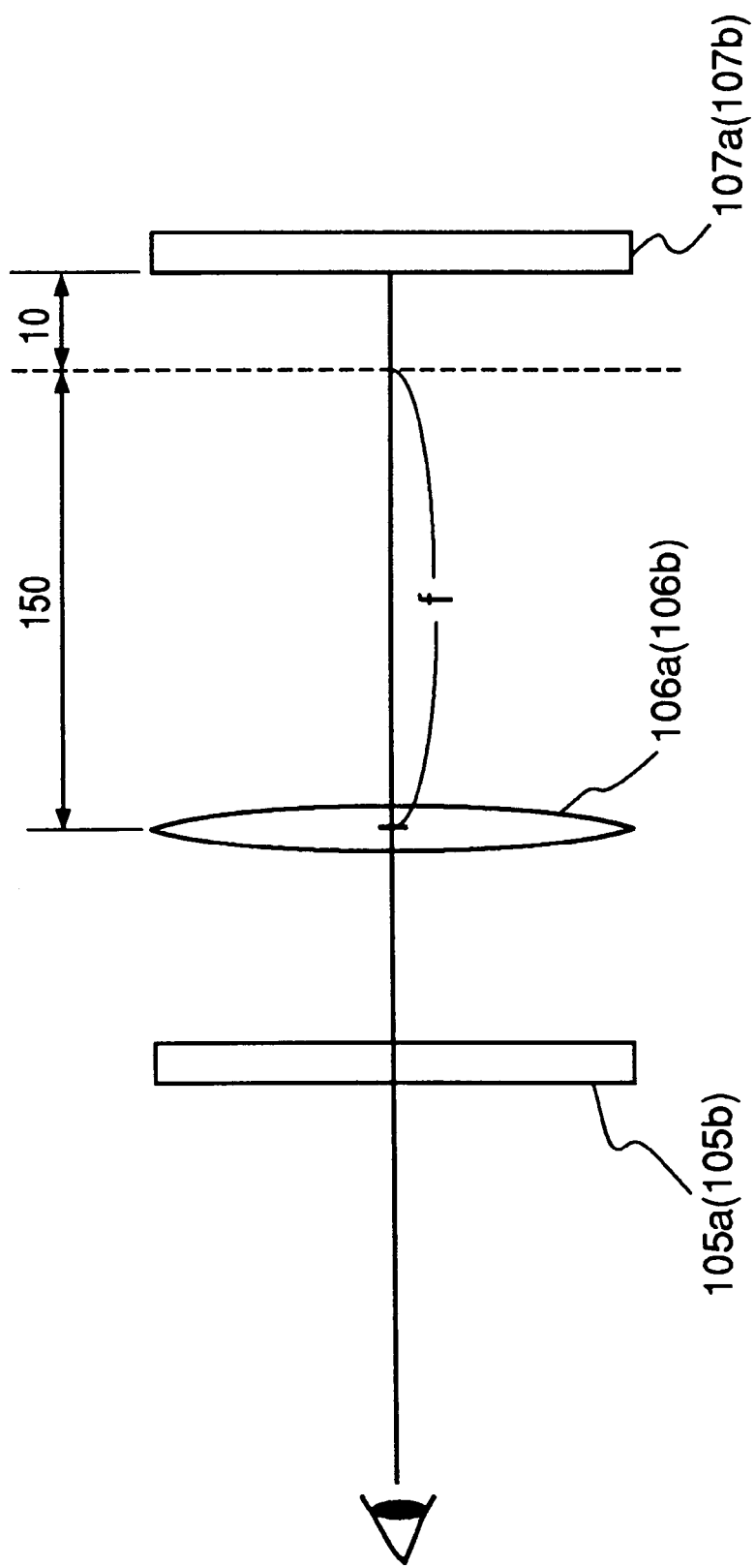
FIG. 31 is an explanatory view of the positional relation among a lens, a monochromatic LCD, and a color LCD in the eighth embodiment.

The operation of the Fresnel lenses 106a and 106b will be described with reference to FIG. 31. The Fresnel lens 106a (106b) is set so that the player sees the player's image displayed on the LCD 107a (107b) as a virtual image with the right eye. As shown in FIG. 31, the distance between the Fresnel lens 106a (106b) and the LCD 107a (107b) is set to be longer than the focal distance of the Fresnel lens 106a (106b), thus the image displayed on the LCD 107a (107b) is enlarged within the effective diameter of the Fresnel lens 106a (106b) only for the player's right (left) eye, and the light from the LCD 107a enters only the right (left) eye.

The present apparatus having the above construction operates so that the screen image (R) displayed on the LCD 105a is backlighted to be visible only to the player's right eye, while the screen image (L) displayed on the LCD 105b is backlighted to be visible only to the player's left eye. Thus, the player can see the screen images simultaneously and obtain stereoscopic vision. If the player moves, so far as the condition of illumination by the LED's is maintained, the stereoscopic vision can be continued.

Next, the operation of the circularly polarizing plates 117a and 117b will be described with reference to FIG. 32.

Figure 32:
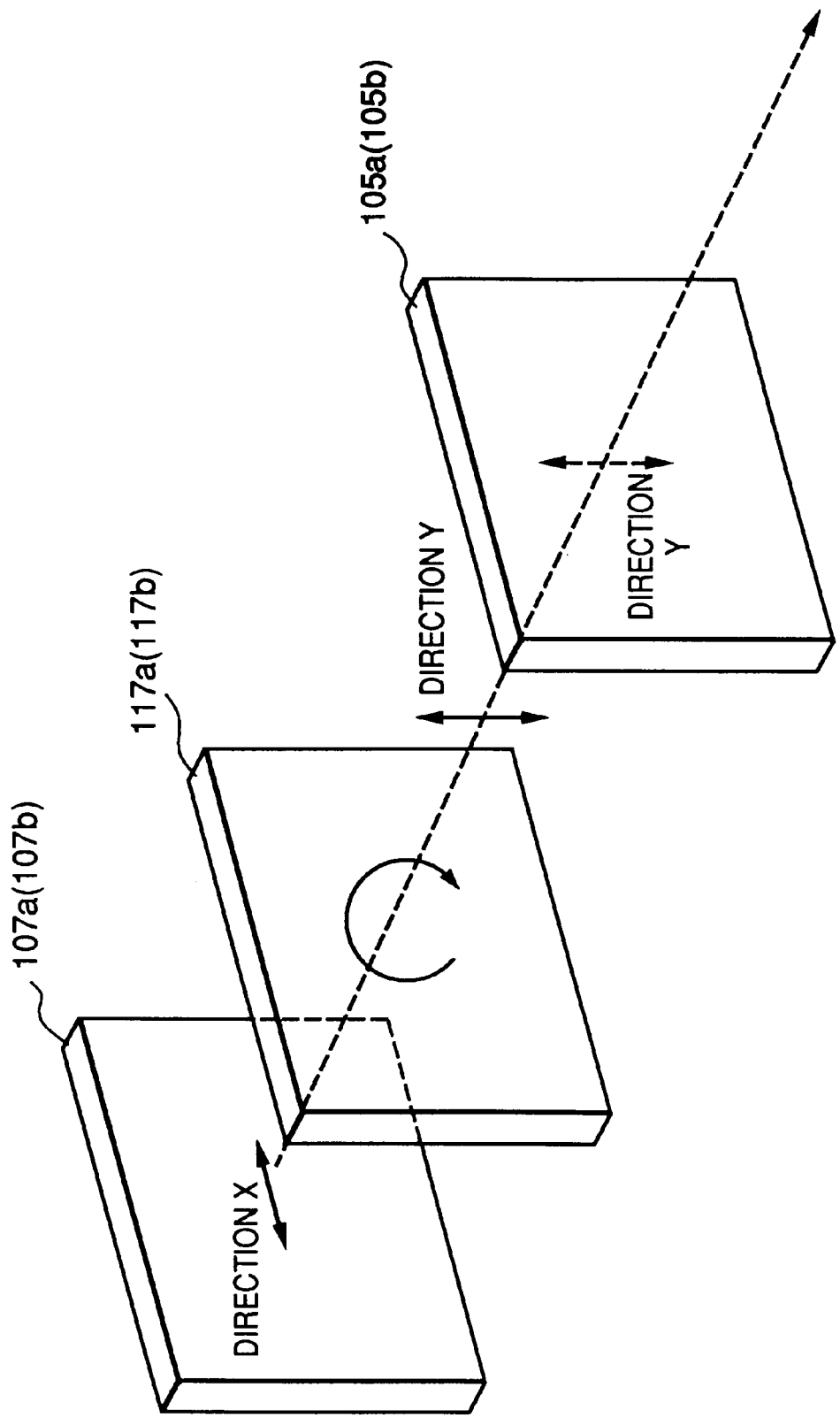
FIG. 32 is an explanatory view of polarization of light in the eight embodiment.

FIG. 32 shows the transmission of light from the LCD 107a (107b), where the circularly polarizing plate 117a (117b) changes the polarized direction of the light about to correspond with the polarized-light passing characteristic of the LCD 105a (105b).

As described above, the present embodiment employs monochromatic LCD's as backlight sources for the color LCD's 105a (105b). The LCD's polarize incident light in a predetermined direction. For this reason, in this embodiment, the light from the LCD 107a (107b) is polarized in the direction X. As shown in FIG. 32, the color LCD 107a (107b) has the polarizing direction Y, therefore, the amount of light that passes through the LCD 105a (105b) is extremely reduced.

The circularly polarizing plate 117a (117b) circular-polarizes the light from the LCD 107a (107b). The circularly polarizing plate 117a (117b) is adjusted so that the polarized direction of the light from the LCD 107a (107b) approximately correspond with the polarizing direction of the LCD 105a (105b). In this manner, extreme reduction of the amount of light passing through the LCD 105a (105b) can be prevented.

According to the eighth embodiment, as the backlight control figures correspond to the right-half face and the left-half face of the player, if the position of the. player moves, the backlight control figures shift corresponding to the movement of the player. In other words, the backlighting positions move in correspondence with the movement of the player, the player can obtain stereoscopic vision continuously. Further, the lights from the backlight source LCD's are circular-polarized, so that a predetermined amount of light can pass through the color LCD's, thus, the player can see bright stereoscopic images.

Displaying arrangement of screen images and control figures on the displays according to the present embodiment will be explained below.

The lenses 106a, 106b function to give directivity to light of screen and control images where the images are turned upside down.

The screen image R is inputted to the display 105a without being turned upside down, thus inverted right to left.

The control figure R should be inputted to the display 107a with inverted only in the longitudinal direction for the same reason of the second embodiment.

The screen image L is inputted to the display 105b with turned upside down and converted into mirror image, because the mirror 111 is positioned to the left position with respect to the mirror 111 and between the display 105b and the viewer. The control figure L should be inputted to the display 107b with inverted upside down and converted into mirror image due to the presence of the mirror 111.

FIG. 30 further illustrates another example of arrangement of the displays according to the present embodiment. The settings of the displays and the method of data inversion are similar to those of the eighth embodiment illustrated in FIG. 28.

Ninth Embodiment

FIG. 33 shows the construction of a stereoscopic-image game playing apparatus according to a ninth embodiment of the present invention. Similar to the previous embodiments, in the apparatus according to the present embodiment comprises a plurality of displays. The displays are set "normally" unless otherwise specified.

In the first to eighth embodiments, even when the player moves to an arbitrary position, the backlight control figure or the transmission control figure moves following the movement of the player. For the purpose of following the movement of the player, these embodiments need means for detecting the player's position. The ninth embodiment employs mask plates in place of the LCD's as space modulator, which limits an allowable range where the player can obtain stereoscopic vision, but simplifies the apparatus construction.

In FIG. 33, numerals 113a and 113b denote CRT's for displaying a screen image (R) and a screen image (L); and 300a and 300b, a mask plate for right eye (hereinafter referred to as "mask plate (R)") and a mask plate for left eye (hereinafter referred to as "mask plate (L)") provided in front of the CRT's 113a and 113b.

The mask plates may be glass plates with opaque coating. As shown in FIG. 33, the mask plates have a transparent area and an opaque area in place of the transmission control figure or the polarized-light control figure displayed on the LCD as in the third to sixth embodiments. On the mask plates 300a and 300b, a hatched area represents the opaque area.

In FIG. 33, numeral 111 denotes a half mirror for combining the screen images displayed on the CRT's 113a and 113b; and 160, a group of lenses for enlarging the combined image.

Figure 34:
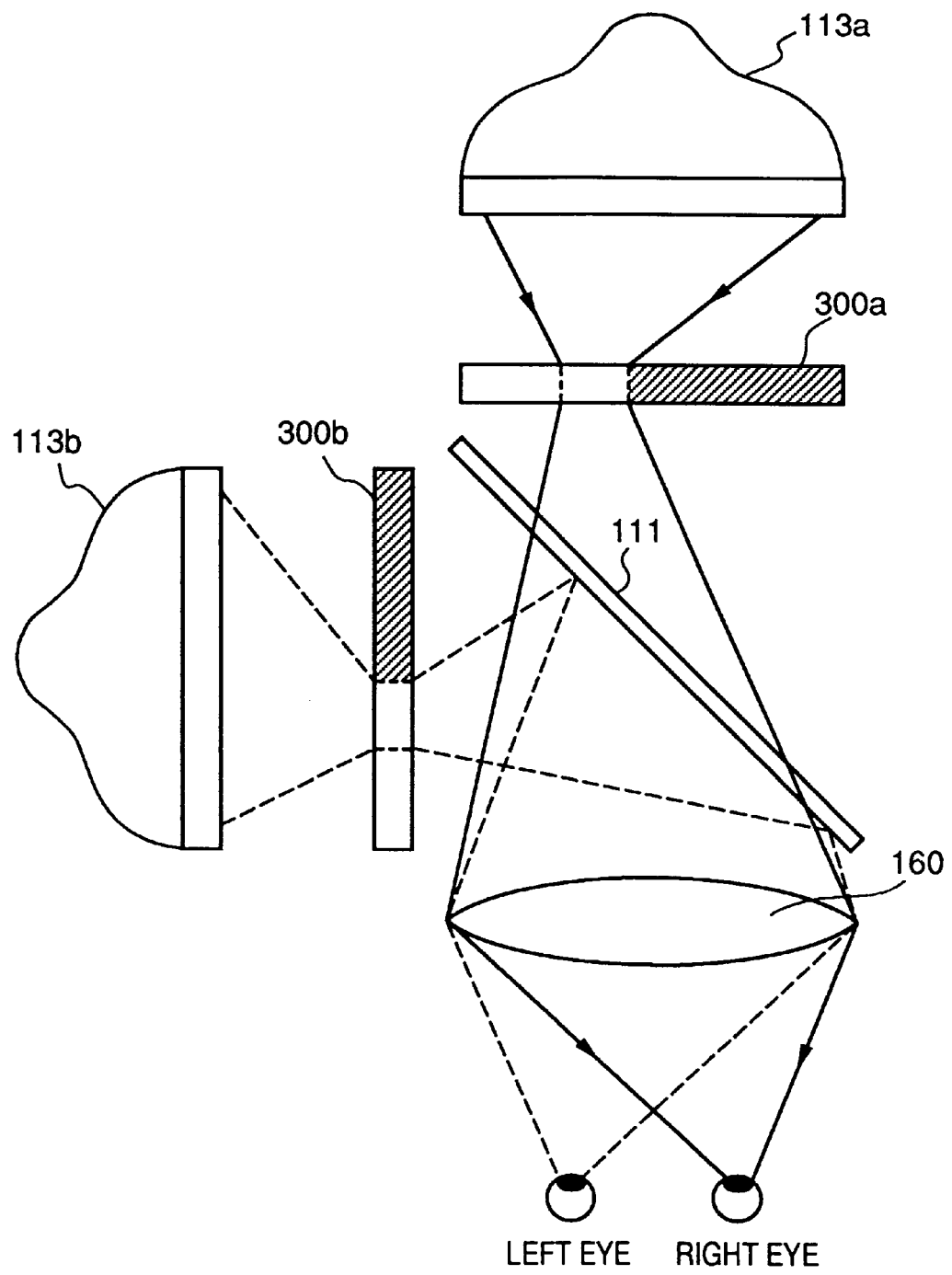
FIG. 34 is an explanatory view of light paths in the ninth embodiment.

FIG. 34 shows optical paths where the light from the screen image (R) displayed on the CRT 113a and the light from the screen image (L) displayed on the CRT 113b enter the player's right and left eyes via the mask plates 300a and 300b. The positional relation among the lens group 160 and the mask plates 300a and 300b is substantially the same as that between the imaginary lens 160' and the CRT 107a (107b) in the seventh embodiment. The player's right eye sees the screen image (R) displayed on the CRT 113a through the transparent area of the mask plate 300a, and the player's left eye sees the screen image (L) displayed on the CRT 113b through the transparent area of the mask plate 300b.

The ninth embodiment does not need any image sensing device and irradiation device for image sensing the player.

Displaying arrangement of screen images and control figures on the displays according to the present embodiment will be explained below.

The lens 111 functions to give directivity to light of screen and control images where the images are turned upside down.

The screen image R is inputted to the display 113a with turned upside down. The screen image L is inputted to the display 113b with turned upside down and converted into mirror image, because the mirror 111 is positioned between the display 105b and the viewer.

FIG. 33 further illustrates another example of arrangement of the displays according to the present embodiment. The settings of the displays and the method of data inversion are similar to those of the eighth embodiment illustrated in FIG. 28.

Tenth Embodiment

Figure 35:
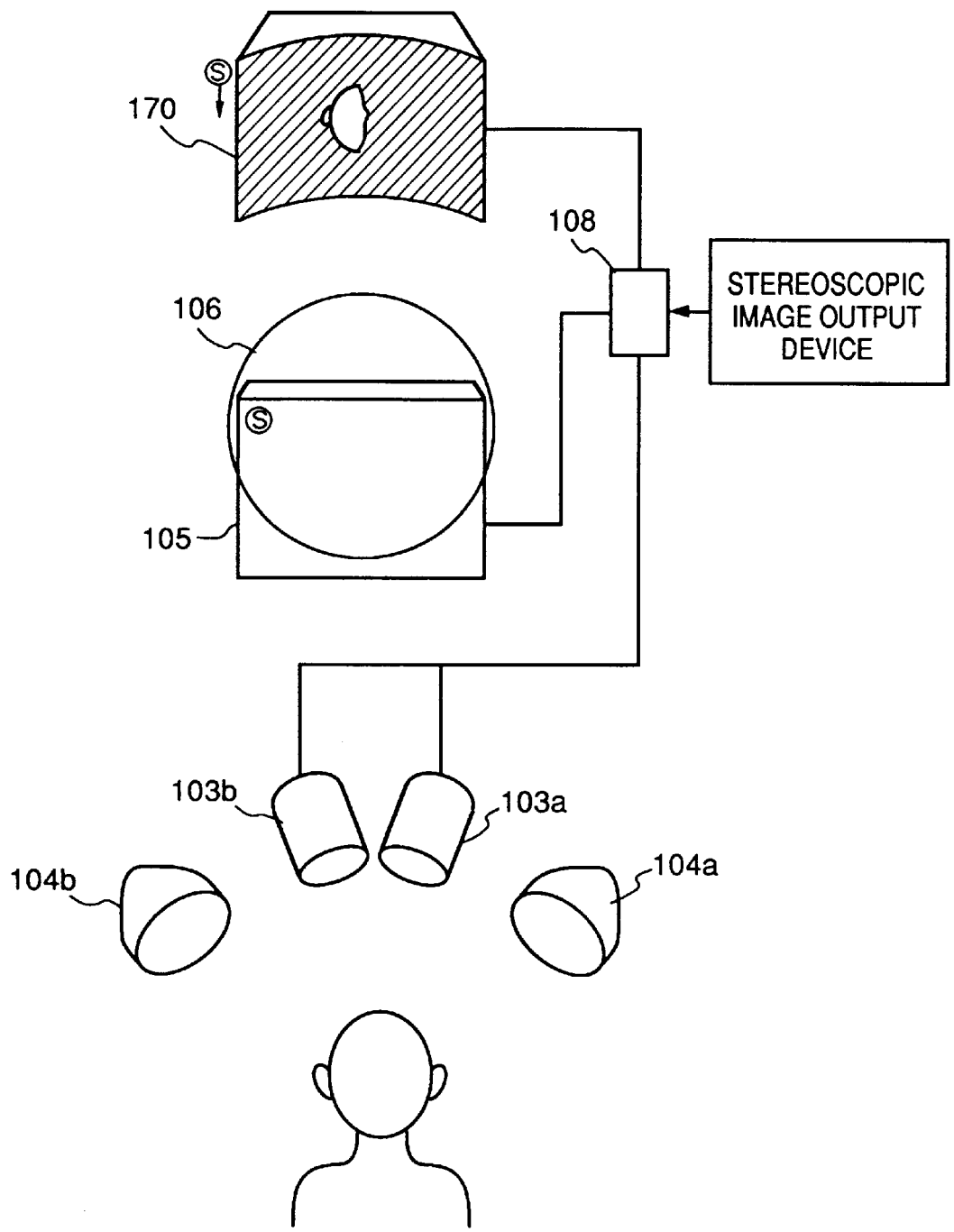
FIG. 35 is a perspective view showing of a stereoscopic-image game playing apparatus according to a tenth embodiment of the present invention.

FIG. 35 shows the construction of a stereoscopic-image game playing apparatus according to a tenth embodiment of the present invention. The stereoscopic-image game playing apparatus uses a backlight having a warped light-emitting surface. Similar to the previous embodiments, in the apparatus according to the present embodiment comprises a plurality of displays. The displays are set "normally" unless otherwise specified.

In FIG. 35, numeral 105 denotes a light-transmitting type LCD as a space modulator; 106, a Fresnel lens as an optical device, located behind the LCD 105; and 170, a backlight as a light emitting device.

The backlight 170 has a light-emitting surface (display surface) which is warped inward. As a display device having a warped light-emitting surface, various devices such as an LCD and a CRT may be used, however, in consideration of manufacturing simplicity and costs, a light comprising optical fibers may preferably be used.

Figure 36:
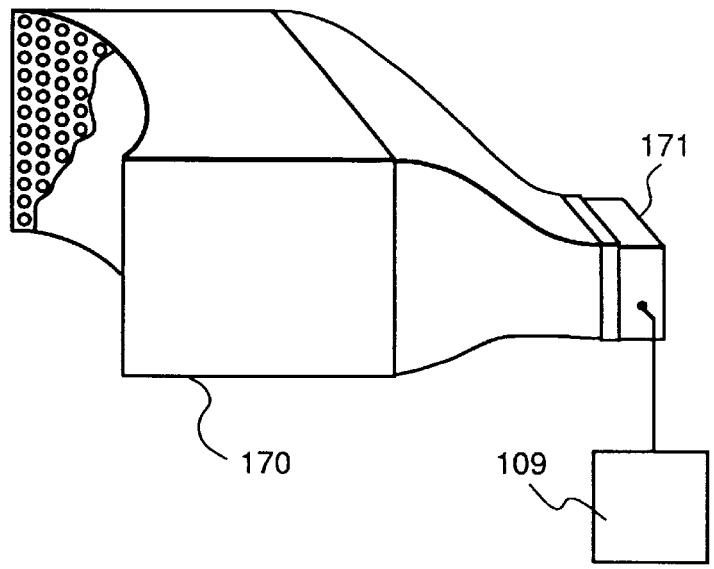
FIG. 36 is a perspective view showing of a backlight device of the tenth embodiment.
Figure 37:
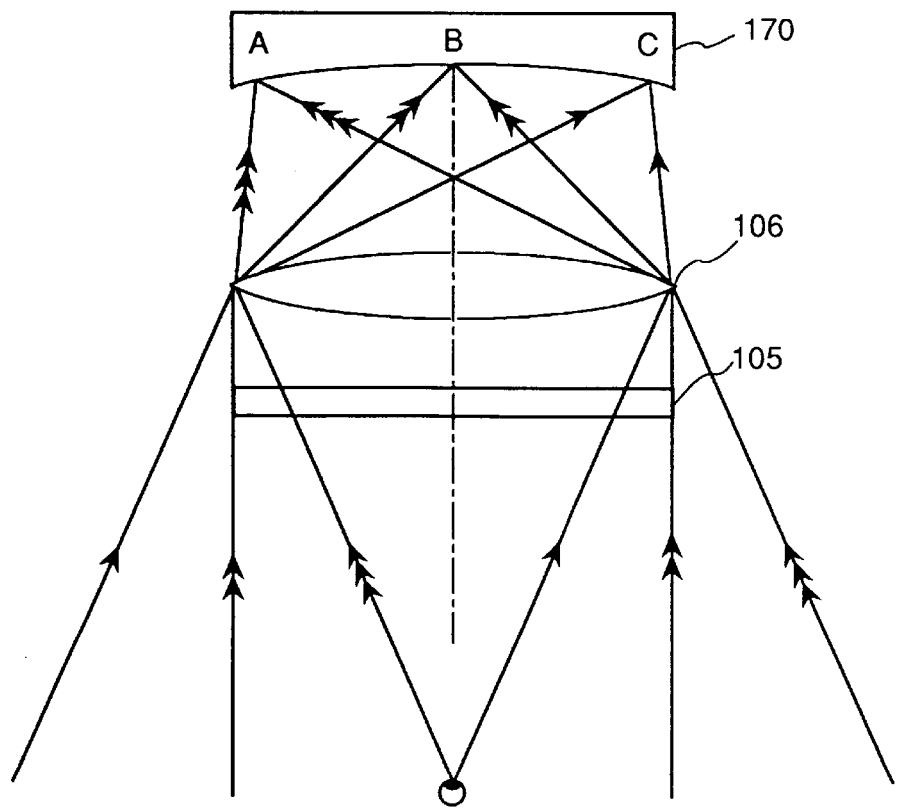
FIG. 37 shows the construction of the backlight device of the tenth embodiment.

FIGS. 36 and 37 receptively show the construction of the backlight 170 in the tenth embodiment. In FIG. 36, numeral 171 denotes a display device.

Note that the backlight 170 may detect the position of the player using a position detecting device and display a pre-registered backlight control figure, in place of the player's image, at the obtained coordinate position.

Displaying arrangement of screen images and control figures on the displays according to the present embodiment is the same as in the first embodiment.

Eleventh Embodiment

Figure 38:
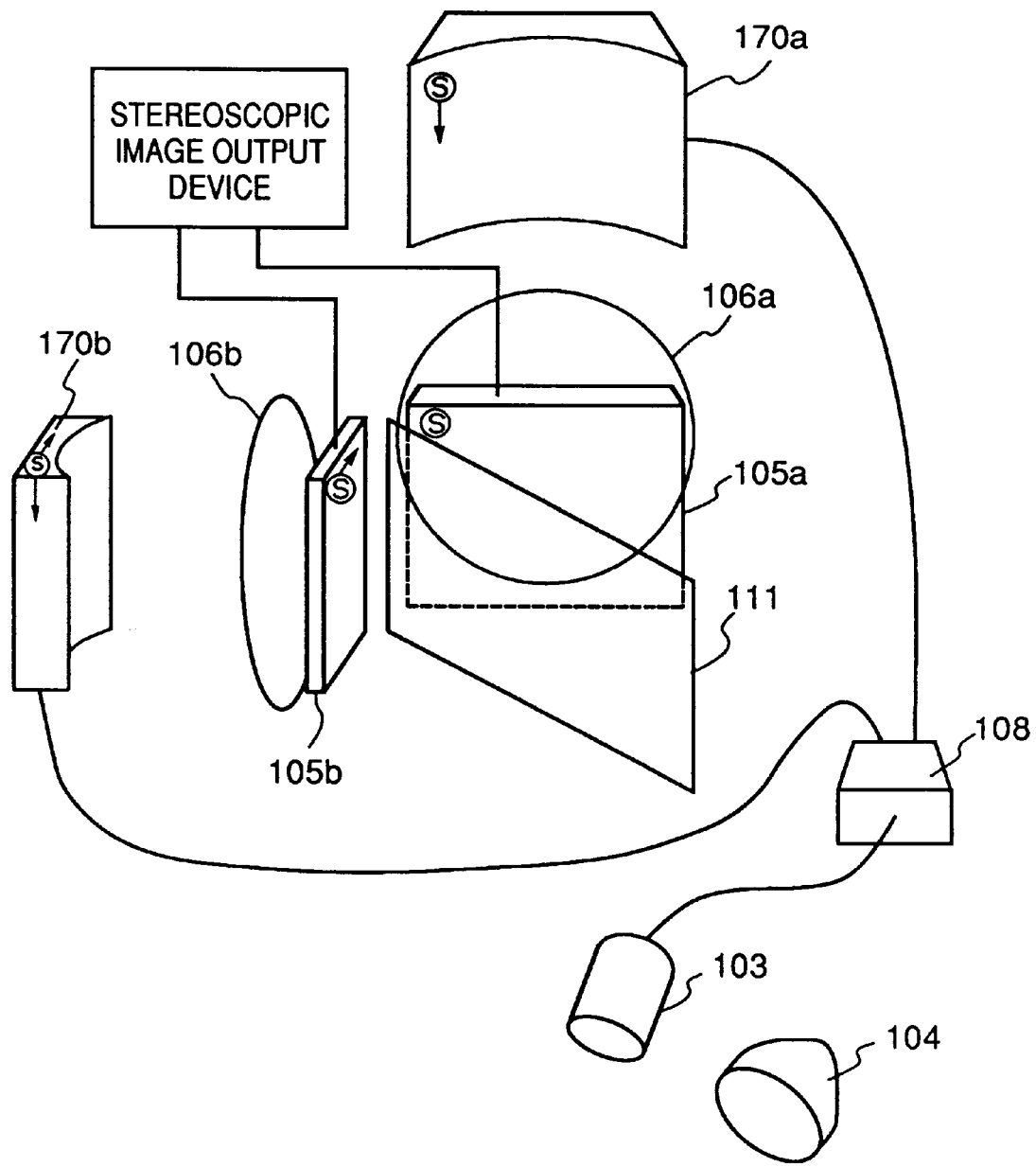
FIG. 38 is a perspective view showing of a stereoscopic-image game playing apparatus according to an eleventh embodiment of the present invention.

FIG. 38 shows the construction of a stereoscopic-image game playing apparatus according to an eleventh embodiment of the present invention. The stereoscopic-image game playing apparatus has a similar overview to that of the apparatus of the second embodiment shown in FIG. 2 except that the apparatus has one irradiation device and one camera. Similar to the previous embodiments, in the apparatus according to the present embodiment comprises a plurality of displays. The displays are set "normally" unless otherwise specified.

In FIG. 38, numeral 103 denotes a CCD camera as an image sensing device; 105a and 105b, light-transmitting type LCD's as space modulators; 106a and 106b, convex lenses as optical devices respectively having a 150 mm focal distance, located behind the LCD's 105a and 105b; 170a and 170b, backlighting devices having light-emitting function, located at positions 160 nm (longer than the focal distance of the lenses 106a and 106b) distant from the lenses 106a and 106b, opposite to the LCD's 105a and 105b; 104, an infrared light; and 111, a half mirror as an image combining means for combining screen images displayed on the LCD's 105a and 105b; and 109, an image processor.

The operation of the stereoscopic image communication apparatus having the above construction is basically the same as that of the apparatus of the tenth embodiment, therefore, the elements corresponding to those in the tenth embodiment have the same reference numerals, the explanations of these elements will be omitted, and only the difference from the tenth embodiment will be described.

The difference from the tenth embodiment is that the tenth embodiment employs one display device for time-divisionally displaying screen images, whereas the eleventh embodiment employs two display devices for displaying screen images in parallel, and a half mirror for combining the screen images.

Further, the tenth embodiment employs two image sensing devices to obtain player's images respectively corresponding to right/left half faces of the player as backlight control figures, whereas the eleventh embodiment employs one image sensing device (CCD camera 103) to obtain the player's image corresponding to the right half face of the player as a backlight control figure (R). The right-half face image is negative/positive-inverted to obtain a backlight control figure (L). The backlighting device 170a displays the backlight control figure (R), while the backlighting device 170b displays the backlight control figure (L). The LCD 105a displays the screen image (R), while the LCD 105b displays the screen image (L). In this manner, the eleventh embodiment obtains the same advantage as that in the tenth embodiment.

Figure 39:
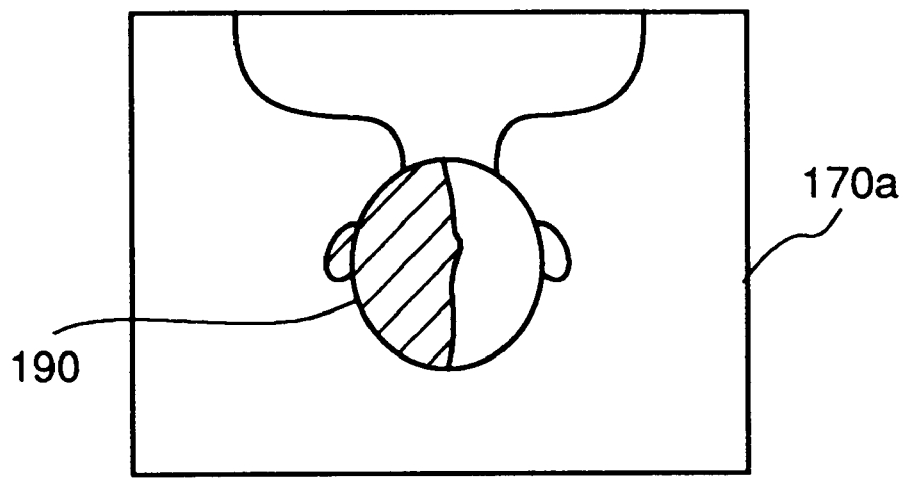
FIGS. 39 and 40 respectively show a backlight control figure used in the eleventh embodiment.
Figure 40:
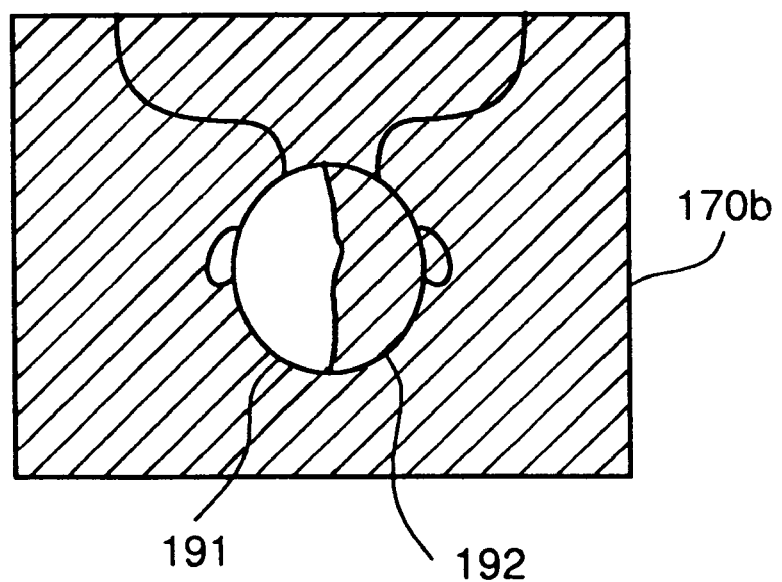

FIG. 39 shows the backlight control figure (R) displayed on the backlighting device 170a. FIG. 40 shows the backlight control figure (L), obtained by negative/positive inversion from the backlight control figure (R), displayed on the backlighting device 170b. In FIG. 39, the backlighting device 170a emits light at a hatched area 190 as a light-emitting portion, on the other hand, in FIG. 40, the backlighting device 170b does not emit light at an area 191 corresponding to the area 190 in FIG. 39, but emits light at a hatched area 192, i.e., the whole area except a non-hatched area 191. Note that the light from the area 190 is enlarged only to the right eye by the Fresnel lens 106a, and similarly, the light from the area 192 is enlarged only to the left eye by the Fresnel lens 106b (not shown). Different from the backlight control figure (L) in the tenth embodiment, the area 192 includes an area except the player's image area (background area), however, the backlight control figure (L) fulfills the same function as that in the tenth embodiment, since the player cannot see the background area with both eyes.

Note that the stereoscopic-image game playing apparatus of the ninth and tenth embodiments can attain similar advantages as that in the eleventh embodiment.

Displaying arrangement of screen images and control figures on the displays according to the present embodiment is the same as in the eighth embodiment.

FIG. 38 further illustrates another example of arrangement of the displays according to the present embodiment. The settings of the displays and the method of data inversion are similar to those of the eighth embodiment illustrated in FIG. 28.

Twelfth Embodiment

Figure 41:
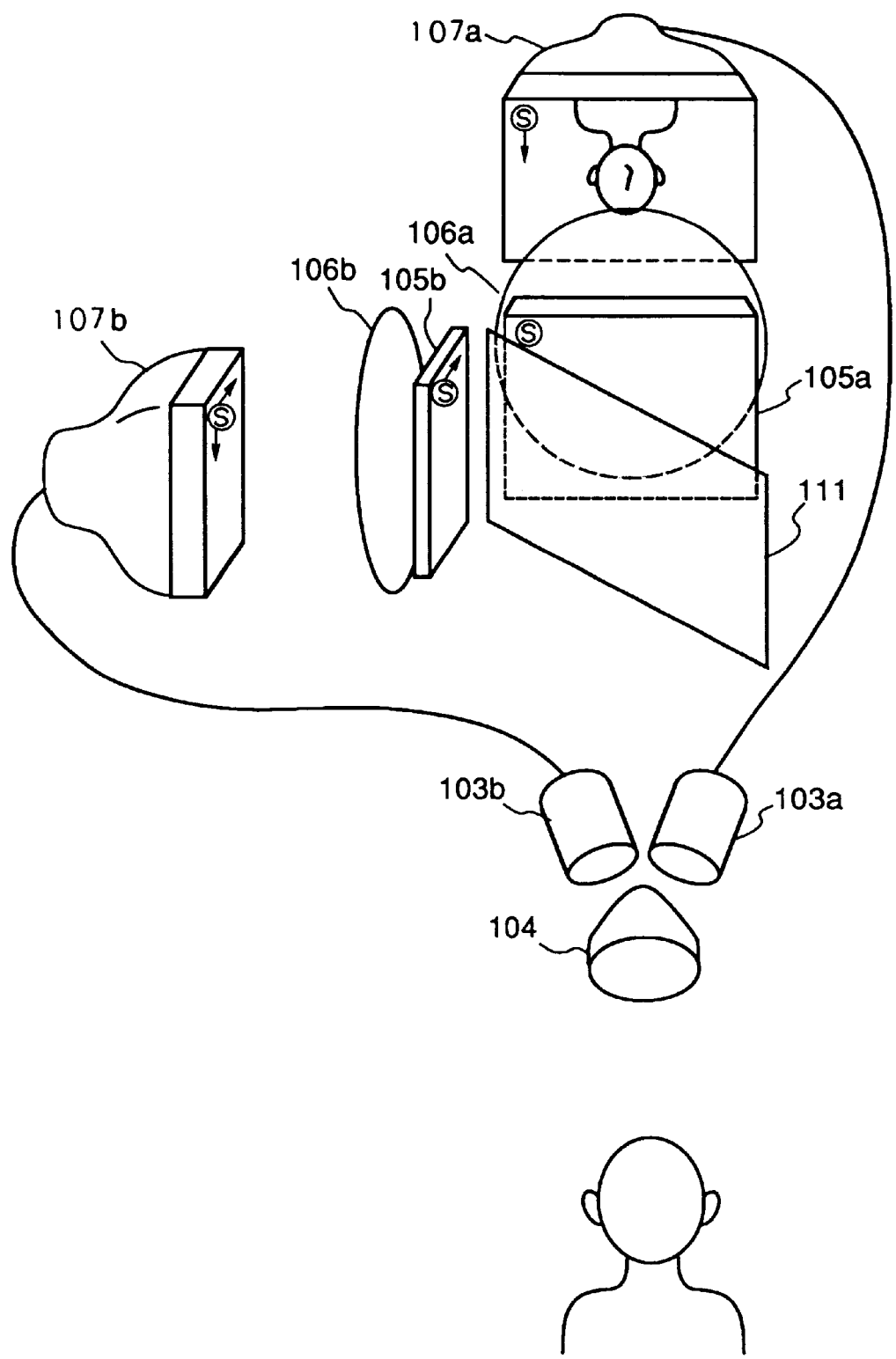
FIG. 41 is a perspective view showing of a stereoscopic-image game playing apparatus according to a twelfth embodiment of the present invention.

FIG. 41 shows the construction of a stereoscopic-image game playing apparatus according to a twelfth embodiment of the present invention. Similar to the eleventh embodiment, the twelfth embodiment displays a backlight control figure (R) and a backlight control figure (L) to backlight LCD's displaying screen images. The twelfth embodiment employs one irradiation device and two cameras for image sensing the player. Similar to the previous embodiments, in the apparatus according to the present embodiment comprises a plurality of displays. The displays are set "normally" unless otherwise specified.

Figure 43:
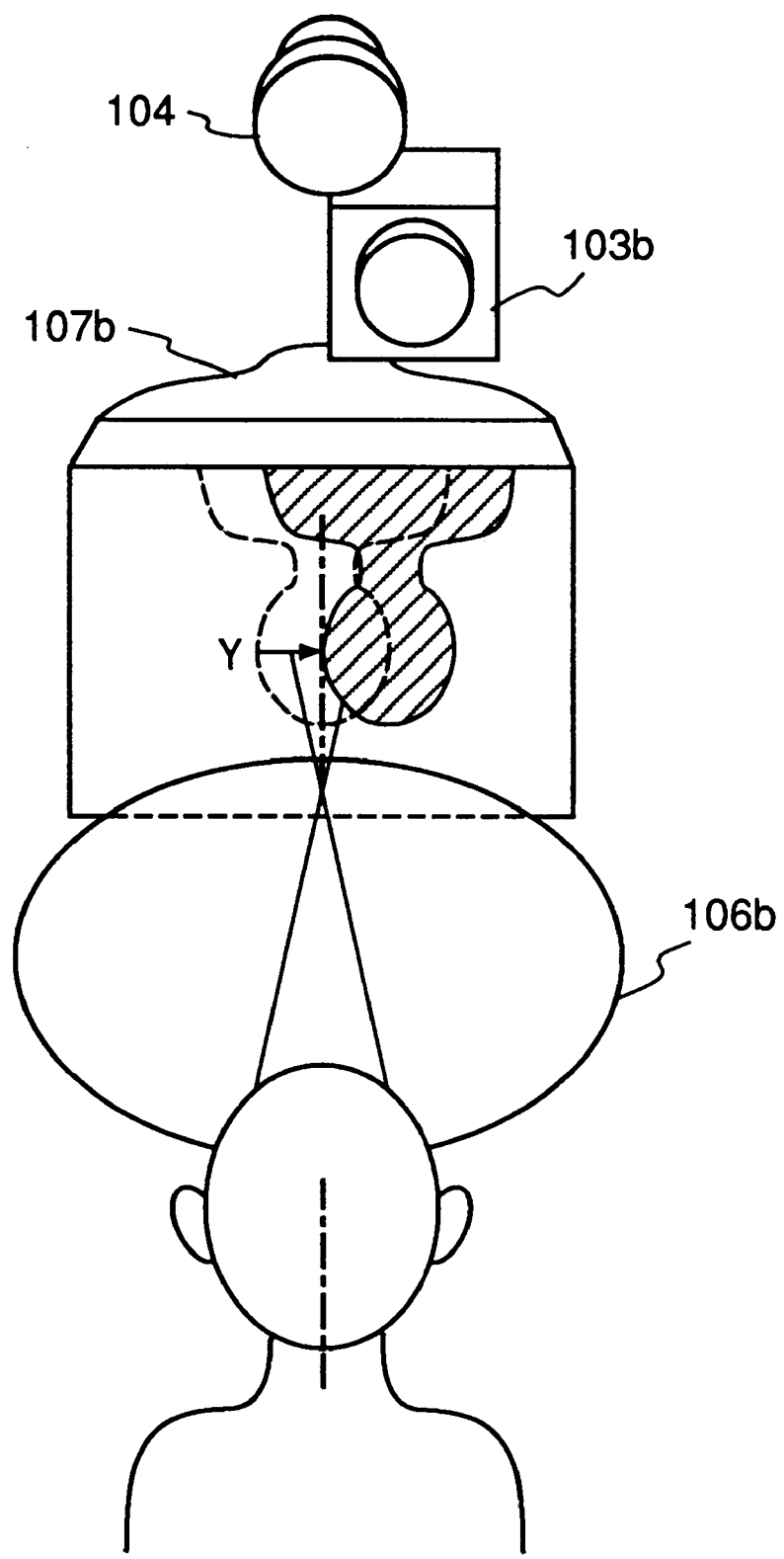

FIGS. 42 and 43 show the principles of the operation of the stereoscopic-image game playing apparatus. In FIGS. 42 and 43, numerals 107a and 107b denote monochromatic CRT's for displaying the backlight control figures. In this embodiment, the player's image obtained by the camera is displayed on the CRT's as a backlight control figure.

FIG. 42 shows the principle of generation of the backlight control figure (R). FIG. 43 shows the principle of generation of the backlight control figure (L). As shown in FIGS. 42 and 43, an irradiation device 104 is provided in front of the player on a line extended from the central position of a sheet of the player, so that the player's face is irradiated at the whole area.

In FIG. 42, a camera 103a is provided at a position shifted leftward from a center of the irradiation device 104. On the CRT 107a, a hatched area represents the player's image obtained by the camera 103a, and a broken line represents the position where the player's image is displayed if the camera 103a is located at the central position. In this manner, the player's image is displayed shifted leftward by a width length of the half face from the center of the display surface, and is used as a backlight control figure (R).

In FIG. 43, a camera 103b is provided at a position shifted rightward from the irradiation device 104. On the CRT 107b, a hatched area represents the player's image obtained by the camera 103b, and a broken line represents the position where the player's image is displayed if the camera 103b is located at the central position. In this manner, the player's image is displayed shifted rightward by a width length of the half face from the center of the display surface, and is used as a backlight control figure (L).

As it is apparent from FIGS. 42 and 43, the backlight control figure (R) and the backlight control figure (L) obtained in this embodiment do not overlap with each other. Accordingly, when the CRT's 107a and 107b display these backlight control figures, these figures respectively introduce the light from the screen image (R) into the player's right eye and the light from the stereo image (L) into the player's left eye.

Note that in FIG. 41, the backlight control figure (R) displayed on the CRT 107a is inverted only upside down in consideration of the directivity of a lens 106a; the screen image (L) displayed on an LCD 105b is converted into mirror image in consideration of the reflection by a half mirror 111; and the backlight control figure (L) displayed on the CRT 107b is inverted only upside down and converted into a mirror image in consideration of the function of a lens 106b and the reflection by the half mirror 111.

Displaying arrangement of screen images and control figures on the displays according to the present embodiment is the same as in the eighth embodiment.

Thirteenth Embodiment

Figure 44:
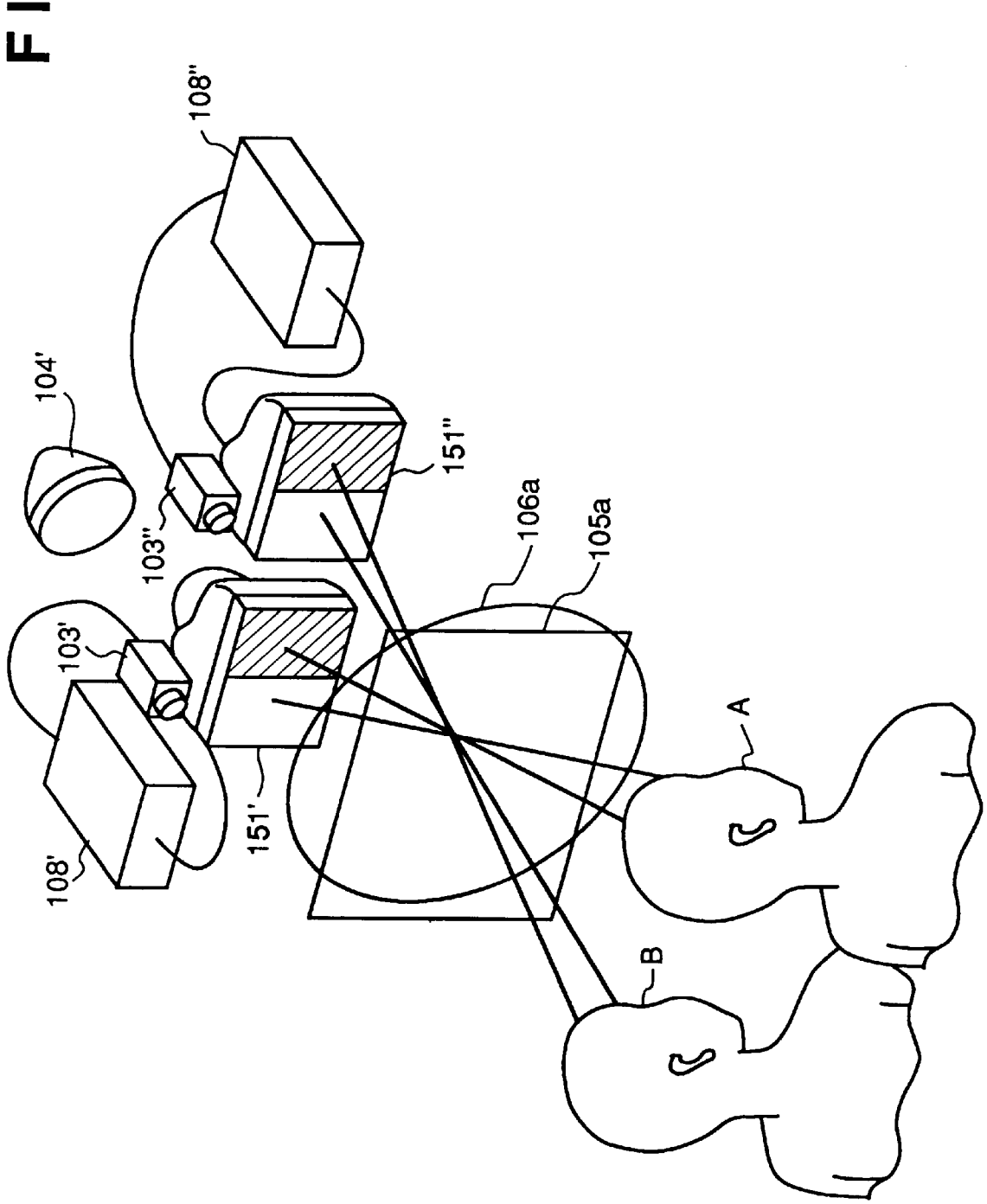
FIG. 44 is a perspective view showing of an image sensing device, a display control device and a backlight device in a thirteenth embodiment of the present invention.

FIG. 44 shows the construction of a stereoscopic-image game playing apparatus according to a thirteenth embodiment of the present invention. As the stereoscopic-image game playing apparatus can be operated by a plurality of players, the apparatus employs a set of backlighting devices, a light and a camera, for each of a plurality of players. Note that FIG. 44 shows only the systems for the players' right eyes, and omits the systems for the left eyes, for the purpose of simplicity. Similar to the previous embodiments, in the apparatus according to the present embodiment comprises a plurality of displays. The displays are set "normally" unless otherwise specified.

In FIG. 44, numeral 104' denotes a light for irradiating a player A (a light for a player B is omitted); 151' and 151", backlighting devices comprising monochromatic CRT's respectively for the players A and B; 103' and 103", CCD cameras for image sensing the players A and B. In this manner, a set of a camera, a light and backlighting devices is provided for each player.

An image processor 110' detects the centroid in the player A's face from the player A's image obtained by the camera 103'. The centroid corresponds to the central portion (approximately the position of the nose) of the player. The image processor 110' adjusts the centroid to the center of the display surface of the backlight 151', and drives the backlight 151' so that the left portion from the center of the display surface becomes a light-emitting (bright) portion.

In the present embodiment, the positions of the players A and B are respectively set within a predetermined range. As it is understood from FIG. 45, to cover the movement of the player in a wide rage, it is adjusted such that, in a case where the player stands at the center of the predetermined range, the border between an irradiated part and an unirradiated part in the face corresponds to the center of the display surface of the backlight.

Figure 45:
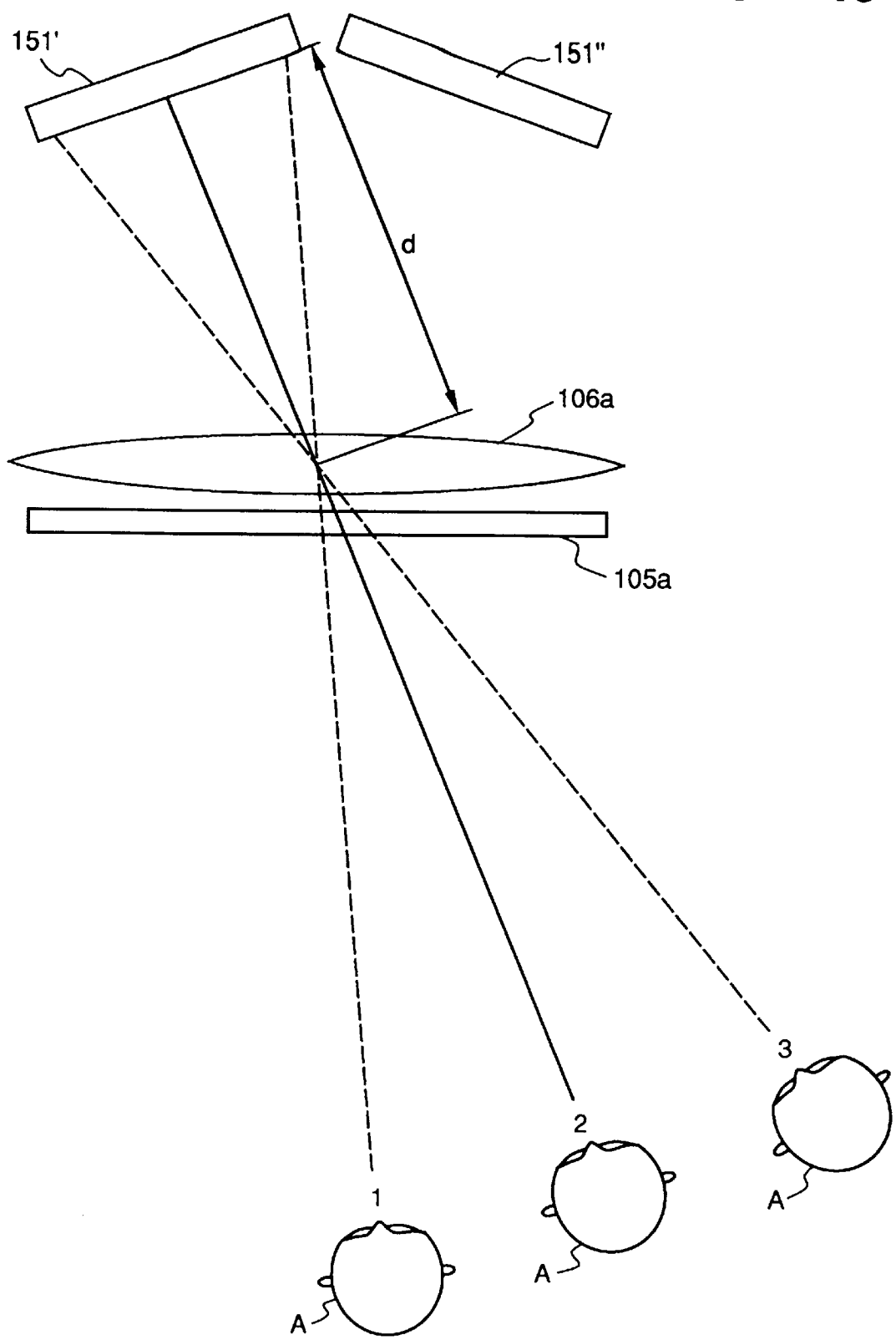
FIG. 45 is a top plan view of the image sensing device, the display control device and the backlight device in the thirteenth embodiment.

More specifically, in the display surface of the backlight 151' in FIG. 45, the border between the light-emitting (bright) portion and the light-blocked (dark) portion is set to the center of the display surface when the player A stands at a position 2. If the player A stands at a position 3, the player A sees no bright portion on the display surface. If the player A stands at a position 1, the player A sees the whole image area as the bright portion. Accordingly, the allowable moving range of the player A' is within the interval between the position 3 and the position 1. In this manner, the relation between the player's position and the backlight position is adjusted in advance, and later, the border between the bright and dark portions of the display surface of the backlight is moved corresponding to the movement of the player.

Regarding the player B, the CCD camera 103", an image processor 110" and the backlight 151" operate in the same manner as that of the camera 103', the image processor 110' and the backlight 151' for the player A. Further, the backlights for left eye (not shown) operate in the same manner as that of the backlights 151' and 151" except that the bright portion of the display surface of the backlight for left eye is a right portion from the center of the display surface.

In this manner, the setting of the light and the backlights is made with respect to each player, so that the player's position can be obtained more exactly by each player.

Fourteenth Embodiment

Figure 46:
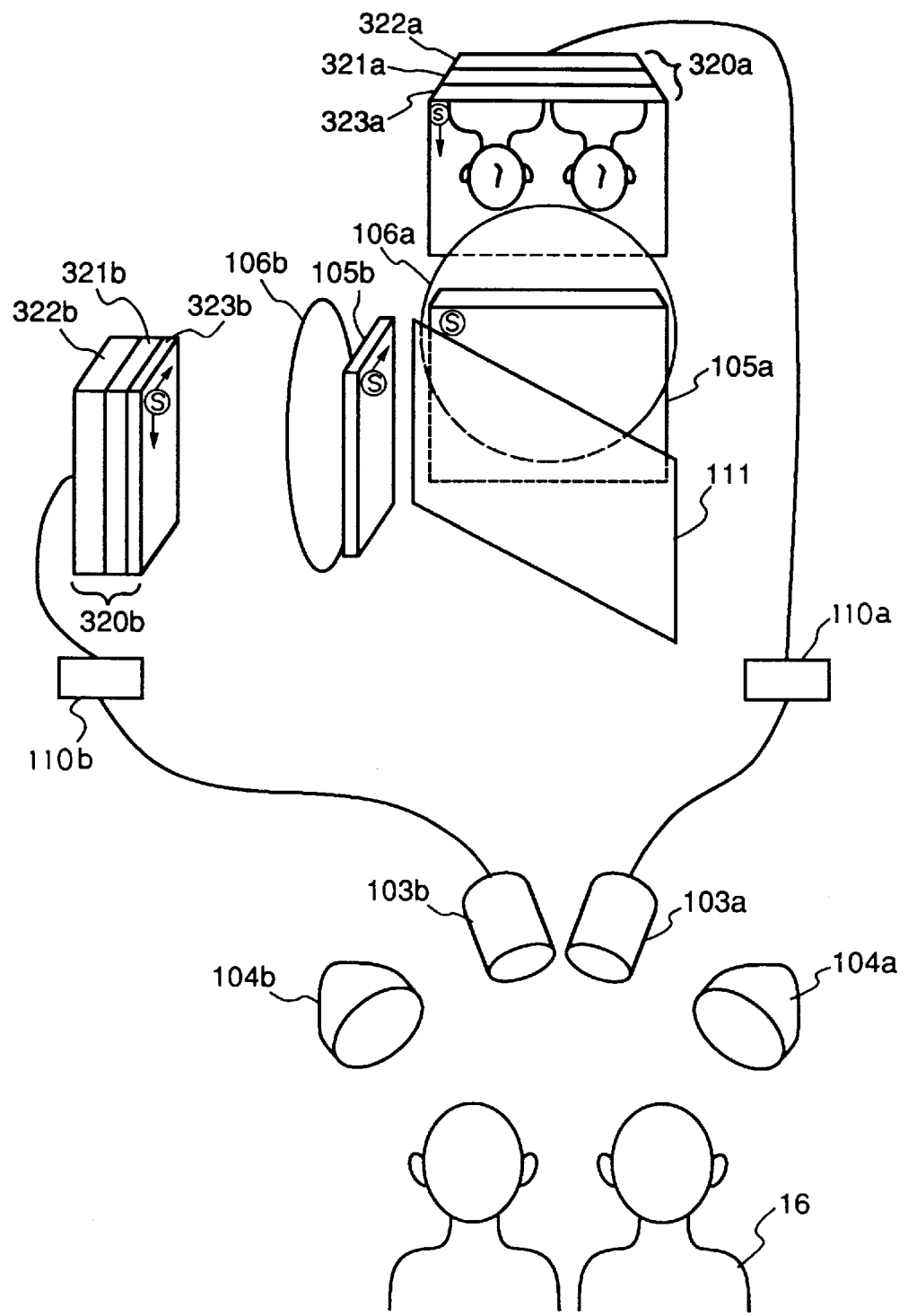
FIG. 46 is a perspective view showing of a stereoscopic-image game playing apparatus according to a fourteenth embodiment of the present invention.

FIG. 46 shows the construction of a stereoscopic image communication apparatus according to a fourteenth embodiment of the present invention. The fourteenth embodiment employs an optical fiber plate in front of the display surface of a backlighting device. Similar to the previous embodiments, in the apparatus according to the present embodiment comprises a plurality of displays. The displays are set "normally" unless otherwise specified.

For the purpose of downsizing of the apparatus, the fourteenth embodiment employs LCD panels 320a and 320b respectively having a backlight as a light-emitting device. Specifically, the LCD panels 320a and 320b respectively comprise liquid crystal panels 321a and 321b, backlight sources 322a and 322b, and optical fiber plates 323a and 323b. The optical fiber plates 323a and 323b, respectively comprising optical fibers, are provided in front of the liquid crystal panels 321a and 321b, at positions away from the liquid crystal panels 321a and 321b by a predetermined distance.

It should be noted that an LCD device has a problem in contrast adjustment when it is employed as a backlight device. That is, the image displayed on the backlight device must have good contrast and sharpness so as to pass the backlight to one eye but at the same time block the backlight to the opposite eye.

However, in a case where the backlight device comprises a liquid crystal panel and a backlight source, the light from the backlight source includes scattered light, and the black level at a light-blocked area of the liquid crystal panel is low. As a result, the image backlighted through the liquid crystal panel cannot obtain good contrast and sharpness. This may cause crosstalk, i.e., a phenomenon that the backlight control image for one eye may be caught by the opposite eye as an image at a very low contrast level. In the present embodiment, the optical fiber plates 323a and 323b are provided to solve this problem.

Figure 47:
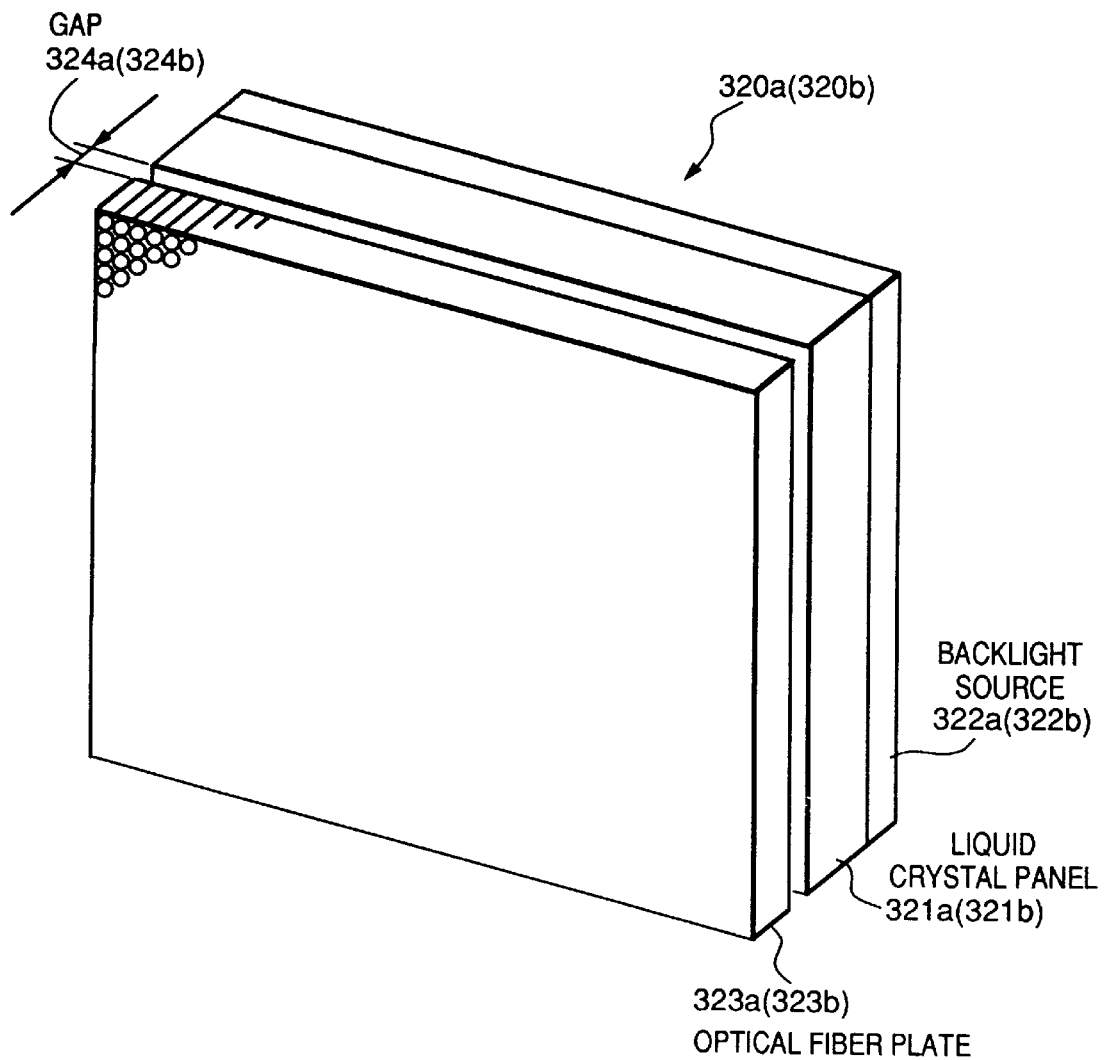
FIG. 47 is a perspective view showing of a light-emitting device in the fourteenth embodiment.

FIG. 47 shows the construction of the LCD panel 320a (320b) as a light-emitting device. The optical fiber plate 323a (323b) is provided in front of a display device comprising the liquid crystal panel 321a (321b) and the backlight source 322a (322b), with a predetermined gap 324a (324b) from the display device.

The gap 324a (324b) effectively eliminates unnecessary scattered light from the display device. For this purpose, the gap is 0.1 to 1 mm. The incident light having an angle of incidence larger than a predetermined angle is reflected by the end surfaces of the optical fibers. The unnecessary scattered light cannot pass through the optical fiber plate, which improves the contras and sharpness of the displayed image.

According to the stereoscopic image communication apparatus, the following advantages are obtained.

① Stereoscopic vision can be obtained without any specific tool such as image-separating glasses.

② The optical fiber plate is provided in front of the LCD with a predetermined gap from the LCD to reflect scattered light from the LCD by the end surfaces of the optical fibers. This arrangement effectively eliminates scattered light, and enables the LCD as a light-emitting device to obtain good contrast. Thus, stereoscopic vision can be obtained without crosstalk.

③ The backlight source, based on the player's image obtained by the camera 103a (103b), moves in accordance with the movements of the player. In other words, if the player moves, as the backlight shifts following the movement of the player, stereoscopic vision can be continuously obtained.

FIG. 46 further illustrates another example of arrangement of the displays according to the present embodiment. The settings of the displays and the method of data inversion are similar to those of the eighth embodiment illustrated in FIG. 28.

<Modification to Fourteenth Embodiment>

The fourteenth embodiment employs the light-transmitting type LCD as a space modulator, however, the space modulator may be any device that passes light and displays a screen image. Further, the light may be any irradiation device that emits lights of two different wavelengths within an infrared wavelength area; for example, the light may be a halogen lamp having a wavelength band filter to limit irradiation wavelength band.

Further, the lens 106a (106b) may be replaced with a concave mirror.

Displaying arrangement of screen images and control figures on the displays according to the present embodiment is the same as in the eighth embodiment.

Fifteenth Embodiment

Figure 48:
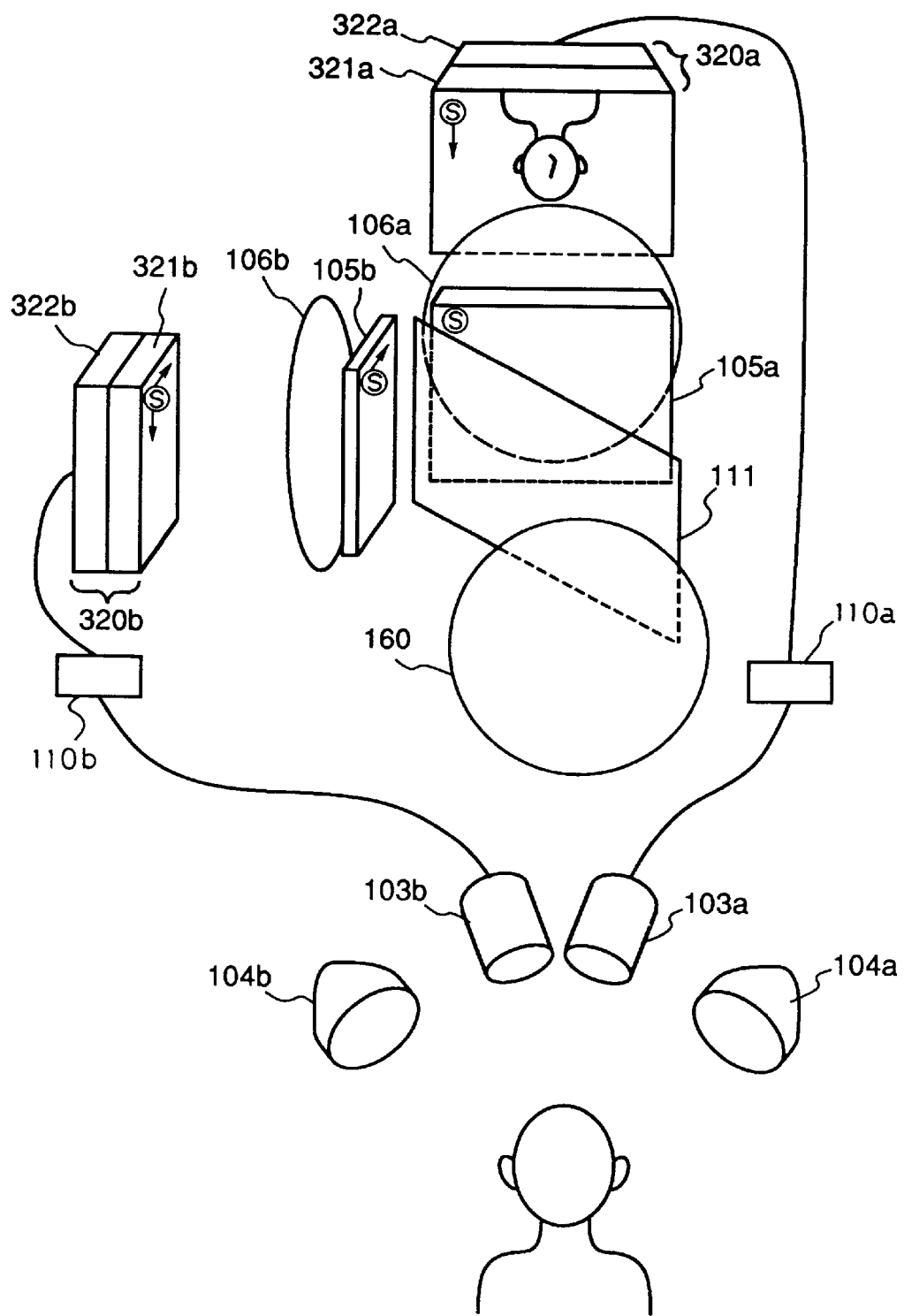
FIG. 48 is a perspective view showing of a stereoscopic-image game playing apparatus according to a fifteenth embodiment of the present invention.
Figure 51:
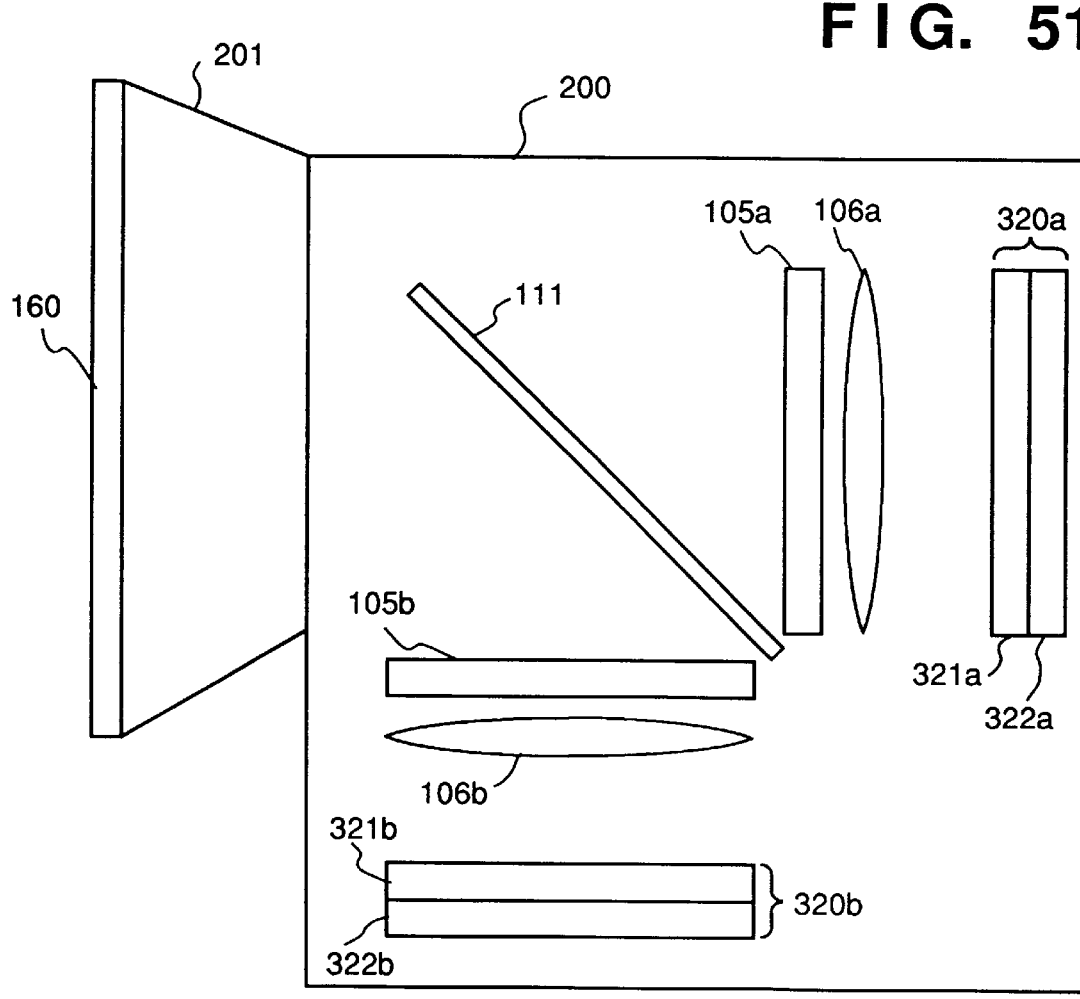
FIG. 51 illustrates a casing of the fifteenth embodiment containing the stereoscopic-image game playing apparatus of the embodiment separated from a lens group.
Figure 52:
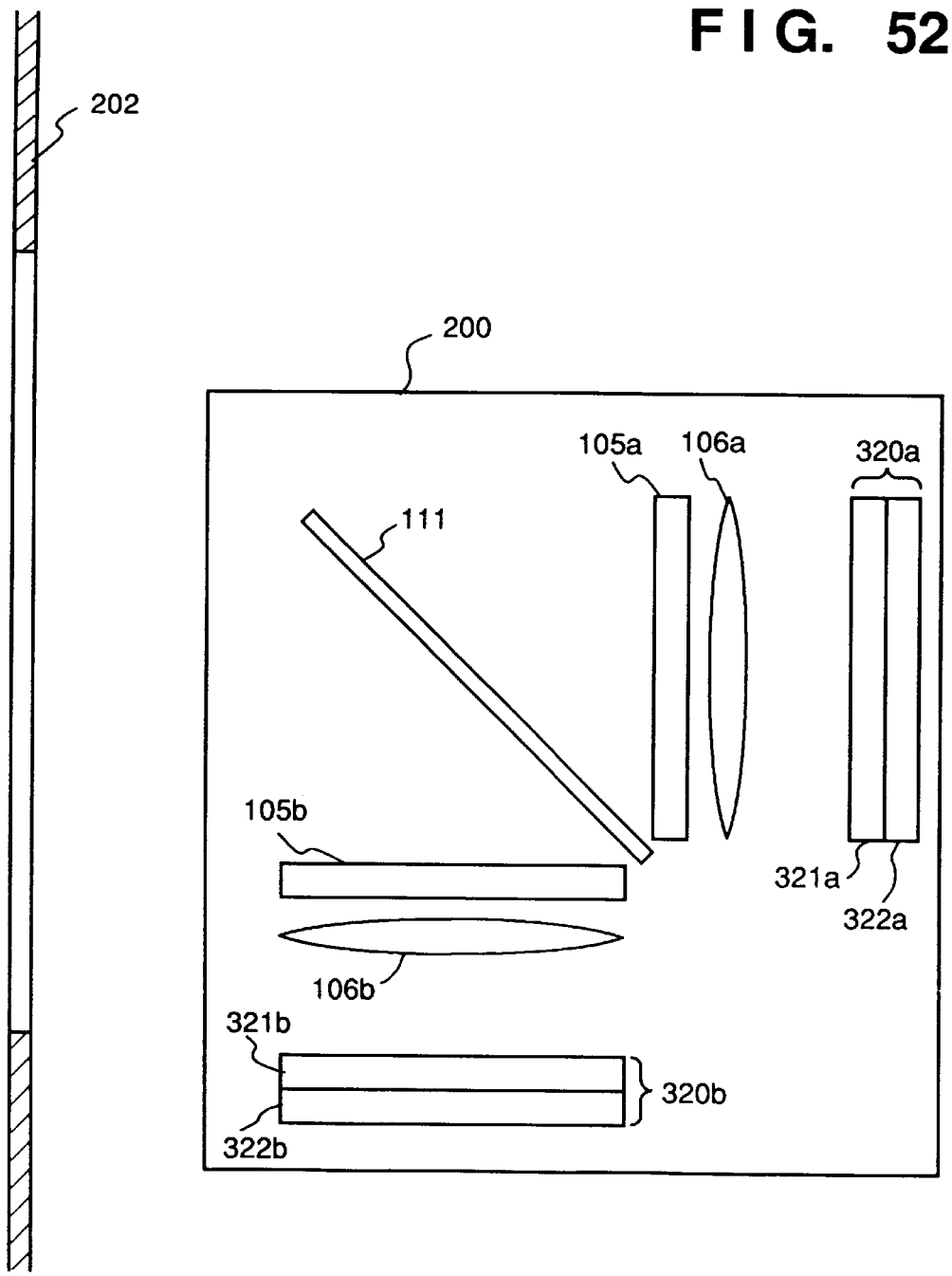
FIG. 52 illustrates the casing and the lens group provided on a partition of a room (wall) in the fifteenth embodiment, to raise a magnification ratio.

FIG. 48 shows the construction of a stereoscopic-image game playing apparatus according to a fifteenth embodiment of the present invention. Similar to the seventh embodiment (FIG. 28), the fifteenth embodiment employs a magnification lens. However, different from the seventh embodiment, the fifteenth embodiment employs a casing for containing the apparatus, and as shown in FIGS. 51 and 52, the magnification lens is separately provided from the casing. Similar to the previous embodiments, in the apparatus according to the present embodiment comprises a plurality of displays. The displays are set "normally" unless otherwise specified.

In the first embodiment, as the player directly sees the screen image displayed on the LCD 105, this display arrangement is not suitable for enlarging/reducing the screen image. For the purpose of image enlargement/reduction, the fifteenth embodiment employs a lens group.

In FIG. 48, numeral 160 denotes a group of lenses for enlarging or reducing screen images displayed on LCD's 105a and 105b. The lens group 160 comprises the combination of convex lens(es) and concave lens(es) for image enlargement/reduction. Preferably, the lens group 160 comprises a combination lens to reduce aberration. In a case where only an enlarged image is required, the lens group 160 may comprise the combination of convex lenses, in consideration of costs.

For the purpose of downsizing of the casing for containing the stereoscopic image communication apparatus, the present embodiment employs LCD panels 320a and 320b respectively having a backlight as a light-emitting device. The LCD panels 320a and 320b comprise liquid crystal panels 321a and 321b and backlight sources 322a and 322b.

Figure 49:
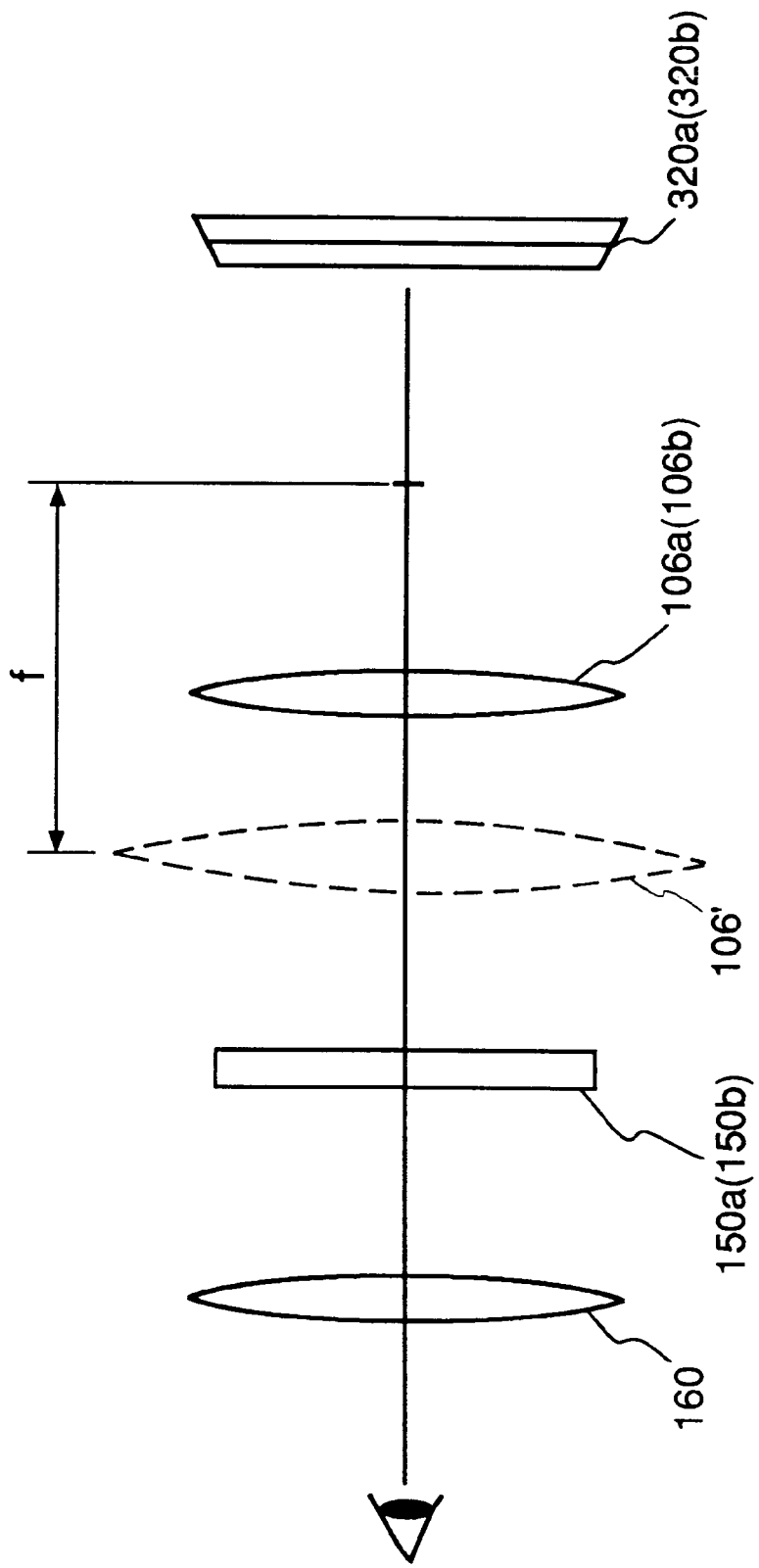
FIG. 49 is an explanatory view of the positional relation among optical devices and liquid crystal display panels in the fifteenth embodiment.

FIG. 49 shows the positional relation among Fresnel lens 106a (106b), the lens group 160, and the LCD panel 320a (320b). The LCD panel 320a (320b) is located without the focal distance of an imaginary lens 106' as a combination lens formed with the lens 106a (106b) with the lens group 160, so that the player's image displayed on the LCD panel 320a (320b) functions as a backlight control figure. On the other hand, the lens group 160 is positioned so that the LCD 105a (105b) is within the focal distance of the imaginary lens 106'. Actually, to change an image enlargement/reduction ratio, the lens group 160 is used as a zoom lens, and the focal distance of the zoom lens may be changed from the outside of the apparatus. The Fresnel lens 106a (106b) reduces the thickness of the zoom lens, thus attaining downsizing of the apparatus.

Preferably, the casing containing the above optical devices prevents extraneous light from entering the optical path and maintains the positional relation among optical the devices. FIG. 50 shows a casing containing the stereoscopic image communication apparatus. It is understood from FIG. 50 that in a case where the lens group 160 is for magnifying a screen image, as the picture size becomes larger, the size of the lens group and that of the casing become larger. In the fourteenth embodiment, to suppress enlargement of the casing size, the lens group 160 is separated from the casing.

FIG. 51 shows a casing 200 containing the stereoscopic image communication apparatus separated from the lens group 160. The lens group 160 is attached to the apparatus via a hood 201 surrounding the lens group 160. The hood 201 maintains the optical positional relation between the lens group 160 and the other optical devices, further, the hood 201 prevents extraneous light into the optical path.

This portion formed with the hood 201 and the lens group 160 is detachable from the casing 200. This arrangement reduces the size of the casing 200, and enables easy conveyance and setting of the apparatus.

FIG. 52 shows the casing 200 and the lens group 160 attached to a partition of a room (e.g., the wall) to raise the magnification ratio. In this case, to prevent extraneous light between the casing 200 and the lens group 160, the room where the casing 200 is set is preferably a darkroom.

In the present embodiment, LED'S 104a and 104b and CCD cameras 103a and 103b are provided outside of the casing 200, however, these devices may be contained within the casing 200. Further, the present embodiment employs the LCD panel as a light-emitting device, for downsizing of the casing, however, the present embodiment may employ a CRT in place of the LCD panel.

Displaying arrangement of screen images and control figures on the displays according to the present embodiment is the same as in the seventh embodiment.

According to the stereoscopic image communication apparatus according to the fifteenth embodiment having the above construction, the following advantages can be obtained.

① Stereoscopic vision can be obtained without any specific tool such as image-separating glasses.

② The screen images displayed on the LCD's can be enlarged or reduced in accordance with the player's purpose.

③ The lens group for image enlargement/reduction, separated from the casing, may be exchanged with another lens group in accordance with the player's purpose, without changing the casing. This attains flexibility upon changing the enlargement/reduction ratio.

④ The stereoscopic image communication apparatus is separated into two systems, i.e., a display driving system contained in the casing 200 and an image enlargement/reduction system (the lens group and the hood). This attains downsizing of the casing of the display driving system comprising various minute parts, thus enables easy conveyance and setting of the apparatus.

⑤ The backlight source, based on the player's image obtained by the camera 103a (103b), moves in accordance with the movements of the player. In other words, if the player moves, as the backlight source moves following the movement of the player, stereoscopic vision can be continuously obtained.

⑥ The player's images are used for stereoscopic vision without depending upon the player's position, and are transmitted to the receiving-side apparatus as screen images.

FIG. 48 further illustrates another example of arrangement of the displays according to the present embodiment. The settings of the displays and the method of data inversion are similar to those of the eighth embodiment illustrated in FIG. 28.

<Modification to Fifteenth Embodiment>

The fifteenth embodiment employs the light-transmitting type LCD as a space modulator, however, any device that passes light and displays a screen image can be used as a space modulator. Further, the light may be any irradiation device that emits lights of two different wavelengths within an infrared wavelength area; for example, a halogen lamp having a wavelength band filter to limit irradiation wavelength band may be used.

Further, the lens 106a (106b) and the lens group 160 may be replaced with concave mirrors.

Sixteenth Embodiment

Figure 53:
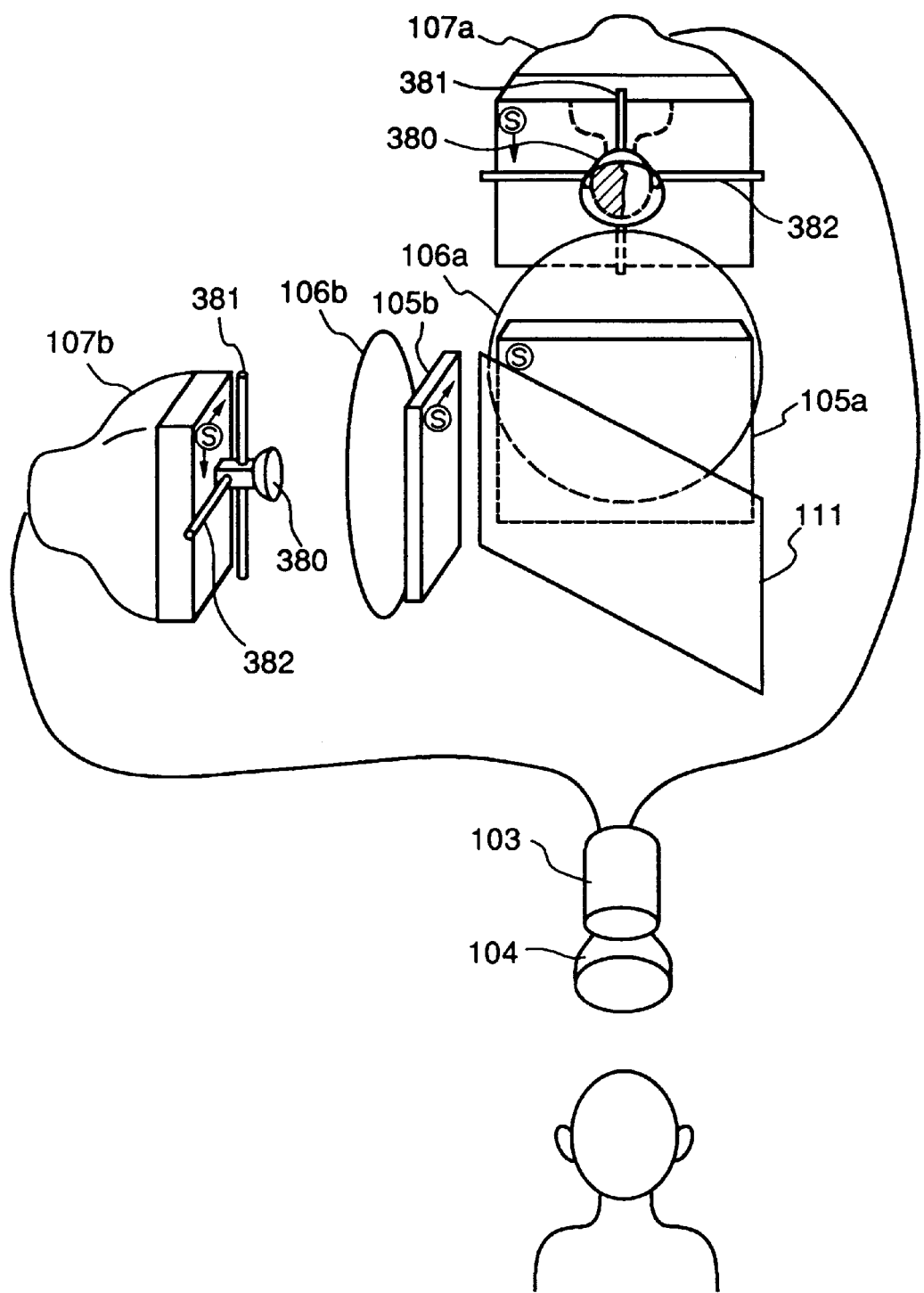
FIG. 53 is a perspective view showing the construction of a stereoscopic-image game playing apparatus according to the sixteenth embodiment.

FIG. 53 shows the construction of the stereoscopic-image game playing apparatus according to a sixteenth embodiment of the present invention. The sixteenth embodiment has a high-luminance backlight that can detect and follow the movement of player. Similar to the previous embodiments, in the apparatus according to the present embodiment comprises a plurality of displays. The displays are set "normally" unless otherwise specified.

In FIG. 53, reference numerals 105a and 105b denote light-transmitting type LCD's as space modulators; 106a and 106b, Fresnel lenses respectively having a 150 mm focal distance, located behind the LCD's 105a and 105b; 107a and 107b, monochromatic CRT's as light-emitting image display devices for displaying player's images, located at positions 160 mm (longer than the focal distance of the lenses 106a and 106b) distant from the lenses 106a and 106b, opposite to the LED's 105a and 105b; 104, an LED for emitting light of 850 nm wavelength as an irradiation device; 103, a monochromatic CCD camera as an image sensing device; 110, a half mirror for combining screen images displayed on the CRT's 105a and 105b; and 380, light sources located at the intersection of a horizontal shaft 382 and a vertical shaft 381 on the display surface of the CRT's 107a and 107b.

The feature of the stereoscopic-image game playing apparatus having the above construction is as follows; the camera 103 obtains the player's front image and displays the image on the CRT's 107a and 107b, and the light source 380 on the CRT 107a emits light at the right-half portion of the image as backlight to the player's right eye, and the light source 380 on the CRT 107b emits light at the left-half portion of the image as backlight to the player's left eye. In this case, the apparatus requires only one light 104 and only one camera 103.

FIG. 54 shows the construction of the backlight of the present embodiment. Note that FIG. 48 only shows the light source for right eye on the CRT 107a.

In FIG. 54, the CRT 107a displays the player's image from the camera 103. The light source 380 comprising a high-luminance lamp such as an LED is provided in front of the CRT 107a. The light source 380 is located at the intersection of the horizontal shaft 382 and the vertical shaft 381 so as to move following the movement of the player's image displayed on the CRT 107a. The movement of the light source 380 is attained by various techniques used e.g. in an XY plotter. In this example, screw grooves are formed on the shafts 381 and 382, and the light source 380, having screw groove engaged with the screw grooves on the shafts, is moved by the rotation of the shafts 381 and 382. The light source 380 emits light at the left-half portion 380a and does not emit light at the right-half portion 380b. The light-emitting portion corresponds to the right-half face area of the player's image inverted only upside down. Accordingly, the light source for left eye (not shown) emits light at the right-half portion and does not emit light at the left-half portion.

The movement of the player's image on the CRT 107a is followed in the two procedures as follows.

Figure 55:
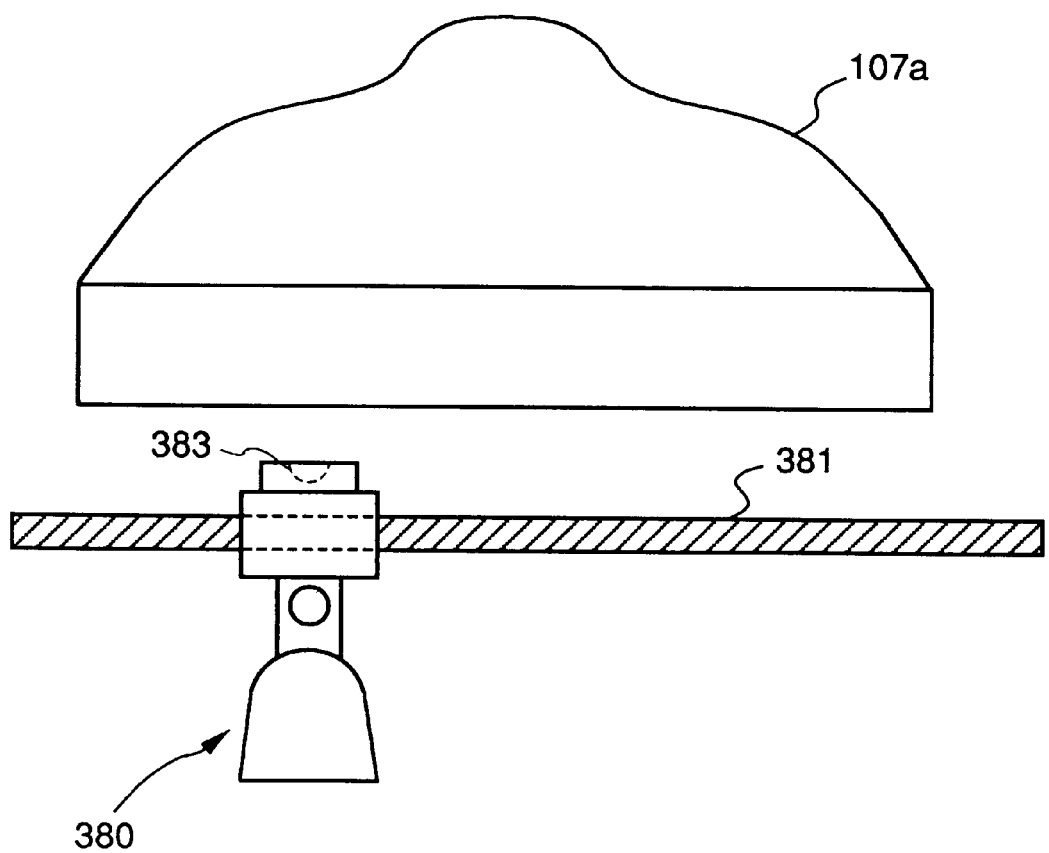
FIG. 55 is a top plan view showing the construction of the backlight device in the sixteenth embodiment.
Figure 56:
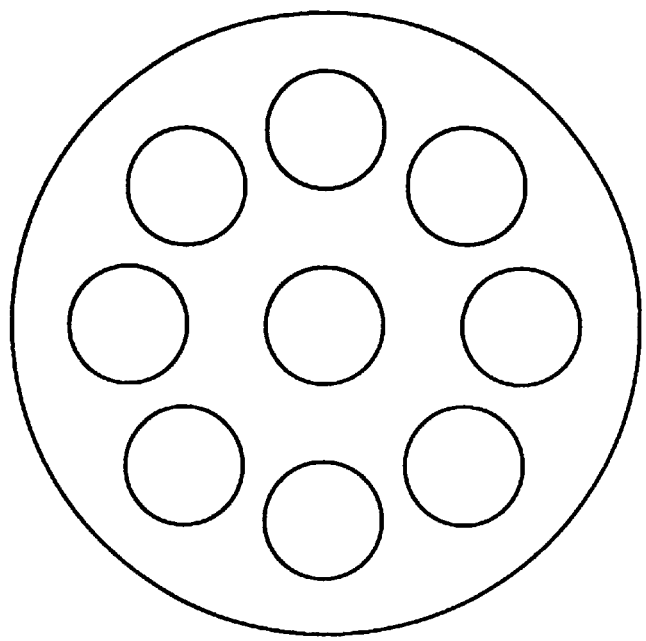
FIG. 56 is an example of the arrangement of light-point sensors in the sixteenth embodiment.
Figure 57:
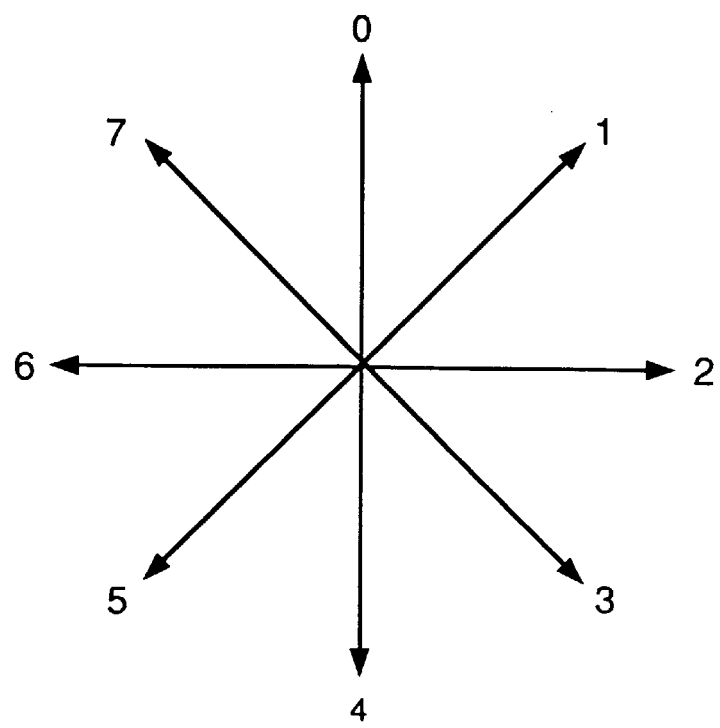
FIG. 57 illustrates light-point moving directions to be sensed by the light-point sensors in the sixteenth embodiment.

First, the movement of the player's image displayed on the CRT 107a is detected. As shown in FIG. 55, the light source 380 has a light point tracking sensor 383, having e.g. nine light sensors as shown in FIG. 56, on its CRT 107a side. In FIG. 56, the light sensor comprising nine light point sensors detect the movement of light points on the display screen in eight directions as shown in FIG. 57.

Next, the light source 380 moves on the shafts 381 and 382 in accordance with the detected directions, thus follows the movement of the light points, namely the movement of player.

Figure 58:
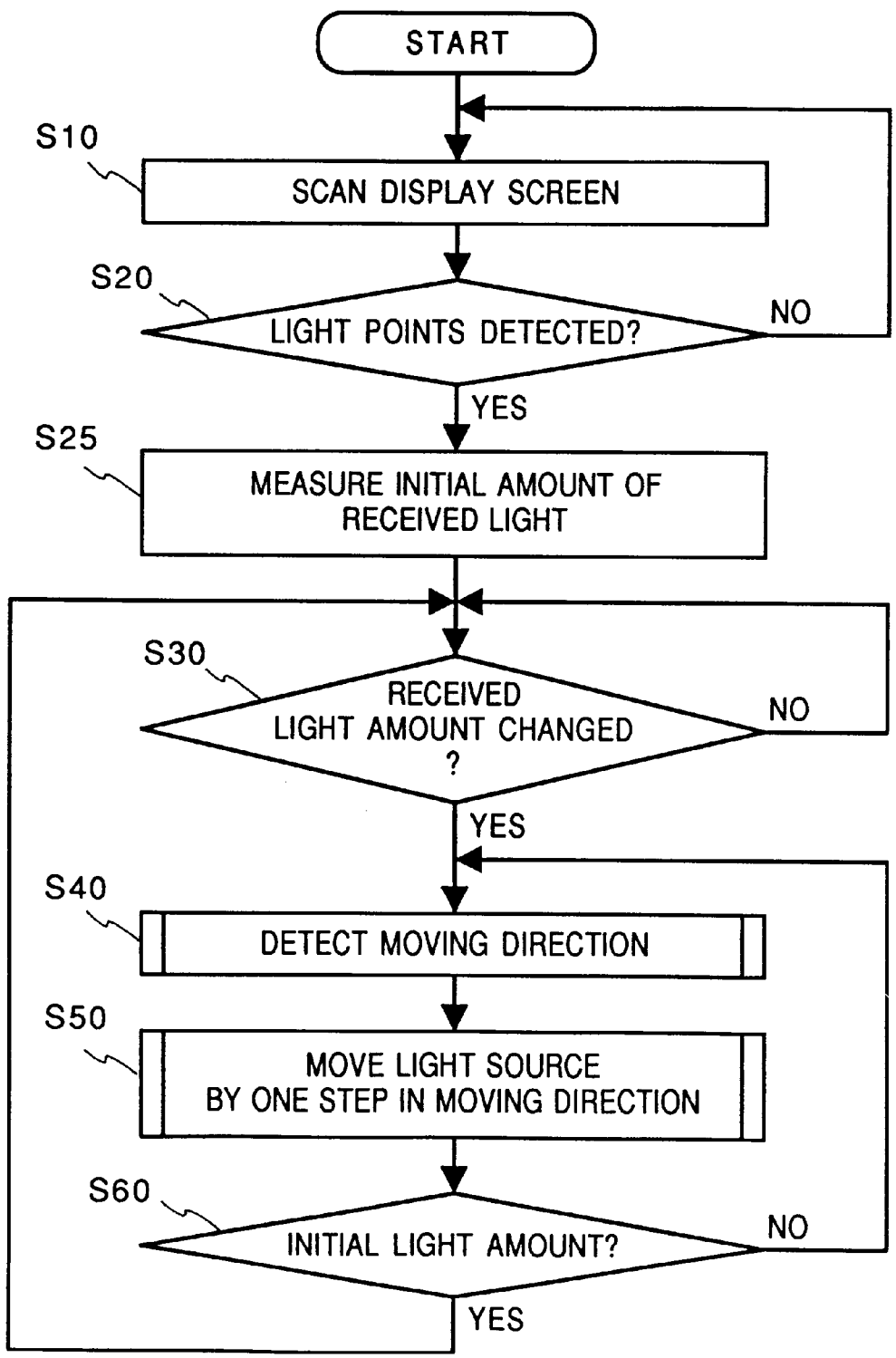
FIG. 58 is a flowchart showing the light-point tracking control procedure of the sixteenth embodiment.

The light-point tracking control procedure will be described with reference to the flowchart of FIG. 58.

In step S10, in the initial operation of the light point tracking sensor, the display screen of the CRT 107a is scanned in the horizontal and vertical directions. In step S20, whether or not light points have been detected is determined. If YES, the initial amounts of the received light at the nine light point sensors is measured in step S25, then in step S30, whether or not the light points have moved is determined from the change of the light amounts. If NO, the position of the light source 380 is maintained. The movement of the image is determined, e.g., by detecting one of the light point sensors where the received light amount has been reduced to a predetermined level or lower. To determine the movement of the image more accurately, the number of light point sensors may be increased and the change of the sensed light amounts may be detected.

If it is determined that the light points have moved in correspondence with the movement of the player, the process proceeds to step S40, in which the moving direction is detected. The detection of the moving direction is made, e.g., by determining a direction opposite to the direction from the central light point sensor to a light point sensor where received light amount has changed to the lowest level among the nine sensors (see FIG. 57). As the moving direction of the image is determined, the light source 380 is moved by one step in the direction determined in step S50. Note that the "one step" may be, e.g., the half of the distance between the central light point sensor to each peripheral sensor in FIG. 56. Note that in step S50, if the moving step of the light source 380 is divided into a normal moving step and a minute moving step, more accurate movement can be attained.

In step S60, whether or not the received light amount is of the initial level at all the light point sensors is determined. If YES, the process returns to step S30, while if NO, the process returns to step S40 to continue the light-point tracking operation.

Note that FIG. 54 shows the construction in case of one player, however, although the construction becomes complicated, the light source and the moving mechanism may be increased for a plurality of players.

Displaying arrangement of screen images and control figures on the displays according to the present embodiment is the same as in the fourteenth embodiment.

FIG. 53 further illustrates another example of arrangement of the displays according to the present embodiment. The settings of the displays and the method of data inversion are similar to those of the eighth embodiment illustrated in FIG. 28.

Seventeenth Embodiment

FIG. 59 shows the construction of a stereoscopic-image game playing apparatus according to a seventeenth embodiment of the present invention. Similar to the previous embodiments, in the apparatus according to the present embodiment comprises a plurality of displays. The displays are set "normally" unless otherwise specified.

In the first to sixteenth embodiments, the image processor 108 generates the screen image (R) and the screen image (L) based on the character data (R) and the character data (L) stored in the target memory 180. In the seventh embodiment, the data stored in a target memory 180 is different from the data in the first to sixteenth embodiments.

In FIG. 59, the target memory 180 is used for storing data on characters as three-dimensional data. An image processor 108 calculates a parallax between the right eye and the left eye of the player based on the position of a target and the positions of the player's eyes (calculated from the player's face image). Then, the image processor 108 corrects the three-dimensional data corresponding to the target, thus generates character data for right eye and character data for left eye.

<Another Modification>

The first to seventeenth embodiments use the camera as means for detecting the player's position. The camera may be replaced with an oscillation device and a detection device. In this case, the oscillation device, such as an ultrasonic oscillator, an electric wave oscillator or a magnetic wave oscillator, may be attached to the player's head, and the detection device may detect the oscillated wave.

Furthermore, the mirrors may be substituted by any type of beam splitter.

As described above, according to the embodiments, the present invention provides a stereoscopic-image game playing apparatus that displays a screen image for right eye and a screen image for left eye in such manner that the player can obtain stereoscopic vision without using any tool for separating screen images for right and left eyes such as image separating glasses.

Further, the present invention provides a stereoscopic-image game playing apparatus that enables a plurality of players to obtain stereoscopic vision simultaneously, and further enables the players to obtain stereoscopic vision under the same condition, even if the players move fro the initial positions.

As described above, the present invention provides a stereoscopic-image game playing apparatus that uses a pair of screen images for stereoscopic vision without image separating glasses, and enables a plurality of players to obtain stereoscopic vision, further allows the players to move from the initial positions, thus simplifies the construction of the apparatus for various practical uses.

The present invention is not limited to the above embodiments and various changes and modifications can be made within the spirit and scope of the present invention. Therefore, to appraise the public of the scope of the present invention, the following claims are made.

What is claimed is:

1. A game playing apparatus for displaying a stereoscopic image to a player, comprising:
    a target memory for storing image data of a game character;
    an image processor for generating a first game image and a second game image both for stereoscopic vision based on the image data stored in said target memory, in accordance with a predetermined game program;
    at least one image display means for displaying the first and second game images generated by said image processor;
    image sensing means for sensing an image of the player's face;
    generating means for generating first and second figures representing right and/or left halves of the observer's face, respectively, based on the image of the player's face obtained by said image sensing means;
    a display unit for displaying the first and second figures; and
    light guide means for selectively distributing the first game image and the second game image displayed on said image display means to the right eye and the left eye of a player, respectively, so that the first and second figures correspond to the first and second game images, respectively.

2. The game playing apparatus according to claim 1, wherein said light guide means controls said display unit to display a figure which has a predetermined shape at a position on a display screen of said display unit corresponding to the player's face obtained by said image sensing means.

3. The game playing apparatus according to claim 1, wherein said image display means has a space modulating device.

4. The game playing apparatus according to claim 3, wherein the space modulating device has a liquid crystal display device.

5. The game playing apparatus according to claim 1, wherein said image sensing means has an irradiation device for emitting infrared light and an image sensing device sensitive to the infrared light.

6. The game playing apparatus according to claim 5, wherein said irradiation device includes means for emitting infrared lights of two different wavelengths, said infrared lights respectively illuminating the right and left halves of the observer's face, and said image sending device includes image sensors selectively sensitive to the infrared illuminating lights to generate images of the right and left halves of the observer's face.

7. The game playing apparatus according to claim 3, wherein said light guide means comprises:
    an optical device having directivity for introducing light from the first and second figures displayed on the display unit into the right eye or the left eye of the player.

8. The game playing apparatus according to claim 1, wherein the display unit functions as a backlight source for irradiating the image display means from the rear of the image display means.

9. The game playing apparatus according to claim 8, wherein said image display means has one display surface for displaying the first and second images in a time-divisional manner,
    said image sensing means obtains an image corresponding to either one of the right half face of the player and the left half face of the player,
    said generation means generates the first and second figures based on a half-face image of the player obtained by said image sensing means,
    and the display unit displays the first and second figures in time-divisional manner, in synchronization with display of the first and second images by said image display means.

10. The game playing apparatus according to claim 8, wherein said image display means has one display surface for displaying the first and second images in a time-divisional manner, said image sensing means simultaneously obtains an image corresponding to the right half face of the player and an image corresponding to the left half face of the player, said generation means simultaneously generates the first and second figure based on the image corresponding to the player's right half face and the image corresponding to the player's left half face respectively, and the display unit displays the first figure for the player's right eye and the second figure for the player's left eye in time-divisional manner, in synchronization with display of the first and second images by said image display means.

11. The game playing apparatus according to claim 8 further comprising combining means for combining two images by bringing two optical paths of the images into one optical path, wherein said image display means has a first display device and a second display device for displaying the first and second images respectively, said generating means generates the first figure indicative of a position of the player's right eye and the second figure indicative of a position of the player's left eye based on the player's image obtained by said image sensing means, the display unit has a third display device and a fourth display device for displaying the first and second figures respectively, and said combining means brings first light from the first figure on the third display device, that passes through a portion where the first image is displayed on the first display device and second light from the second figure on the fourth display device, that passes through a portion where the second image is displayed on the second display device, into one optical path.

12. The game playing apparatus according to claim 11, wherein said combining means is a half mirror.

13. The game playing apparatus according to claim 11, wherein said combining means is a beam splitter.

14. The game playing apparatus according to claim 7, wherein the optical device a lens or a concave mirror.

15. The game playing apparatus according to claim 1, wherein said display unit comprises:

a space modulating device for displaying the figure generated by said generation means as an image transmission area; and wherein said light guide means comprises an optical device having directivity for introducing light from the image transmission area on the space modulating device into one of the player's right eye or the player's left eye.

16. The game playing apparatus according to claim 15, wherein said image display means has one display surface of displaying the first and second images in a time-divisional manner, said image sensing means obtains an image corresponding to either one of a right half face and a left half face of the player, said generation means generates the first and second figures based on the image obtained by said image sensing means, and wherein the space modulating device displays the the first and second figures in time-divisional manner, in synchronization with display of the first and second images by said image display means.

17. The game playing apparatus according to claim 14, wherein said image display means has one display surface for displaying the first and second images in a time-divisional manner, said image sensing means obtains an image corresponding to the right half face of the player and an image corresponding to the left half face of the player, said generation means generates the first and second figures respectively based on the image corresponding to the player's right half face and the image corresponding to the player's left half face, and the space modulating device displays the first figure for the player's right eye and the second figure for the player's left eye in time-divisional manner, in synchronization with display of the first and second images by said image display means.

18. The game playing apparatus according to claim 15, further comprising combining means for combining two images by bringing two optical paths of the images into one optical path, wherein said image display means has a first display device and a second display device for displaying the first and second images simultaneously, said generation means generates the first figure indicative of a position of the player's right eye and the second figure indicative of a position of the player's left eye based on the player's image obtained by said image sensing means, the space modulating device has a third display device and a fourth display device for displaying the first and second figures areas of the space modulating device where the figures are displayed functioning as image transmission areas, and said combining means brings first optical path, from the first image on the first display device, that passes through the first figure as an image transmission area on the third display device, and second optical path, from the second image on the second display device, that passes through the second figure as an image transmission area on the fourth display device, into one optical path.

19. The game playing apparatus according to claim 15, wherein said image display means has a first display device for displaying the first image and emitting first polarized light and a second display device for displaying the second image and emitting second polarized light different from the first polarized light, and wherein the space modulating device has a first image transmission area for passing only the first polarized light and a second image transmission area for passing only the second polarized light.

20. The game playing apparatus according to claim 19, wherein the polarized direction of the first polarized light and the polarized direction of the second polarized light are orthogonal to each other.

21. The game playing apparatus according to claim 19, wherein the space modulating device include:

a light-transmitting type display device for displaying an image; and a polarizing plate, provided on one surface of the light-transmitting type display device, the polarizing plate having polarizing direction parallel to one of the polarized direction of the first polarized light and the polarized direction of the second polarized light.

22. The game playing apparatus according to claim 19, wherein the first and second display devices are a light-transmitting type monochromatic liquid crystal display device, and one monochromatic liquid crystal display device to which a voltage is applied passes one of the first and second polarized lights, while the other monochromatic liquid crystal display device to which no voltage is applied passes the other of the first and second polarized lights.

23. The game playing apparatus according to claim 19, wherein said combining means is a half mirror.

24. The game playing apparatus according to claim 19, wherein said combining means is a beam splitter.

25. The game playing apparatus according to claim 15, wherein the optical device is a lens or a concave mirror.

* * * * *

UNITED STATES PATENT AND TRADEMARK OFFICE
CERTIFICATE OF CORRECTION

PATENT NO. : 5,976,017
DATED : November 2, 1999
INVENTOR(S) : Omori et al.

Page 1 of 1

It is certified that error appears in the above-identified patent and that said Letters Patent is hereby corrected as shown below:

Title page,
Item [56] References Cited, FOREIGN PATENT DOCUMENTS, JPA 63-127777

Signed and Sealed this

Twenty-eighth Day of May, 2002

*Attest:*

*Attesting Officer*

JAMES E. ROGAN
*Director of the United States Patent and Trademark Office*